US012759236B2

(12) United States Patent
Ulven et al.

(10) Patent No.: US 12,759,236 B2
(45) Date of Patent: Oct. 13, 2026

(54) ADDITIVE MANUFACTURING SYSTEM INCORPORATED WITH ARTIFICIAL INTELLIGENCE

(71) Applicant: NDSU RESEARCH FOUNDATION, Fargo, ND (US)

(72) Inventors: Chad Ulven, Fargo, ND (US); Md Atikur Rahman, Fargo, ND (US); Md. Zahirul Islam, Fargo, ND (US); Luke R. Gibbon, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 196 days.

(21) Appl. No.: 18/339,043

(22) Filed: Jun. 21, 2023

(65) Prior Publication Data

US 2023/0405936 A1 Dec. 21, 2023

Related U.S. Application Data

(60) Provisional application No. 63/366,744, filed on Jun. 21, 2022.

(51) Int. Cl.
*B29C 64/386* (2017.01)
*B29C 64/10* (2017.01)
(Continued)

(52) U.S. Cl.
CPC ............ *B29C 64/386* (2017.08); *B29C 64/10* (2017.08); *B33Y 10/00* (2014.12); *B33Y 40/20* (2020.01);
(Continued)

(58) Field of Classification Search
CPC ..... B29C 70/38; B29C 70/382; B29C 70/384; B29C 70/386; B29C 70/388;
(Continued)

(56) References Cited

U.S. PATENT DOCUMENTS 4,575,330 A 3/1986 Hull
4,892,764 A * 1/1990 Drain ........................ C08J 3/243 264/494

(Continued)

FOREIGN PATENT DOCUMENTS

CN 108943719 A 12/2018

OTHER PUBLICATIONS

Callaghan, Effect of fiber volume fraction and length on the wear characteristics of glass fiber-reinforced dental composites, Elsevier, 2006, p. 91 (Year: 2006).*

(Continued)

*Primary Examiner* — Andrew L Swanson

(74) *Attorney, Agent, or Firm* — McKee, Voorhees & Sease, PLC

(57) ABSTRACT

Commercial additive manufacturing with continuous reinforcement produces parts with low fiber volume fraction and limited printing parameters. Mechanical properties of 3D printed products are improved with high fiber volume fraction. This technology solves, at least, the problem of undetected print fails of currently available technology. Applicator engineering solves the issue of poor interlaminar adhesion. The incorporation of elevated temperature control and real-time monitoring helps solve dimensional errors that happen due to postcuring. This technology mitigates and prevents print failures which will save time and material and improve printing efficiency. Ultrasonic vibration reduces the void in the print by better dispersion of resin.

13 Claims, 39 Drawing Sheets

(51) Int. Cl.

| | |
|---|---|
| ***B33Y 10/00*** | (2015.01) |
| ***B33Y 40/20*** | (2020.01) |
| ***B33Y 50/00*** | (2015.01) |
| ***C08J 5/24*** | (2006.01) |
| *B29C 70/30* | (2006.01) |
| *B29C 70/38* | (2006.01) |

(52) U.S. Cl.
CPC .............. *B33Y 50/00* (2014.12); *C08J 5/243* (2021.05); *B29C 70/30* (2013.01); *B29C 70/38* (2013.01)

(58) Field of Classification Search
CPC ... B29C 64/118; B29C 64/386; B29C 64/393; B33Y 50/00; B33Y 50/02
See application file for complete search history.

(56) References Cited

U.S. PATENT DOCUMENTS

| | | | | |
|---|---|---|---|---|
| 7,795,349 | B2 | 9/2010 | Bredt et al. | |
| 9,149,988 | B2 | 10/2015 | Mark et al. | |
| 9,987,798 | B2 | 6/2018 | Tyler | |
| 10,603,836 | B2 | 3/2020 | Tyler | |
| 2002/0129485 | A1* | 9/2002 | Mok | B29C 64/188 29/527.2 |
| 2017/0368746 | A1* | 12/2017 | Lee | G09B 23/28 |
| 2018/0207850 | A1* | 7/2018 | Stockett | B29C 48/305 |
| 2019/0299536 | A1* | 10/2019 | Putman | G06F 18/2411 |
| 2021/0347115 | A1 | 11/2021 | Fetfatsidis et al. | |
| 2022/0080659 | A1* | 3/2022 | Budge | B33Y 40/00 |
| 2022/0410094 | A1 | 12/2022 | Zhu et al. | |

OTHER PUBLICATIONS

Tan, K., "The Framework of Combining Artificial Intelligence and Construction 3D Printing in Civil Engineering," MATEC Web of Conferences, 2018, vol. 206, No. 01008, ICCEMS 2018, pp. 1-5.

Tappa et al., "Novel Biomaterials Used in Medical 3D Printing Techniques," Journal of Functional Biomaterials, 2018, vol. 9, No. 17, pp. 1-16.

Tomeh et al., "Silk Fibroin as a Functional Biomaterial for Drug and Gene Delivery," Pharmaceutics, 2019, vol. 11, No. 494, pp. 1-22.

Ulven, C., "Incorporation of laser cutter during 3D printing of continuous carbon fiber reinforced thermoset composites," North Dakota State University, Jul. 5, 2022, Invention ID: TECH-22-0042, Technology ID: RFT-0669, pp. 1-5.

Wang et al., "3D printing of polymer matrix composites: A review and prospective," Composites Part B, 2017, vol. 110, pp. 442-458.

Wang et al., "Current progress on the 3D printing of thermosets," Advanced Composites and Hybrid Materials, Nov. 4, 2020, pp. 1-11.

Wang et al., "Fabrication of continuous carbon fiber mesh for lightning protection of large-scale-wind-turbine blade by electron beam cured printing," Additive Manufacturing, 2019, 35 pages.

Wickramasinghe et al., "FDM-Based 3D Printing of Polymer and Associated Composite: A Review on Mechanical Properties, Defects and Treatments," Polymers, 2020, vol. 12, No. 1529, pp. 1-42.

Wong et al., "A Review of Additive Manufacturing," ISRN Mechanical Engineering, 2012, vol. 2012, Article ID 208760, pp. 1-11.

Wu et al., "Mechanics of shape distortion of DLP 3D printed structures during UV post-curing," Soft Matter, vol. 15, No. 30, 2019, 9 pages.

Yunus et al., "Short fiber reinforced 3d printed ceramic composite with shear induced alignment," Ceramics International, 2017, vol. 43, No. 15, pp. 11766-11772.

3D Printers for Filled and Fiber Reinforced Photopolymers, 3D Fortify, Inc., 2018, Retrieved from Internet: <https://3dfortify.com>, 3 pages.

Abliz et al., "Curing Methods for Advanced Polymer Composites—A Review," Polymers & Polymer Composites, 2013, vol. 21, No. 6, pp. 341-348.

ASTM International, "Standard Test Method for Flexural Properties of Polymer Matrix Composite Materials," Designation: D 7264/D 7264M-07, Apr. 2007, pp. 1-11.

ASTM International, "Standard Test Method for Glass Transition Temerature (DMA Tg) of Polymer Matrix Composites by Dynamic Mechanical Analysis (DMA)," Designation: D 7028-07e1, Jan. 2008, pp. 1-14.

ASTM International, "Standard Test Method for Tensile Properties of Polymer Matrix Composite Materials," Designation: D 3039/D 3039M-00e1, Jul. 2000, 13 pages.

ASTM International, "Standard Test Methods for Constituent Content of Composite Materials," Designation D3171-15, May 2015, pp. 1-11.

Bekas et al., "3D printing to enable multifunctionality in polymer-based composites: A review," Composites Part B, 2019, 55 pages.

Borrello et al., "3D Printing a Mechanically-Tunable Acrylate Resin on a Commercial DLP-SLA Printer," Additives Manufacturing, Oct. 2018, vol. 23, pp. 374-380.

Brooks et al., "3D Printing as a Consumer Technology Business Model," International Journal of Management & Information Systems,—Third Fourth, 2014, vol. 18, No. 4, pp. 271-280.

Cañizares et al., "On the Use of 3D Printing Technology Towards the Development of a Low-Cost Robotic Prosthetic Arm," 2017 IEE International Autumn Meeting on Power, Electronics and Computing (ROPEC 2017), 2017, pp. 1-6.

Carneiro et al., "Fused deposition modeling with polypropylene," Materials & Design, 2015, vol. 83, pp. 768-776.

Cheah et al., "Mechanical characteristics of fiber-filled photopolymer used in stereolithography," Rapid Prototyping Journal, 1999, vol. 5, No. 3, pp. 112-119.

Chou et al., "Novel processing of iron-manganese alloy-based biomaterials by inkjet 3-D printing," Acta Biomaterialia, 2013, vol. 9, pp. 8593-8603.

Clark et al., "3D printing of tablets using inkjet with UV photoinitiation," International Journal of Pharmaceutics, 2017, vol. 529, pp. 523-530.

Compton et al., "3D-Printing of Lightweight Cellular Composites," Advanced Materials, 2014, vol. 26, pp. 5930-5935.

Continuous Fiber 3D Printing The Next Dimension of Innovation, Continuous Composites Inc., 2021, Retrieved from Internet: <https://www.continuouscomposites.com>, 5 pages.

Duan et al., "Effects of Compaction and UV Exposure on Performance of Acrylate/Glass-Fiber Composites Cured Layer by Layer," Journal of Applied Polymer Science, 2012, vol. 123, pp. 3799-3805.

Endruweit et al., "Curing of Composite Components by Ultraviolet Radiation: A Review," Polymer Composites, 2006, pp. 119-128.

Groth et al., "Three-Dimensional Printing Technology," Journal of Clinical Orthodontics, Aug. 2014, vol. XLVIII, No. 8, pp. 475-485.

He et al., "3D printed continuous CF/PA6 composites: Effect of microscopic voids on mechanical performance," Composites Science and Technology, 2020, vol. 191, No. 108077, pp. 1-9.

He et al., "3D printing of continuous fiber-reinforced thermoset composites," Additive Manufacturing, 2021, vol. 40, No. 101921, pp. 1-10.

Holthaus, M., "Short Glass Fiber Reinforced Composites Manufactured by Stereolithography," Master of Science Thesis, North Dakota State University of Agricultural and Applied Science, Nov. 2020, 94 pages.

Horn et al., "Overview of current additive manufacturing technologies and selected applications," Science Progress, 2012, vol. 95, No. 3, pp. 255-282.

Hu et al., "Manufacturing and 3D printing of continuous carbon fiber prepreg filament," Journal of Materials Science, Sep. 27, 2017, 12 pages.

Imeri et al., "Fatigue analysis of the fiber reinforced additively manufactured objects," The International Journal of Advanced Manufacturing Technology, Jul. 23, 2018, 8 pages.

Islam, Z., "3D Printing of Continuous Carbon Fiber Reinforced Thermoset Composites and Their Mechanical Characterization,"

(56) References Cited

OTHER PUBLICATIONS

Thesis Proposal, North Dakota State University of Agriculture and Applied Science, Apr. 2022, 47 pages.
Joshi et al., "3D printing in aerospace and its long-term sustainability," Virtual and Physical Prototyping, 2015, vol. 10, No. 4, pp. 175-185.
Justo et al., "Characterization of 3D printed long fibre reinforced composites," Composite Structures, 2018, vol. 185, pp. 537-548.
Latouche, M., "SLA 3D printing materials compared," HUBS, Retrieved on May 1, 2022, Retrieved from Internet: <https://www.hubs.com/knowledge-base/sla-3d-printing-materials-compared/>, 19 pages.
Levy et al., "Rapid Manufacturing and Rapid Tooling with Layer Manufacturing (LM) Technologies, State of the Art and Future Perspectives," CIRP Annals, 2003, vol. 52, No. 2, pp. 1-21.
Ligon et al., "Polymers for 3D Printing and Customized Additive Manufacturing," Chemical Reviews, 2017, vol. 117, pp. 10212-10290.
Llewellyn-Jones et al., "3D printed components with ultrasonically arranged microscale structure," Smart Materials and Structures, 2016, vol. 25, pp. 1-6.
LÜ et al., "Improvements of Mechanical Properties by Reinforcements," in: Laser-Induced Materials and Processes for Rapid Prototyping, 2021, Kluwer Academic Publishers, pp. 67-68.
Matsuzaki et al., "Three-dimensional printing of continuous-fiber composites by in-nozzle impregnation," Scientific Reports, 2016, vol. 6, No. 23058, pp. 1-7.
Mendes-Felipe et al., "State-of-the-Art and Future Challenges of UV Curable Polymer-Based Smart Materials for Printing Technologies," Advanced Materials Technology, 2019, No. 1800618, pp. 1-16.
Mueller et al., "Mechanical Properties of Interfaces in Inkjet 3D Printed Single- and Multi-Material Parts," 3D Printing and Additive Manufacturing, 2017, vol. 4, No. 4, pp. 193-199.
Mueller et al., "Mechanical properties of parts fabricated with inkjet 3D printing through efficient experimental design," Accepted Manuscript, Materials & Design, Jul. 14, 2015, 16 pages.
Ngo et al., "Additive manufacturing (3D printing): A review of materials, methods, applications and challenges," Composites Part B, 2018, vol. 143, pp. 172-196.
Ning et al., "Additive manufacturing of carbon fiber reinforced thermoplastic composites using fused deposition modeling," Composites Part B, 2015, vol. 80, pp. 369-378.
O'Connor et al., "Low pressure additive manufacturing of continuous fibre reinforced polymer composites," Polymer Composites, 2019, vol. 40, No. 11, pp. 1-18.
Prajapati et al., "Improved print quality in fused filament fabrication through localized dispensing of hot air around the deposited filament," Additive Manufacturing, 2021, vol. 40, No. 101917, pp. 1-9.
Rahman et al., "3D printing of continuous carbon fiber reinforced thermoset composites using UV curable resin," Polymer Composites, Aug. 3, 2021, pp. 5859-5868.
Rahman et al., "A Mechanical Performance Study of Dual Cured Thermoset Resin Systems 3D-Printed with Continuous Carbon Fiber Reinforcement," Polymers, 2023, vol. 15, No. 1384, pp. 1-19.
Rahman et al., "A Study of Layer-Wise Adaptive Resin Flow for Improved Surface Finish of 3D Printed Continuous Fiber Reinforced Composite," Society of the Advancement of Material Process Engineering, 2023, 12 pages.
Rahman, A., "Process Optimization of 3D Printing with Continuous Fiber Reinforced UV Curable Thermoset Resin," Master of Science Thesis, North Dakota State University of Agriculture and Applied Science, Jul. 2022, 94 pages.
Sano et al., "3D printing of discontinuous and continuous fibre composites using stereolithography," Additive Manufacturing, 2018, vol. 24, pp. 521-527.
Shukla et al., "Overview of Basic Chemistry of UV-Curing Technology," Oil and Paint Department, H.B. Technological Institute, Kanpur, India, pp. 1-32.
Simpson, P., "Additive Manufacturing of Short-Fiber Composites via Stereolithography," Master of Science Thesis, North Dakota State University of Agricultural and Applied Science, Dec. 2018, 180 pages.
Singh et al., "3D Printing of polymer composites: A short review," Jul. 1, 2019, Material Design & Processing Communications, 2020, vol. 2, No. e97, pp. 1-13.
Su et al., "History of 3D Printing," in: 3D Printing Applications in Cardiovascular Medicine, 2018, Elsevier Inc., pp. 1-10.

* cited by examiner

ADDITIVE MANUFACTURING SYSTEM INCORPORATED WITH ARTIFICIAL INTELLIGENCE

CROSS REFERENCE TO RELATED APPLICATIONS

This application claims priority under 35 U.S.C. § 119 to Provisional Application U.S. Ser. No. 63/366,744 filed on Jun. 21, 2022, which is herein incorporated by reference in its entirety, including without limitation, the specification, claims, and abstract, as well as any figures, tables, or examples thereof.

STATEMENT REGARDING FEDERALLY SPONSORED RESEARCH OR DEVELOPMENT

This invention was made with government support under Grant Number W911NF-19-2-0138, awarded by the United States Army Contracting Command (A.C.C.). The government has certain rights in the invention.

INCORPORATION BY REFERENCE

The document "Rahman, M. A.; Hall, E.; Gibbon, L.; Islam, M. Z.; Ulven, C. A.; La Scala, J. J. "A Mechanical Performance Study of Dual Cured Thermoset Resin Systems 3D-Printed with Continuous Carbon Fiber Reinforcement. Polymers 2023, 15, 1384" and the document entitled "3D PRINTING OF CONTINUOUS CARBON FIBER REINFORCED THERMOSET COMPOSITES AND THEIR MECHANICAL CHARACTERIZATION", which is a thesis proposal submitted to the Graduate Faculty of the North Dakota State University of Agriculture and Applied Science by Md Zahirul Islam, and the document "A STUDY OF LAYER-WISE ADAPTIVE RESIN FLOW FOR IMPROVED SURFACE FINISH OF 3D PRINTED CONTINUOUS FIBER REINFORCED COMPOSITE" M A Rahman, M Z Islam, L Gibbon, E Hall, C A Ulven" and the document "Process Optimization of 3D Printing with Continuous Fiber Reinforced U.V. Curable Thermoset Resin. and the document "which is a thesis proposal submitted to the Graduate Faculty of the North Dakota State University of Agriculture and Applied Science by Md Atikur Rahman and the document "M. A. Rahman, M. Z. Islam, L. Gibbon, C. A. Ulven, J. J. La Scala, Polym. Compos. 2021, 42(11), 5859 and document "A Study of Optical Surface Analysis Methods for 3D Printed Continuous Fiber Composites" Authors: Md Atikur Rahman, Arafat Bin Hossain, Md Zahirul Islam, Eric Hall, Luke Gibbon, Chad A. Ulven, John J LaScala and the document entitled "Incorporation of laser cutter during 3D printing of continuous carbon fiber reinforced thermoset composites". by Chad Ulven and dated Jul. 5, 2022 (unpublished) and all of these documents are filed herewith in attached Appendix and is incorporated by reference in its entirety, including the text, drawings, tables, list of references, and so forth.

TECHNICAL FIELD

This technology generally relates to composite printing and/or corresponding method of use/manufacture. More particularly, but not exclusively, this technology relates to a variable prepreg and semi-transparent applicator for additive manufacturing composites with artificial intelligence.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Additive manufacturing (AM), also known as 3D printing, offers much flexibility over conventional manufacturing processes. Traditional manufacturing techniques require a high volume of units to be produced for the product to be cost-effective. That is why one-off custom-design products are expensive when manufactured with traditional techniques. On the other hand, additive manufacturing deposits material to the part in a layer-by-layer fashion according to the computer-aided design (CAD). This manufacturing style offers an automated method of producing custom parts at a very low cost. Moreover, 3D printing technologies can manufacture parts with intricate designs and complex geometry. These capabilities of the additive manufacturing process are in a high-demand position in numerous industries.

3D printing methods can be broadly categorized depending on the materials used for manufacturing. Most 3D printing methods were first patented and commercialized during the 1980s and 1990s. The first 3D printing technology was patented in the form of Stereolithography (S.L.A.) in 1986. The S.L.A. technology uses U.V. light exposure on a photocurable thermosetting resin. Another variant of 3D printing with photocurable thermosetting resin is digital light processing (D.L.P.). In 1989 Stratasys introduced fused deposition modeling, which melts thermoplastic in a heated extrusion nozzle and lays the molten material according to the designed paths. These 3D printing technologies, utilizing polymer materials, are vastly adaptive in design geometries. However, 3D-printed products suffer from reduced mechanical properties (i.e., strength, elastic moduli, and toughness). Two major sources of these shortcomings are poor interlaminar adhesion and a limited number of 3D printable materials. The first 3D printed products were used for prototyping, design verification, and proof of idea. For these limited purposes, the inferior mechanical properties of the 3D-printed parts were initially acceptable. But over time, 3D printing has made its way into hundreds of applications, from consumer products, biomechanics, prosthetics, aerospace applications, and so on. The potential of this powerful technology is now held back due to its material properties.

3D printing with fiber reinforcement for improving mechanical performance has been attempted. Composite reinforcement in printed parts can be done using short fibers or long continuous fibers. Continuous fiber reinforcement favors the longitudinal properties of the parts compared to the parts with short fiber reinforcement. Fused deposition modeling (FDM) technology has seen the most development of fiber reinforcement in 3D printed parts. FDM printing can print with short and long fiber reinforcements. Modern technical literature reveals comparatively more work has been done to improve on short fiber reinforcements compared to long fiber reinforcements. Continuous fiber-reinforced composite offers greater mechanical properties, but 3D printing continuous fiber-reinforced composites are more challenging.

Some 3D printing methods are accomplished using electron beam-cured epoxy reinforced with continuous carbon fiber. However, these 3D-printed parts suffer from poor interlaminar adhesion.

Some other 3D printing methods utilize U.V. curable resin. For example, Inkjet 3D printing can accommodate high-resolution prints with multiple materials, but the increased viscosity due to reinforcement makes the resin difficult to push through the nozzle system.

Thus, there is a need for an apparatus that addresses the increased demand for enhanced materials usable with 3D printers and modern additive manufacturing processes. There also exists a need in the art for a solution to prepare the reinforcing tow by formulating a prepreg.

SUMMARY

One of the most significant advancements in material science in modern times is the advancement of composite materials. The composite approach of materials has facilitated the production of lightweight and high-performing components in many applications. Aerospace, automobile, prosthetics, and wind turbines are some sectors that have seen the huge incorporation of composite materials. Moreover, the mechanical properties of composite materials can be tailored within wide ranges. The tailoring ability of the mechanical properties of composite materials can be directional. The composite materials' improved performance, light weight, tailor ability, and directional anisotropy are all desirable traits for 3D printed components. Due to the combination of these potentials, along with all its challenges, 3D printing with composite materials is a sought-after technology in AM research.

Composite materials, depending on the size of reinforcement, can be broadly categorized into three major types: (i) particle reinforced; (ii) short fiber reinforced; and (iii) continuous fiber reinforced composites. These three types each have distinct pros and cons. Processing and manufacturing composites reinforced with short fiber are comparatively cheaper than continuous fiber-reinforced composites. Yet, continuous fiber-reinforced composite materials offer the highest mechanical properties and greatest control over the directional distribution of these properties compared to other composites.

Both short and continuous fiber-reinforced thermoplastics are studied with FDM 3D printers. For continuous fiber reinforcement in FDM printers, in-nozzle impregnation and pre-impregnation of polymers have been studied.

Stereolithography (S.L.A.) and digital light processing (D.L.P.) printers use U.V. curable resin systems for 3D printing. In both S.L.A. and D.L.P., U.V. light is projected on a flat surface of U.V. curable resin. Projection of the U.V. light on the liquid resin initiates a polymerization reaction and solidifies the resin at the spot of projection. A thin layer is cured, and then another layer of liquid resin is deposited on the previous layer. This process is repeated to build multiple layers.

Different aspects of short fiber reinforced S.L.A. and D.L.P. prints have been studied. Due to the random orientation of the fibers and low fiber volume fraction, short fiber reinforced thermoset S.L.A. prints are limited in mechanical properties. Some research thus far has focused on the alignment of short fibers in the printed body.

Both S.L.A. and D.L.P. have two orientations of build platform movement: "top-down" and "bottom-up." In the top-down approach, the build plate moves downwards, and liquid resin is deposited on top of the previous layers. U.V. light is projected from above directly on the resin. In the bottom-up approach, U.V. light is projected through a transparent hydrophobic surface. The liquid resin layer between the previous layers and the hydrophobic surface is cured when U.V. light is projected. The cured layer sticks to the previous layer or build plate but does not adhere to the hydrophobic transparent surface due to its low surface energy property. Some S.L.A. 3D printers use a silicone coating on transparent acrylic plastic for low surface energy purposes. Because both S.L.A. and D.L.P. print thermoset resins from a liquid resin V.A.T., short fiber reinforcement is easier to execute in these methods of 3D printing.

Principal components of the U.V. curable resin systems are oligomers, diluents (monomers), and photoinitiators. Common resin systems for these printing technologies are acrylate oligomers. Use of acrylate epoxy, acrylate urethanes, acrylate polyesters, polyether, and silicones as oligomers have been reported. Acrylates are heavily used in ultraviolet-cured 3D printing because of its high reactivity and very short reaction time of a fraction of seconds. Exposure of U.V. light in the resin energizes the photoinitiators, generating free radicals. These free radicals initiate the polymerization reaction between oligomers and monomers. The reaction zone depth depends on the resin type, laser power, and focus. After the printing, a little portion of liquid resin is left uncured in the printed body. To fully cure the part, the part is post-cured with further ultraviolet exposure for a prolonged period.

The following objects, features, advantages, aspects, and/or embodiments, are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of this technology to improve on or overcome the deficiencies in the art.

It is a further object, feature, and/or advantage of this technology to focus on improving 3D printing technologies with a photocurable thermosetting resin. More particularly, but not exclusively, it is a further object, feature, and/or advantage of this technology to develop a 3D printing technology that utilizes a U.V. curable thermosetting resin system reinforced with continuous fiber reinforcement. As a result, 3D printed objects resulting from said technologies comprise continuous fiber-reinforced thermosetting polymer composites.

It is a further object, feature, and/or advantage of this technology to preprocess to convert fiber tow to prepreg. For example, a prepreg-producing machine can pre-impregnate resin into fiber tow and partially cure the fiber tow.

It is a further object, feature, and/or advantage of this technology to build a 3D printer hardware and software that can print with continuous fiber-reinforced U.V. curable thermoset polymer.

It is still yet a further object, feature, and/or advantage of this technology to provide a more quality finish for 3D printed products, such as by providing smoother and more accurate dimensions.

It is still yet a further object, feature, and/or advantage of this technology to develop hardware and software for the 3D printer that can handle continuous fiber reinforcement.

It is still yet a further object, feature, and/or advantage of this technology to utilize different dispensing nozzle sizes and shapes. Such differentiated use of nozzles can help alter and/or optimize print performance. In some embodiments, an applicator is shaped to push fibers as close together as possible.

It is still yet a further object, feature, and/or advantage of this technology to study and/or test print parameters, such as by characterizing and/or quantifying data related to printed parts and printing materials using one or more of the beneficial methods described herein. Printing process parameters, such as line spacing, resin flow rate, and print speed for each nozzle configuration, can be optimized through repeated experimental use and an automated heuristic that intelligently learns from repeated experimental use.

It is still yet a further object, feature, and/or advantage of this technology to optimize and balance printing process parameters.

The 3D printers disclosed herein, and novel features associated with same can be used in a wide variety of applications. For example, 3D printed objects can include almost any useful object, including but not limited to: medical devices; components for machines that harness renewable energy, such as wind turbine blades that can harness wind energy;

It is preferred the apparatus be safe, cost-effective, and durable. For example, the 3D printer and its components can be adapted to resist excessive heat, static buildup, corrosion, and/or mechanical failures (e.g., cracking, crumbling, shearing, creeping) due to excessive impacts and/or prolonged exposure to tensile and/or compressive forces acting on the apparatus. In another example, the mechanical control elements for a low-cost 3D printer can be built utilizing existing lab components. X and Y movement arms can be formed from an already existing gantry system. Z platform movement can be constructed by using a modified lab jack.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which this technology can be practiced are illustrated and described in detail, wherein like reference characters represent like components throughout the several views. The drawings are presented for exemplary purposes and may not be to scale unless otherwise indicated.

FIG. 28 FIG. 13(*a*) displays flexural strength, FIG. 13(*b*) displays flexural modulus and FIG. 13(*c*) displays flexural strain of the composites.

An artisan of ordinary skill in the art need not view, within the isolated figure(s), the near infinite number of distinct permutations of features described in the following detailed description to facilitate an understanding of this technology.

DETAILED DESCRIPTION

The present disclosure is not to be limited to that described herein. Mechanical, electrical, chemical, procedural, and/or other changes can be made without departing from the spirit and scope of this technology. Unless otherwise indicated, no features shown or described are essential to permit basic operation of this technology.

Figure 1:
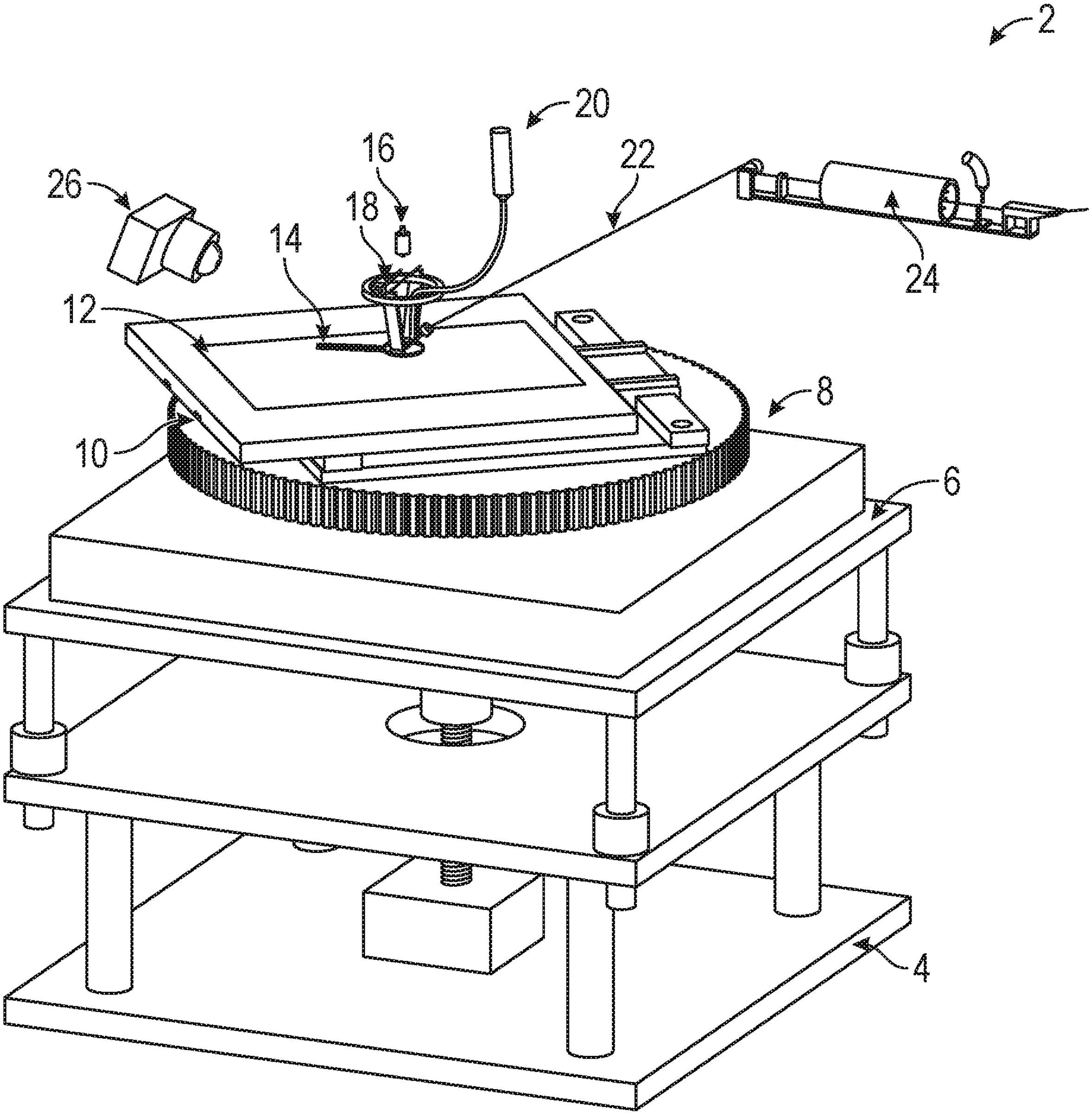
FIG. 1 shows a perspective view of a continuous fiber-reinforced composite 3D printer.

Referring now to FIG. 1, a perspective schematic of the components of the proposed 3D printing equipment is generally indicated by numeral 2. There are four moving axes. In addition to the X, Y, and Z movement, it has a rotary movement around the Z axis. The rotary platform 8 is positioned between the Z platform 6 and the X-Y build platform 10. The X-Y build platform 10 is mounted on a base 4 and has embedded magnets to hold the build plate 12 flat on the build platform 10. The reinforcing fiber tow 30 first goes through the prepreg forming equipment 24, as shown in FIG. 3, before entering the print head 18. In the prepreg forming equipment 24, the fiber tow 30 is pre-impregnated with liquid resin from the resin drive 20 and partially cured. Then at the printer nozzle 21 (shown in FIGS. 2 and 4), located at the print head 18, the prepreg 22 is recoated with liquid resin and dispensed on the build plate 12 to form a manufactured composite 14.

Figure 2:
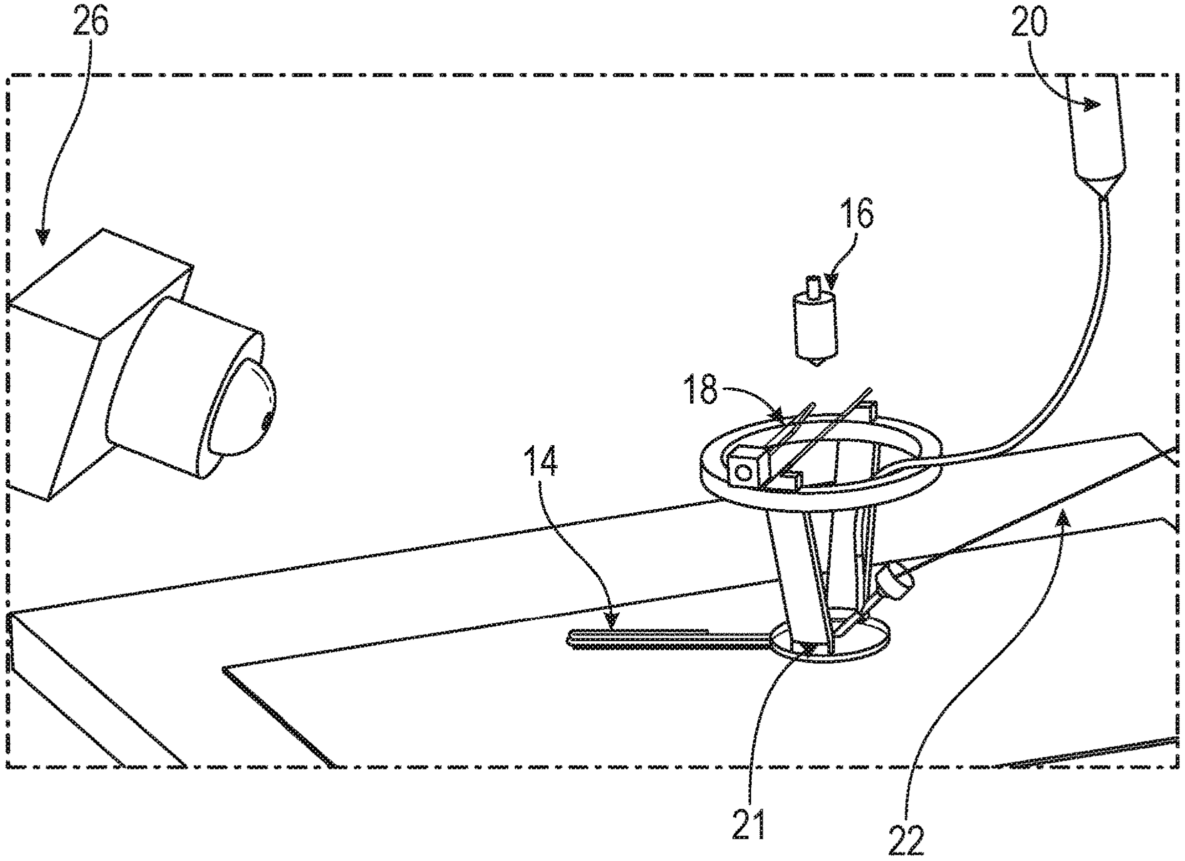
FIG. 2 is a close-up enlarged view of the printhead assembly shown in FIG. 1.
Figure 3:
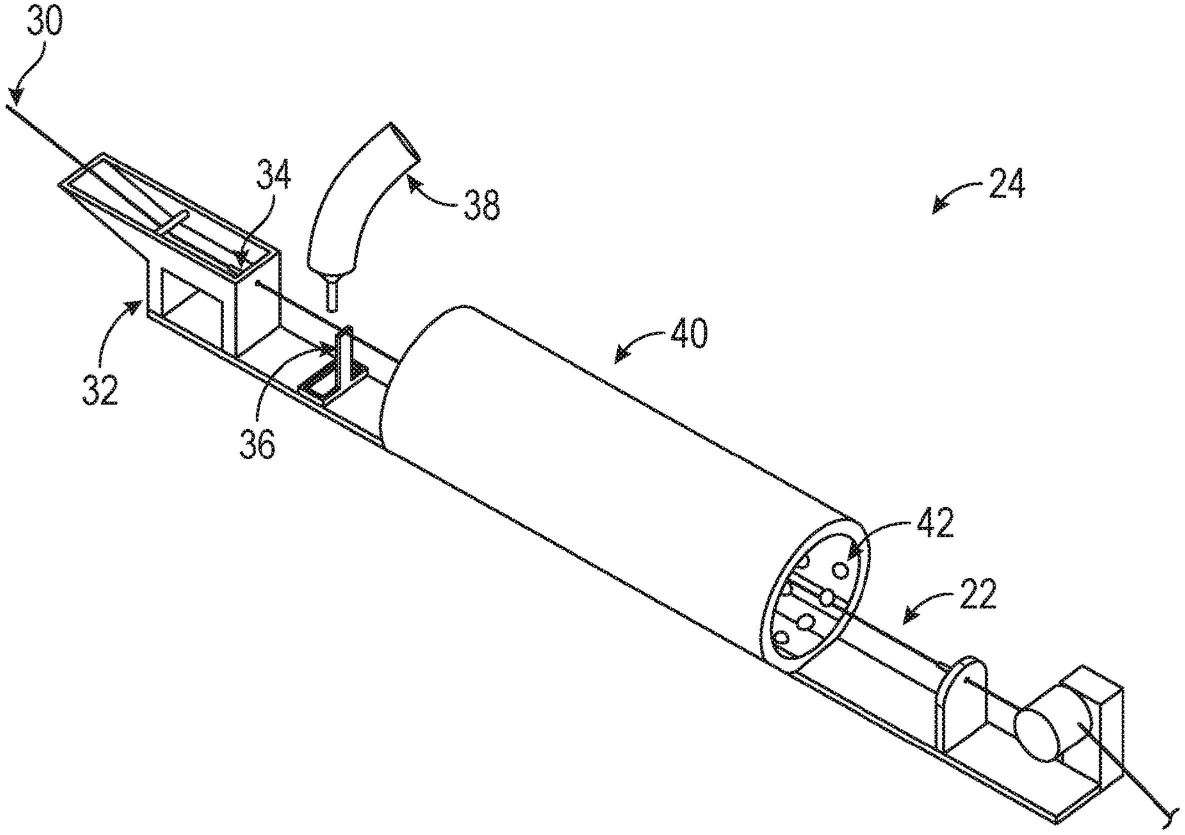
FIG. 3 is a perspective view of a prepreg production assembly.
Figure 4:
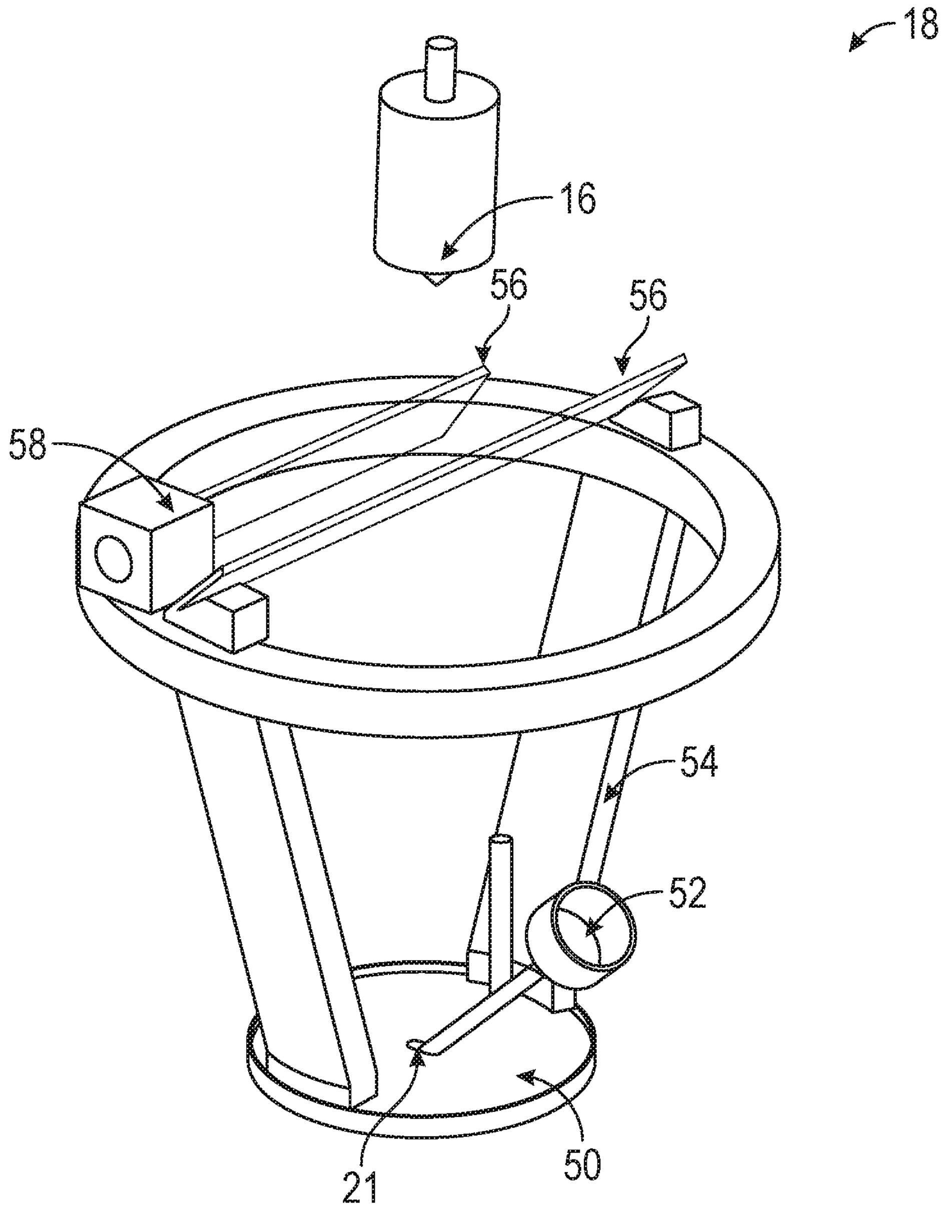
FIG. 4 is a close-up view of the printhead shown in FIG. 2.

FIG. 2 shows the components of the print head 18, camera 26, and build plate 12. This is an enlarged view of FIG. 1. The laser 16 is located at the top of the print head 18 (details of the components of the print head are shown in FIG. 4). The laser beam from the laser 16 is directed onto the dispensed fiber-resin mix by the movable mirrors 56. The camera 26 captures surface images of the print. These images are analyzed with machine learning algorithms to create a 3D map of the surface profile.

FIG. 3 shows the components of prepreg forming equipment 24. The fiber tow 30 is run through the resin bath 32 for resin impregnation into the fiber tow 30. Then the impregnated fiber runs through the limiting nozzle 34 and the excess scrapper 36. The excess resin droplets are blown off by the air blower 38. The pre-impregnated fiber tow 30 is partially cured by ultraviolet ("U.V.") exposure in the curing chamber 40. The curing chamber 40 has cylindrically arranged U.V. Light Emitting Diodes (L.E.D.s) 42. At curing chamber 40, the liquid resin in the impregnated tow is partially cured, and prepreg 22 is formed.

FIG. 4 shows the components of the print head 18. The laser 16 is mounted at the top of the print head 18. A laser beam from laser 16 is exposed onto the dispensed resin fiber mix through a semi-transparent applicator 50. The laser beam's direction adjustment is achieved by controlling the orientation of the movable mirrors 56. The movements of the movable mirrors 56 are controlled by utilizing a Galvano drive 58. Prepreg 22 has a prepreg entry 52, and liquid resin has a resin entry 54 to the printer nozzle 21. Inside the printer nozzle 21, the prepreg 22 is reimpregnated, coated with liquid resin, and then dispensed through an outlet port (not shown) located underneath the applicator 50.

Figure 5:
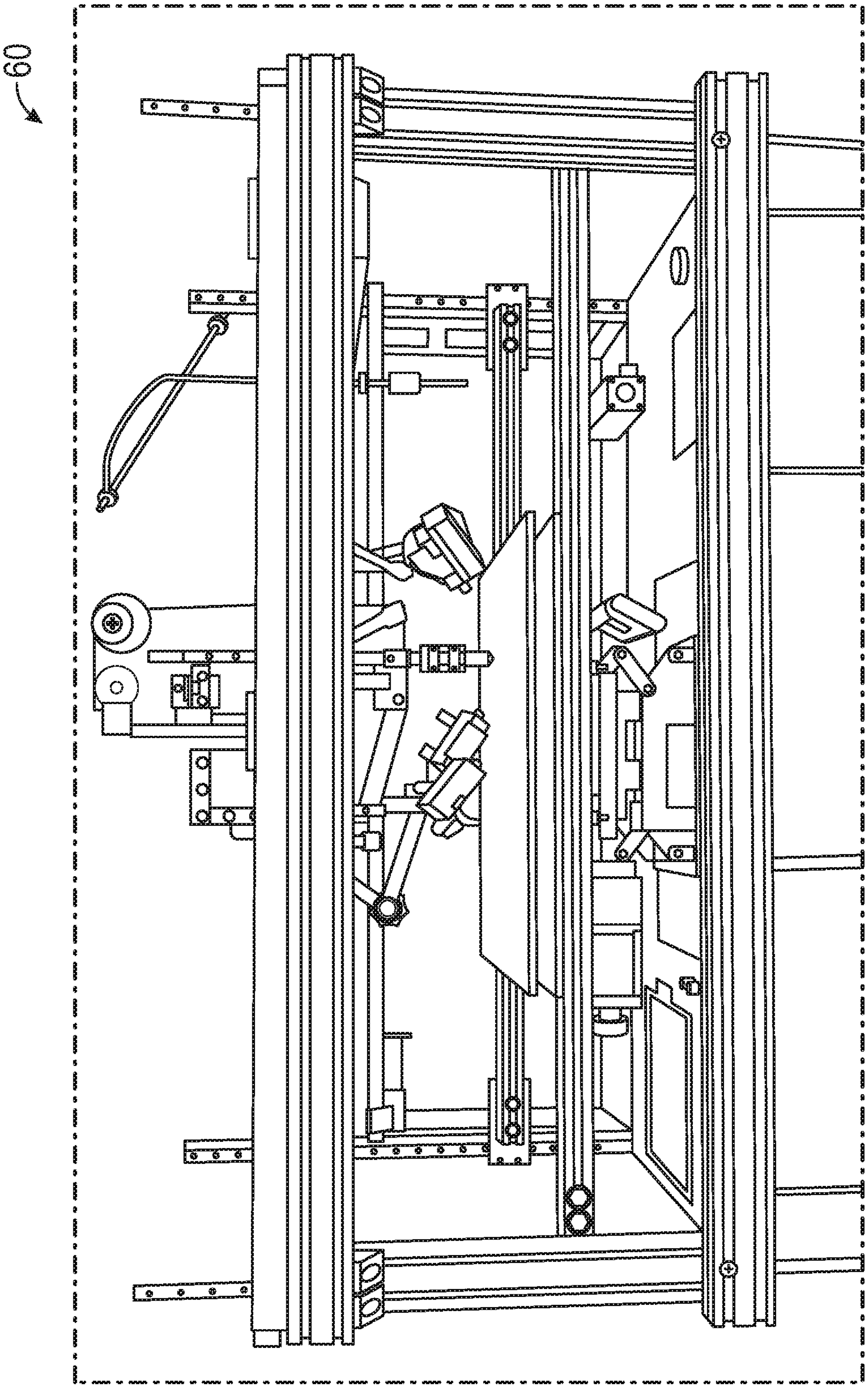
FIG. 5 is an axis-controlled composite additive manufacturing equipment.

As shown in FIG. 5, the gantry system from a generic robot can be utilized for the composite 3D printer 60 and includes a movable X-Y-Z gantry. The print head 18, as shown in FIG. 4, was controlled using an ARDUINO® Mega 2560 stepper motor. ARDUINO® is a registered trademark of Arduino SA Société Anonyme (S.A.) Switzerland, Corso San Gottardo, 6A Chiasso Switzerland 6830.

In view of the concepts described previously above in relation to FIGS. 1-4, there is a print bed that was constructed by clamping a fixed aluminum plate in the gantry system. A print nozzle was designed and manufactured to feed continuous carbon fiber through the nozzle as the resin flowed from a resin pump. The fiber was pulled through the nozzle due to gantry motion. As a result, the resin-soaked and impregnated the fiber as they flowed through the printer nozzle 21 together. Two 405 nm and 105 mW violet light dot lasers (Jolooyo®, Wuhan, China) were focused on the back side of the nozzle travel to cure the wetout fiber. Jolooyo® is a federally registered trademark of Wuhan Jingluyao Trading Co., Ltd., having a place of business at Rm. 101, Unit K, Bldg. K, Mengyin First District, Jindi Green Town, Hongshan Dist., Wuhan, Hubei China 430070.

These lasers were situated on either side of the print head and were powered alternatively based on the direction of printing. FIG. 5 shows the developed L.D.M. 3D printer capable of printing continuous fiber-reinforced thermoset composite. The layer thickness of the printed specimen varied locally with the resin flow rate. The initial gap between printer nozzle 21 and build plate 12 was set to 0.45 mm (as shown in FIG. 1). With each layer, the gap increased by 0.45 mm. The spacing between adjacent print lines was set at 1 mm. The X-Y build platform 10 moves in the Z direction, and the printer nozzle 21 moves in X and Y directions. The build platform sits on a modified lab jack.

Using the composite 3D printer 60 of FIG. 5 or the continuous fiber reinforced composite 3D printer of FIG. 1, the resin reacts and solidifies when a beam of laser 16 hits the liquid resin. Table 1 shows the comparative mechanical properties of currently commercially available U.V. curable S.L.A. resin systems. These properties of the final product can still vary depending upon several process parameters, i.e., U.V. spot focus diameter, U.V. light intensity, exposure time, layer thickness, temperature, inclusion or modification of resin system, and post-processing parameters. Although the properties are variable, the final printed parts are largely brittle and have lower mechanical strength compared to traditional injection molded parts.

TABLE 1

Properties of S.L.A. resins

| | | | | | |
|---|---|---|---|---|---|
| Tensile Strength (MPa) | 65.0 | 55.7 | 31.8 | 51.1 | 75.2 |
| Tensile Modulus (Gpa) | 2.8 | 2.8 | 1.26 | 3.6 | 4.10 |
| Flexural Modulus (Gpa) | 2.2 | 1.6 | 0.82 | 3.3 | 3.7 |
| Elongation at break (%) | 6.2 | 24 | 49 | 2.0 | 5.6 |
| IZOD Impact Strength (J/m) | 25 | 38 | 109 | 14 | N/A |
| Tensile Strength (Mpa) | 65.0 | 55.7 | 31.8 | 51.1 | 75.2 |

The solidification process results in shrinkage and warpage of the printed parts. The resin tends to occasionally form irregular clumps, which are eventually solidified by the laser beam. When the printing path has a 180° turn, the fiber tends to bend upward, resulting in bumps at the top surface of the printed layers.

As shown in FIGS. 1-4, these circumstances can lead to occasional interference between the printed parts' top surface of a manufactured composite 14 and the printer nozzle 21. This interference can damage or snap the continuous fiber tow. To tackle this issue, the print head 18 is positioned under a preloaded vertical spring (not shown). This modification around the traditional printing setup allows the printer nozzle 21 to adapt and move over the irregularities in the printed surface.

The build plate 12 for this printer needs to be flexible for releasing printed parts in undamaged condition. The build plate 12 needs to have adhesion to cured resins. It requires flexibility for the release of printed parts; at the same time, it should hold its flat shape while printing. For this, flexible stainless steel is used as the build plate 12. This build plate 12 is magnetically held flat to the rotary platform 8.

Figure 6:
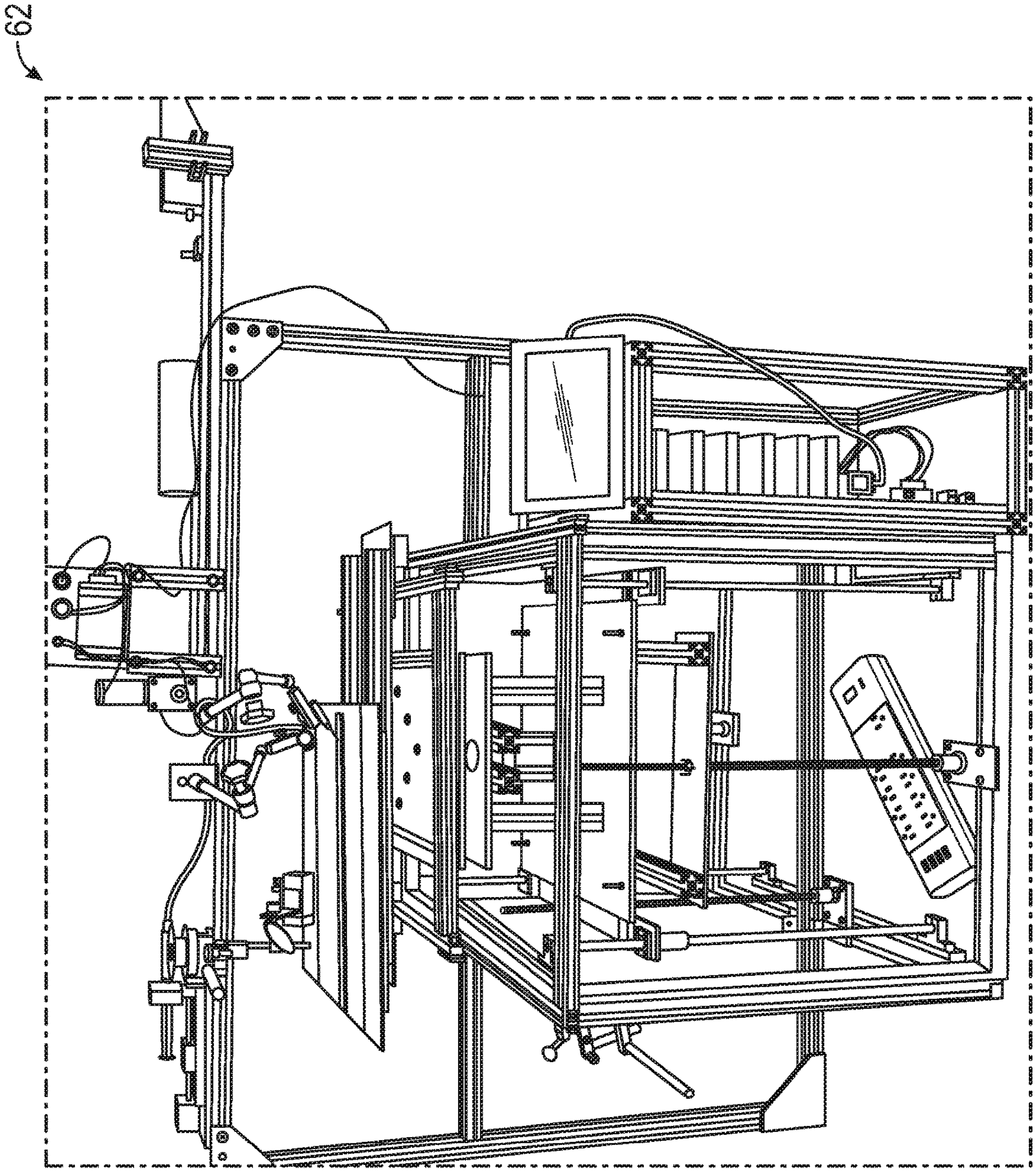
FIG. 6 shows a prototype of additive manufacturing equipment.

The composite 3D printer 62 control circuit was built based on an ARDUINO® controller. The print can pause within the print, and z height can be adjusted at any time during the process. This feature enables manually resetting the damaged or snapped fiber tow 30 through the printer nozzle 21. If a fiber tow 30 snaps in the middle of the process, printer 60 or 2 is paused, and build plate 12 is lowered. The fiber tow 30 is then manually run through the printer nozzle 21, and the print is resumed. The controls make possible the ability to tune every printing parameter as needed. A complete prototype system of additive manufacturing equipment is indicated by the numeral 62 in FIG. 6.

Figure 7:
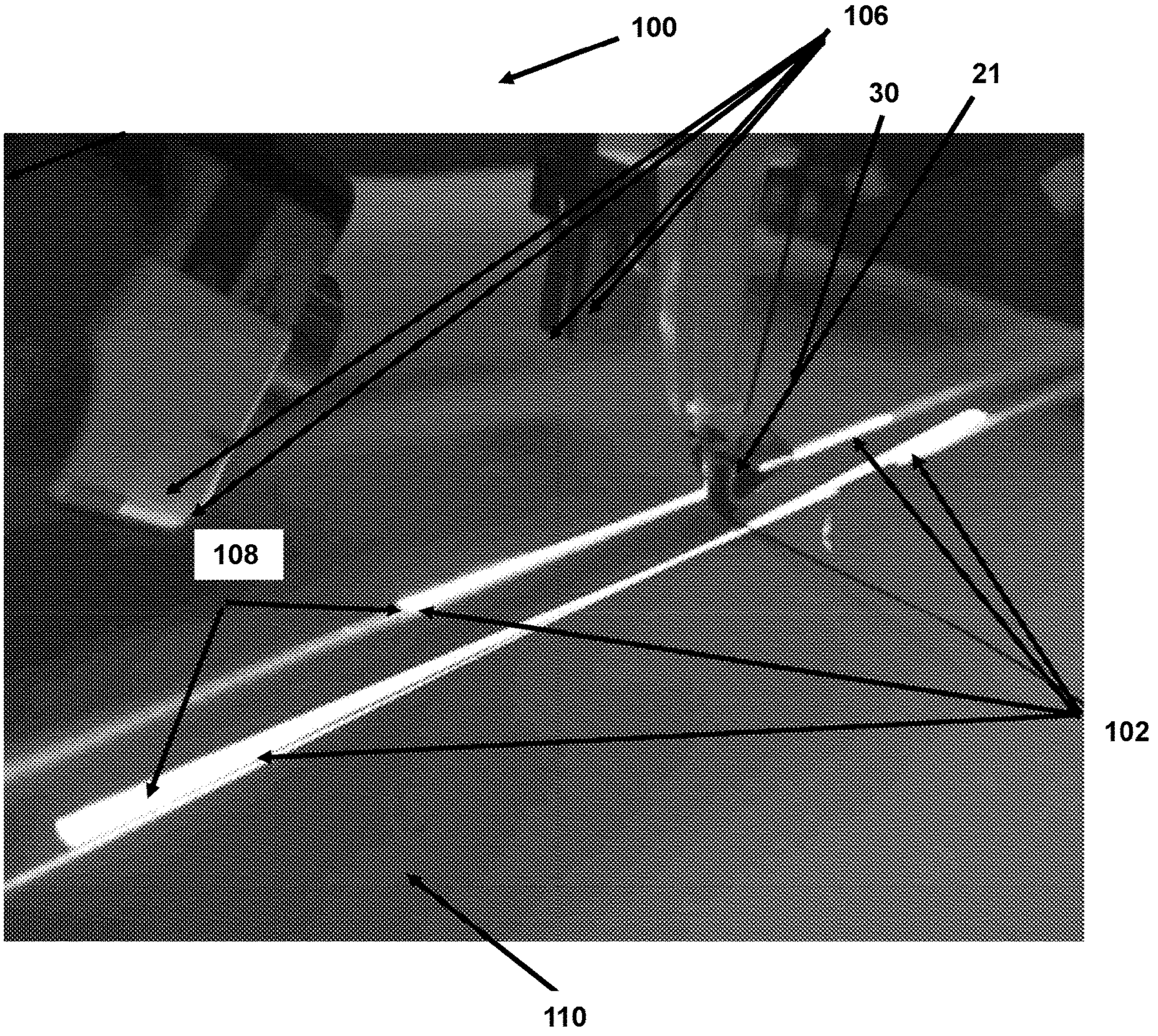
FIG. 7 exemplifies laser positioning in the 3D printer of FIG. 1. More particularly, four lasers are each focused as a straight line. ±x directions have two overlapping U.V. lines. Laser exposure from each side negates the shadow cast by the opaque fibers.

Referring now to FIG. 7, a laser system 100 emitting laser beams 102 onto a resin 108 is shown. The printer head 21 has multiple lasers, e.g., four, 106 (two in each direction) attached thereto. By way of example, each laser 106 can be a 150 mW, 405 nm wavelength U.V. laser (Brand: F-Yi, 405 nm 150 mW). The lasers 106 can be projected at points a little offset (1-4 mm) from the outlet of printer nozzle 21.

Continuous carbon fiber-reinforced thermoset composites have superior mechanical strength and thermal stability. Conventional manufacturing of those composites requires expensive molds and has less design flexibility. 3D printing of those composites is very demanding as it provides extensive design flexibility. However, 3D printing of continuous carbon fiber reinforced thermoset composites is facing a significant problem in printing custom objects due to the fiber loop (during a 180-degree turn) at the corner of the printing. During the printing, a curve line with continuous fiber, undulation, twisting, and pealing from the bed occurs in the fiber filament. We propose a layer-by-layer laser cut based on CAD design after each layer of 3D printing to create custom objects using an in-nozzle impregnation-based 3D printing process.

Moreover, we demonstrated a custom object printed using this process. A demonstrated process enables producing complex features without having curved lines. Furthermore, intermittent line-by-line laser cuts might ensure smoother printing. In our study, we used U.V. laser irradiation to instantly cure resin-impregnated fiber on the print bed. However, irrespective of resin type and curing process, this laser cut-based layer object manufacturing (L.O.M.) process will revolutionize direct ink writing (D.I.W.) based 3D printing continuous fiber reinforced composites.

Figure 18:
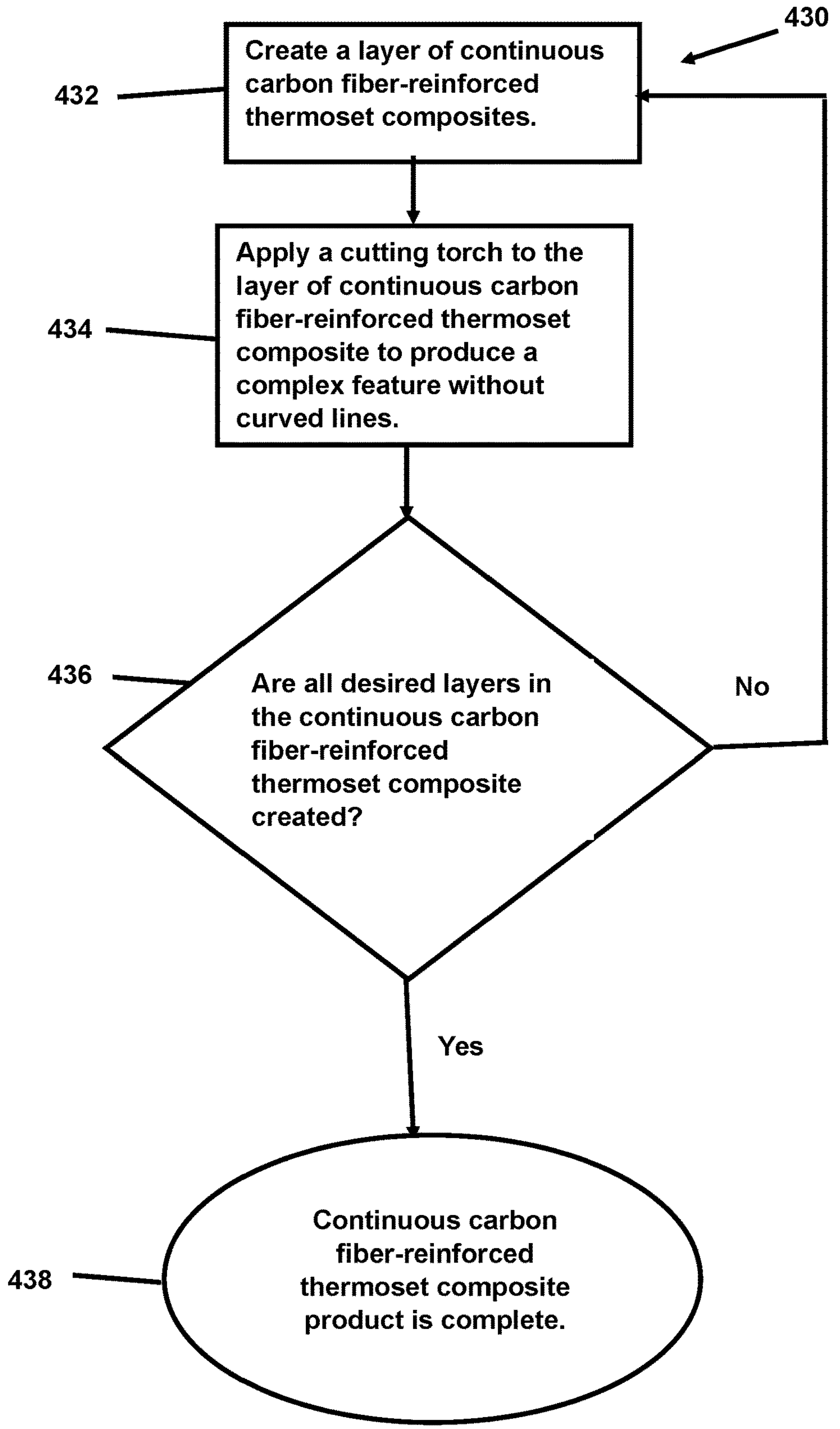
FIG. 18 shows a flowchart of the process of laser cutting layers of carbon fiber-reinforced thermoset composite.

Referring now to FIG. 18, the process of laser cutting layers of carbon fiber reinforced thermoset composite, as recited above, is generally indicated by numeral 430. The first step is to create a layer of continuous carbon fiber-reinforced thermoset composite <432>. The next step is to apply a cutting torch to the layer of continuous carbon fiber-reinforced thermoset composite to produce a complex feature without curved lines <434>. A determination is then made if all of the desired layers in the continuous carbon fiber-reinforced thermoset composite are created <436>. If the answer is negative, then the process returns to step <432>. If the answer is affirmative, then the continuous carbon fiber-reinforced thermoset composite product is complete <438>.

The print speed is tuned so the resin 108 has enough time to gel. The timing varies with the amount of resin 108 and, thus, the size of the printer nozzle 21. Laser focusing is very important in this printing process. If the laser spot and positioning are not matched up well, the scattered U.V. rays can cure up resin at the printer nozzle 21 and cause snapping of the continuous fiber tow 30. This can be remedied by putting the at least one laser 106 away from the printer nozzle 21. However, this adversely affects the resolution of the print and the capability of making quality 180° turns at the end of each line. For these reasons, line focusing can be selected for the lasers 106 instead of dot focusing. The offset of laser lines from the printer nozzle 21 is set at 3 millimeters for the current configuration. The offset value can be further optimized through trial and error. One such optimization involves the adoption of a computerized heuristic.

The resin 108 and the pre-impregnated fiber tow 30 are pulled out together through the printer nozzle 21. The resin 108 is dispensed by an onboard syringe pump (not shown). The fiber tow 30 runs through the printer nozzle 21 and adheres onto a print bed 110. The prepreg 22 is pulled, through the printer nozzle 21, due to the movement of the printer nozzle 21. The resin flow rate is matched with the print speed.

The printer nozzle 21 allows for movement with respect to an additional rotational axis than the arms of other 3D printers known in the art. More particularly, the printer nozzle 21 can alter the angle at which a product is applied by either spinning and/or altering the pitch of the arm. There is generally no advantage to being able to twist the arm. Instead, there is an advantage to restricting rotational movement with respect to the twisting axis as much as possible. Combined with the translational movement that the print bed 110 and printer nozzle 21 also allow, the arms can move with five degrees of freedom and are prevented from moving with six degrees of freedom.

The geometry and size of the printer nozzle 21 can be a very important aspects of the design. Two types of printer nozzles 21 were tested for the 3D printing purposes described herein. 3D printed nozzles were used for composite printing (blunt end metal syringe tip needle and S.L.A. printed nozzle) and using a FORMLABS® 3D printer (Model: Form 2, Somerville, MA, U.S.A., Resin type: clear & tough 2000). FORMLABS® is a federally registered trademark of Formlabs Inc., having a place of business at 35 Medford St., Suite 201, Somerville, Massachusetts 02143

The print head 18 has two entries—one for resin 54 and the other for the prepreg 52; as shown in FIG. 4, Fiber and resin come out together through the printer nozzle 21. As the resin is pushed into the printer nozzle 21, the excess resin can exit through the prepreg entry 52, which can cause overflow and nozzle damage. As the fiber tow 30 moves vertically through the printer nozzle 21 and the print lines are horizontal, there is a sharp turn at the tip of the printer nozzle 21. The tow experiences drag and shear at this right-angled turn. When a blunt metal syringe tip (not shown) is used, the fiber tow 30 frays at the tip, and the frayed fibrils clog the printer nozzle 21. The tips of 3D printer nozzles 21 with specifically designed rounded tips are used to get a smoother flow of fiber tow 30. The size of the printer nozzle 21 and the resin 108 that flows through the printer nozzle 21 can be varied in this research, and the print performance of the varied parameters is evaluated.

The total length of the fiber resin mixing chamber inside the printer nozzle 21 is a few millimeters. Good load transfer between the fiber and matrix resulted from pre-impregnating the fiber tow 30 with liquid resin. Impregnation in the printer nozzle 21 can suffer from improper and inconsistent impregnation of fiber tow 30 with resin. The filaments are loosely tied in the fiber tow 30, and the fibrils fray easily in the printer nozzle 21, which can lead to clogging or snapping of the fiber tow 30. To avoid these issues, the fiber tow 30 can be pre-impregnated with resin and partially cured in a different machine.

There is a wide variety of methodologies for creating a prepreg. One illustrative, but nonlimiting methodology is disclosed in Provisional Application U.S. Ser. No. 63/366,744 filed on Jun. 21, 2022

Figure 8A:
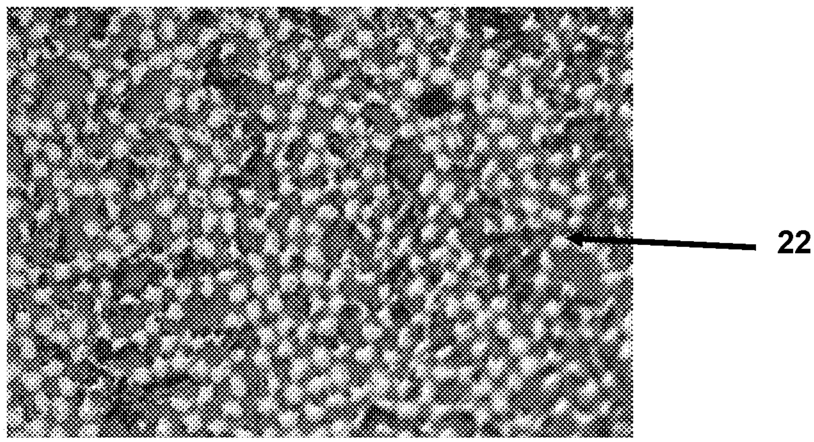
FIGS. 8*a* and 8*b* show a microscopic image of prepreg, as generated by a KEYENCE® VHX microscope. Light circles are individual fiber filaments. The dark zone is the matrix material. The black dots are polishing imperfections.
Figure 8B:
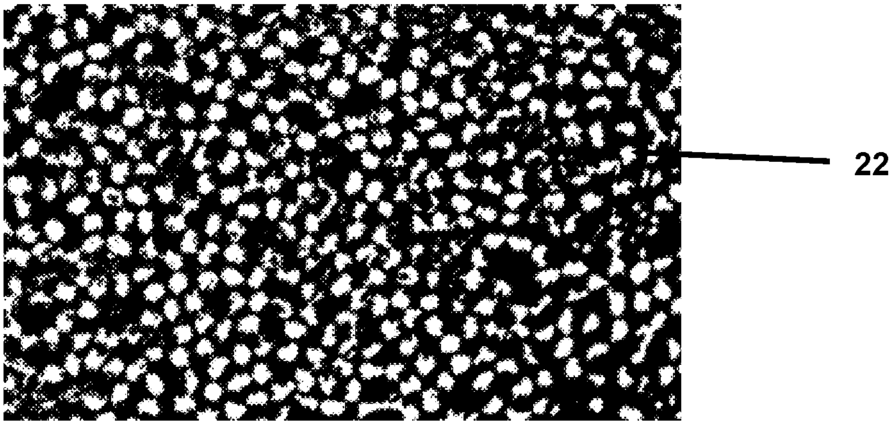

The composition of the prepreg 22 was investigated by using a KEYENCE® microscope (Keyence VHX-S750E). KEYENCE® is a federally registered trademark of the Keyence Corporation, having a place of business at 1-3-14, Higashinakajima, Higashiyodogawa Osaka JAPAN 533-0033. The spool of prepreg 22 was fully cured by postcuring in elevated temperature (130° C. for 6 hours). Then the spool's cross-section was investigated under the microscope, as shown in FIGS. 8*a* and 8*b*. The microscopic image of the fiber volume fraction (e.g., 10-30%) of the prepreg 22 can be determined by image processing.

The printer 2 or 60 and prepreg 22 setup, constructed here, are adjustable for different materials. The printer 2, 60 can print with a range of fiber tows 30 such as carbon fiber, Kevlar, natural fiber, and so forth. Printer 2 or 60 can also work with different tow counts. In the present disclosure, 1K carbon fiber tows from two different manufacturers: Toray (Type T300, Filaments 1000-40A, ToraryCA, Washington, U.S.A.) and Teijin (Tenax-J, Grade HTA40 E15 1 k 67TEX 15S, Tokyo, Japan) are used. Both fiber tows are 1K but the difference in twist count and the sizing around the filaments. Teijin fiber has a slightly higher twist count compared to that of Toray. Teijin fibers have fifteen twists per meter, while Toray fibers have twenty twists per meter. Teijin fibers have tensile strength=4100 MPa, tensile modulus=240 GPa, and elongation=1.7%. Alternatively, Toray fibers have tensile strength=3530 MPa, tensile modulus=230 GPa, and elongation=1.5%. In some embodiments made with these fibers, 3D-printed products can withstand pressures of at least 60 GPa.

A wide variety of thermoset resins can be used with this technology. A common method of producing thermoset polymers via reactive additive manufacturing is accomplished by utilizing photosensitive polymers. Photosensitive polymers, or photopolymers, are polymers that change physical properties when exposed to U.V. light. The advantages of U.V. cured reactive resins in vat-based photopolymerization techniques are accuracy and surface finish. Given that laser irradiance depth and scan patterns have been optimized, the layer height of stereolithography apparatus ("S.L.A.") systems can be as small as 25 microns to allow for excellent surface finish and part accuracy by reducing the gradient between steps. S.L.A. is a liquid-based process that consists of curing a photosensitive polymer.

A UV curable resin 108, shown in FIG. 7 from Peopoly (type: clear, Peopoly, California, U.S.A.) was used as a matrix material. This is an Acrylic based resin. The chemical composition of this resin is 20-30% Urethane Acrylate, 30-70% Acrylic monomer, and less than 5% photoinitiators. The resin system cures at an exposure of 405 nm wavelength light. When cured, the density of this Peopoly clear resin is 1.14 g/cm$^3$. The viscosity of this resin at 25° C. is 550-600 cps. When cured, the mechanical properties of this neat Peopoly resin are as follows: tensile strength=62 MPa, tensile modulus=1 GPa, elongation at break=9% strain. The U.V. curable resin from Peopoly does not cure appreciably with the addition of thermal energy. This led to the introduction of a thermal initiator to the Peopoly resin to reach a higher degree of matrix cure with additional heating. Luperox P can be mixed with Peopoly clear resin at 2% by weight for this research for all processing steps. The Peopoly resin and Luperox P (tert-butyl peroxybenzoate 98%, Sigma-Aldrich Saint Louis, Missouri) are mixed in a centrifugal mixer (e.g., Hauschild Engineering, Model: HAUSCHILD SPEEDMIXER®, Type: DAC-150 FVZ, Water camp, Germany) using 1500 RPM for 2 minutes. HAUSCHILD SPEEDMIXER® is a federally registered trademark of Hauschild & Co K.G., having a place of business at Waterkamp 1 59075 Hamm, Federal Republic of Germany.

Then the mixture is degassed in a vacuum chamber (e.g., Sheldon Manufacturing Inc, Model: 1415M, Cornelius, Oregon) for 15 mins using −20 psi. Many groups of reactive resins exist, some of which are epoxy functional resins, phenolic resins, and polyurethane resins. Epoxy functional resins are crosslinked by mixing the epoxy with curing agents. An oligomer containing two or more epoxide groups makes up the epoxy side. The curing agent or hardener is usually an amine or diacid compound. Epoxy resins are used for many processes, but one process known as Vacuunl Assisted Resin Transfer Molding (VARTM) is a low-cost method to create large composite specimens. VARTM is a liquid composite molding technique that pulls resin through a fiber layup section by using a vacuum to assist in resin transfer through the part. Given that an epoxy resin can have a longer pot life than other polymers, it is used in this process to allow the resin to wet out the fiber layup before gelation.

Epoxy is used in many other processes and industries, including adhesives, wind turbine composites, and high-performance vehicle applications. Epoxy adhesives, commonly referred to as structural adhesives, have high-strength bonds and are used in repairs or construction of bicycles, golf clubs, snowboards, and many more. Epoxy resin has been used to create complex parts via reactive extrusion additive manufacturing. For example, EPON® 8111 epoxy resin from HEXION® cab is mixed with EPIKURE 3271 curing agent also from Hexion Inc., with a volumetric mix ratio of 4:1. Both EPON® 8111 and HEXION® are federally registered trademarks of Hexioin Inc., having a place of business at 80 East Broad Street, Columbus Ohio 43215. Fumed silica by E.K. Industries Inc.®, C.A.S. No. 112945-52-5 was added at 3.5% by weight to increase the viscosity of the resulting resin. The gel time for this epoxy was 1 minute which helped support additional layers without much deformation. A cool-down period was required before removing parts from the bed because the resin featured an exothelmic polymerization reaction. Specimens were created by a 6-layer high specimen that was then cut to size along parallel or perpendicular orientation to the raster direction. The specimens were cut and surfaced using a C.N.C. milling machine.

Phenolic resins result from the reaction of formaldehyde and phenol and are the first genuinely synthetic commercially available plastic resin. Like many other polymers, phenolic resins have a wide range of applications, some of which include ballistics, mass transit, and electronics. Phenolic resins have low thermal conductivity, low density, and a high strength-to-weight ratio, among other things. When phenolic resin is combined with aramid fibers, it creates a strong and tough composite with high impact resistance making it great for ballistic protection applications Mass transit vehicles, buses, and trains, have strict fire safety requirements making the phenolic neoprene polymer blend a good candidate for use in the mass transit industry.

Additive manufacturing has been completed using phenolic resins. An example is silicon carbide combined with phenolic resin that is extruded in an FDM-style 3D printer. Without fillers, phenolic resins are prone to shrinkage and brittleness. To cure the specimens' heat flow from the bed and increase the heated bed's effectiveness, the resin system's thermal conductivity was of interest. The volume fraction of silicon carbide used was 53%, and water was also added to reduce the viscosity as it was too high to dispense. The dispense method was performed via a displacement pump on a syringe. The 3D printer was able to produce spiraled hollow geometry that allowed for the use of other heaters to help cure the part.

Finally, polyurethanes, which are formed by reaction between isocyanate and polyols. The reaction to produce polyurethanes can occur by mixing the two reactants that form a urethane linkage. A benefit of polyurethanes is that it is not a condensation polymerization which would generate water. Polyurethanes can be tailored for specific mechanical properties. Generally, they are elastic materials with high toughness. However, polyurethanes can be adjusted from high elongation and high energy absorption to have a high elastic modulus and high strength. The mechanical properties can be adjusted by changing the aromatic content of the monomers within the urethane. Polyurethanes and polyureas have similar components. Polyurethanes are created by combining isocyanates and polyols. In comparison, polyureas are created by combining isocyanate with multifunctional amines.

Additionally, a hybrid of these two polymers can be created by combining isocyanate with a mixture of polyol and amino groups to provide a blend of characteristics. There are a variety of polyureas with gel times from as low as five seconds to up to nine minutes. Additionally, the polyurea was 100% solid and cured at room temperature, with no postcuring necessary. Polyurethane acrylate ink has been used with magnetically responsive particles. A two-component mixer and dispenser were integrated into a 3D printing gantry system. The printer was able to create complex helical structures an1ong other geometry.

The polymer can be mixed in different ways, such as impingement, dynamic, and static mixing. Impingement mixing is where two high-velocity streams collide with one another and mix during the turbulent flow. Impingement mixing provides a homogenous mix but requires a high velocity between the two fluids, which can increase the capital equipment cost. Dynamic mixing can consist of a paddle and a motor. The motor drives the paddle and mixes the polymer. Dynamic mixing can provide a homogenous mixture of high-viscosity systems; however, it is an expensive option, especially for large-scale projects. Static mixing has a low cost because it contains no moving parts and only requires an inline mixer. However, additional costs come from flow metering equipment to control the volume dispensed. The mixer consists of a certain number of elements that create laminar flow and produce irregular paths for the fluids.

Static mixing has many advantages, and some include flow, cure, and cost. Static mixing can be used for high-viscosity fluids when other mixing options are not applicable. Static mixing does not require high fluid velocity because the mix design consists of mixing elements that are offset 90° from the previous element. This offset disrupts the path of the fluid and causes both fluids to fold over one another until they are homogeneously mixed. Preferably, but not necessarily, a helical static mix rod that features mi4xing elements in a 101.6 mm section can be utilized.

Volumetric dosing pumps are used in a variety of industries, such as medical technology, adhesives, soldering pastes, cosmetics, and the food industry. Volumetric dosing pumps utilize a progressive cavity pump, which consists of fluid passing through a small sequence of shapes as a rotor is turned. Two-component progressive cavity pumps have been used in bioprinting and 3D printing, incorporating mechanical gradients to produce composite specimens. Additionally, a single-component progressive cavity pump has been used to additively manufacture concrete structures.

Figure 9A:
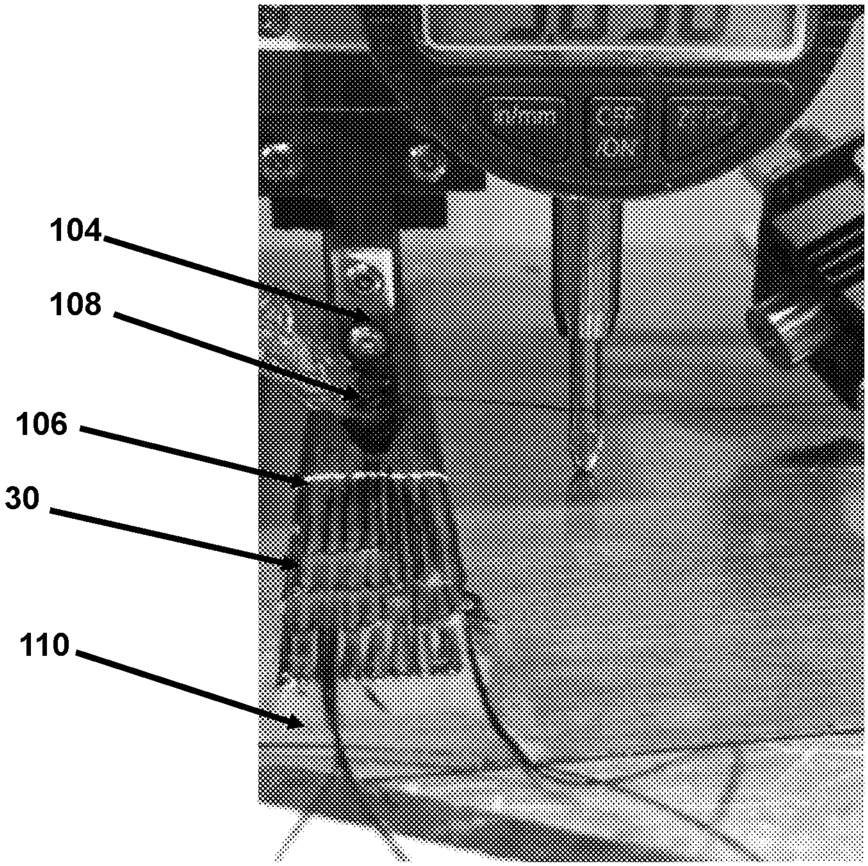
FIGS. 9*a* and 9*b* show simplified schematics of the printing process at panel (a). Panel (b) shows printed composite rectangular bars. The samples were printed using a 1.6-millimeter nozzle with 1-millimeter line spacing, and 180° turns at each end.
Figure 9B:
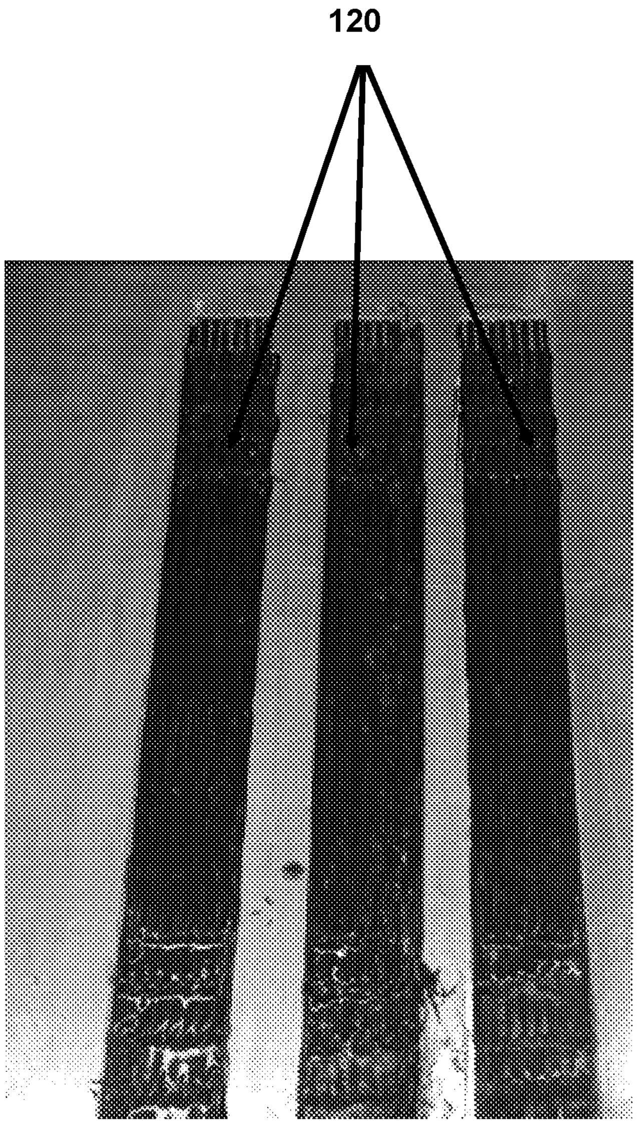

FIG. 9*a* shows a representee additive manufacturing equipment with a print head 104, at least one laser 106, and a print bed 110 with fiber tow 30. anchored to the print bed 110 so as the print head 104 moves, the fiber tow 30 comes out due to the pull force. The resin 108 is being pushed out by a pump (not shown). For mechanical property characterization and print quality evaluation, composite rectangular bars 120 were printed, as shown in FIG. 9*b*. Each printed bar 120 consists of six layers of composites reinforced with longitudinally unidirectional carbon fiber.

The initial approach for printing a tensile specimen was to print it in a rectangular shape, each layer having the same length and width. But, at the end of each line, the fiber had to make a 180° turn, which made the fiber bend upward a little. These small bumps at the bar's ends kept compounding with each layer, eventually leading to interference between the nozzle and the print body. This interference caused the failure of the printing process. To avoid this, every new layer length is shortened at both ends. This gives the ends a stair-like structure and stops the nozzle from interfering with the bumps at the ends. So, by this method, the stair-like edges can act as anchoring zones for the continuation of the carbon fiber for each new layer.

One major factor that dictates the mechanical properties of the printed composite bar 120 is the fiber volume fraction. The printed parts should have a high fiber volume fraction for the composites to have fiber-dominated mechanical properties. Process parameters can be altered to drive up the fiber volume fraction in the continuous fiber-reinforced printed parts. This can be achieved by bringing the printed lines closer to each other. To pack the tows in close space, the amount of matrix material in between them should be precisely calculated. The amount of resin 108 that comes out with the fiber depends on the pumping rate, print speed, and nozzle diameter. The nozzle diameter and print speed affect the amount of resin output because of the orifice of the fiber entry port. Excess resin pumping results in the backflow of resin through the fiber entry orifice. Due to the viscosity of the resin used in the printing, the speed of fiber tow 30 movement alters the amount of resin 108 it carries with it in the print. So, in the experiment, selected nozzle diameter, resin pump rate, and line spacing are selected as the control variables for optimization.

To find out the tightest packing achievable with this 3D printer, a large diameter nozzle (1.6 mm inner diameter) and wide line spacing (1.1 mm) were selected for the first print parameter configuration. These values were selected based on the initial printing success. The line spacing is gradually reduced from this initial configuration until the setup fails to print. This same iteration can be carried out with a reduced nozzle size, and the present disclosure attempts to converge to a setting for high fiber volume fraction composite print. After completion of the printing process, the printed parts are post-cured in elevated temperatures in a postcuring oven (not shown).

Carbon fiber is opaque to U.V. light. 3D printing with U.V. curing does not cure the resin fully at the shadowed part of the tow. The resin is mixed with Luperox P thermal initiator (tert-butyl peroxybenzoate) to facilitate full curing in the tow. The printed parts can be post-cured in an oven at 130° C. to activate the thermal initiators for one hour.

FIG. 11*a*-11*d* shows a comparison of images taken at different ISO, exposure, and shutter speeds. Images with different optical settings can be used for extracting different surface features. For example, the image with setting A (ISO 12800, aperture f6.3, shutter speed 1/80), indicated by numeral 126, shows the laser profile and fiber-matrix distribution. This setting for the image could be used for extracting fiber tow alignment information. Settings B (ISO 12800, aperture f11, shutter speed 1/100), indicated by numeral 128, and C (ISO 12800, aperture f10, shutter speed 1/100), indicated by numeral 130, are tuned to capture the color gradient of the laser illumination. Because different compositions of the substrate can reflect different wavelengths of light, these settings can provide the resin concentration at specific locations by tracking the color gradients. Settings A, B, and C contained noise in the data for surface profile measurement. A much darker optical setting D (ISO 12800, aperture f/6.3, and shutter speed 1/1250), indicated by numeral 132, was utilized for surface profile measurement. These dark images produced consistent results and less data loss when passed through the set HSV filter.

Figure 12:
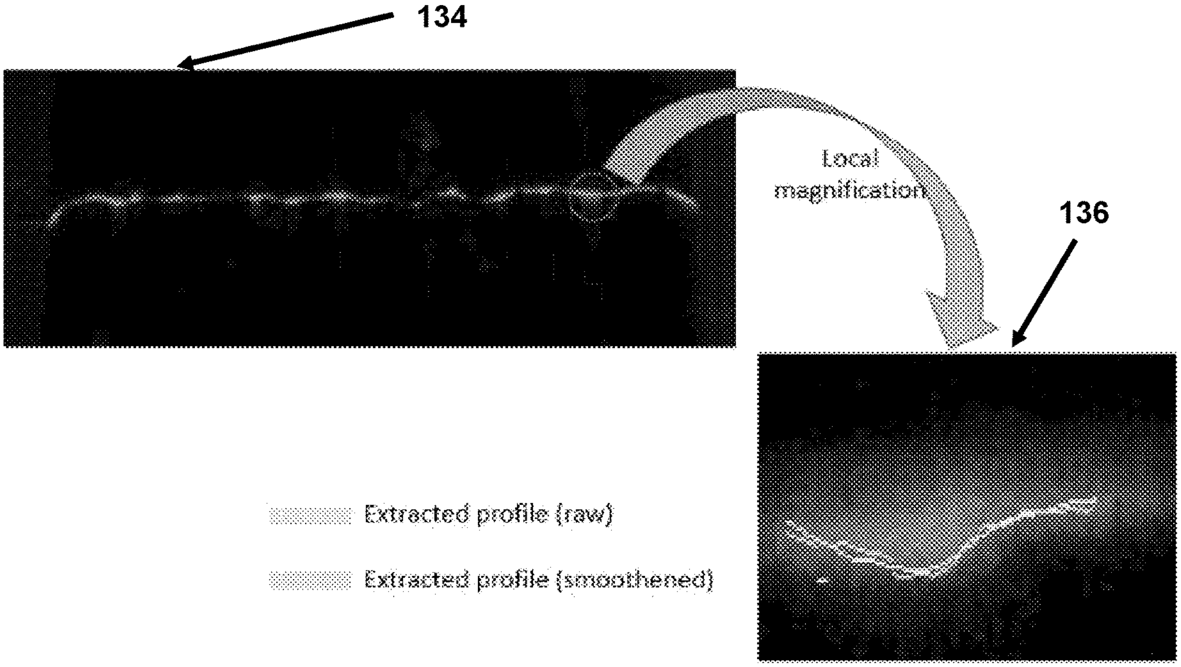
FIG. 12 shows surface profile extraction through image processing.
Figure 13:
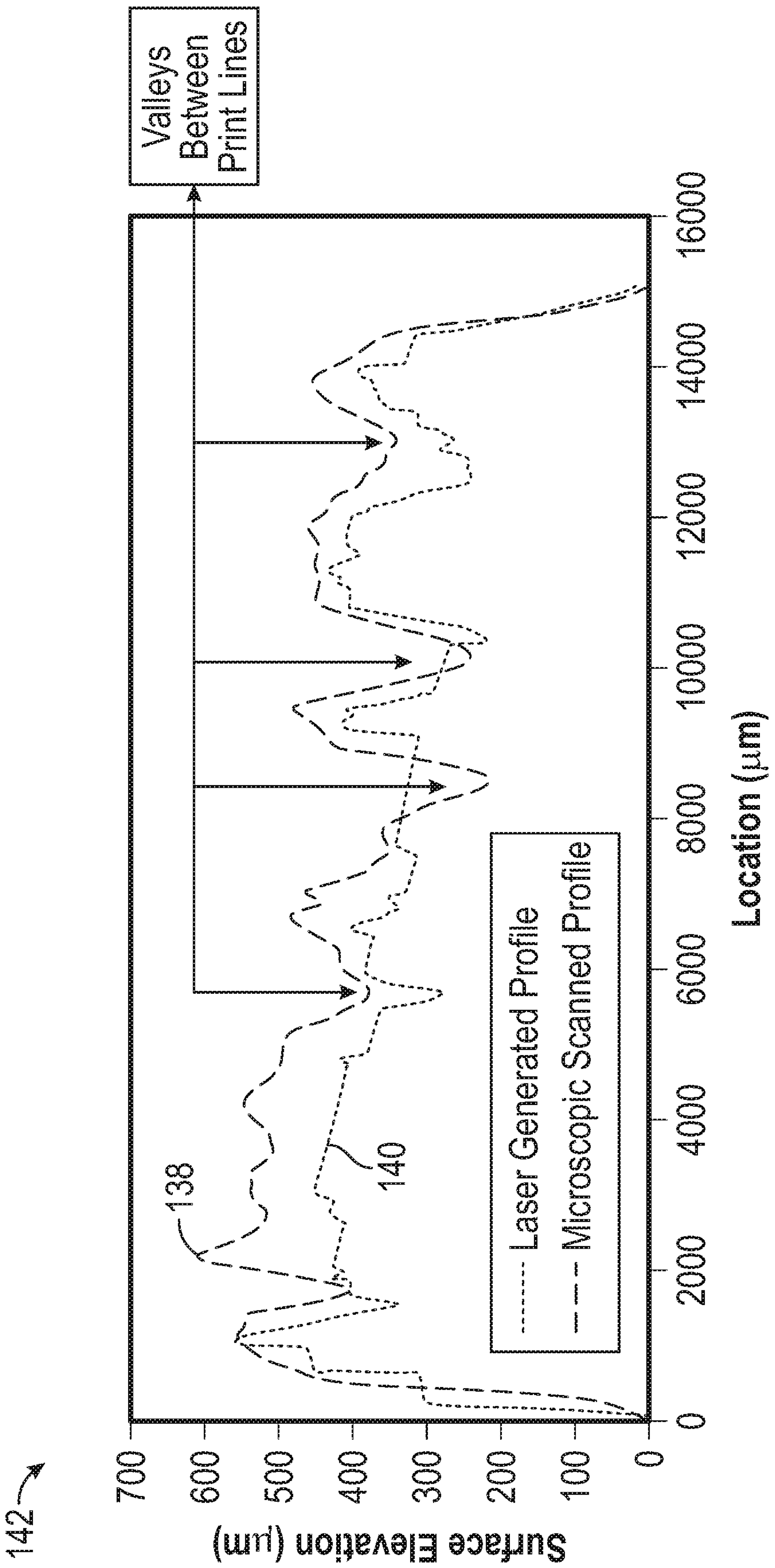
FIG. 13 is a graphical representation of a comparison of a laser-generated profile and microscopic 3D scanning.

The images' optical settings and quality were crucial for a good surface profile measurement. The images were captured under consistent room lighting conditions. The camera captured images at ISO 12800, aperture f/6.3, and a shutter speed of 1/1250. After capturing each image, it was copied from the camera and uploaded to the cloud server via a RASPBERRY PI®. RASPBERRY PI® is a federally registered trademark of Raspberry Pi Ltd., having a place of business at Maurice Wilkes Building, St. John's Innovation Park, Cowley Road, Cambridge, United Kingdom CB4 0DS. As the scanning process continued, the surface profiles were simultaneously being generated for a raw surface profile indicated by numeral 134 in FIG. 12 at the cloud server using a custom Python script. In this image processing program, the image pixels were first passed through a Hue-Saturation-Value (HSV) filter of 80-110, 100-255, and 100-255, respectively. This yielded a binary map of the laser-illuminated composite surface. The bottom boundary of this map represented a 2D profile of the composite layer at that specific slice of laser line illumination. By utilizing a custom search algorithm, this boundary was extracted as a pixel map of the 2D profile. The profile data at this stage contained a significant amount of noise. The Savitzky-Golay algorithm with a window size set to 50 for the second-order polynomial function was utilized to smoothen the curves. Then, using another custom tilt correction and scaling function, the pixel was converted to the physical 2D profile of the composite top surface along the laser-illuminated line, as shown by numeral 136 in FIG. 12. A graph of the comparison of the laser-generated profile 138 versus a microscopic scan profile 140 is indicated by the graphical representation 142 shown in FIG. 13.

Figure 14:
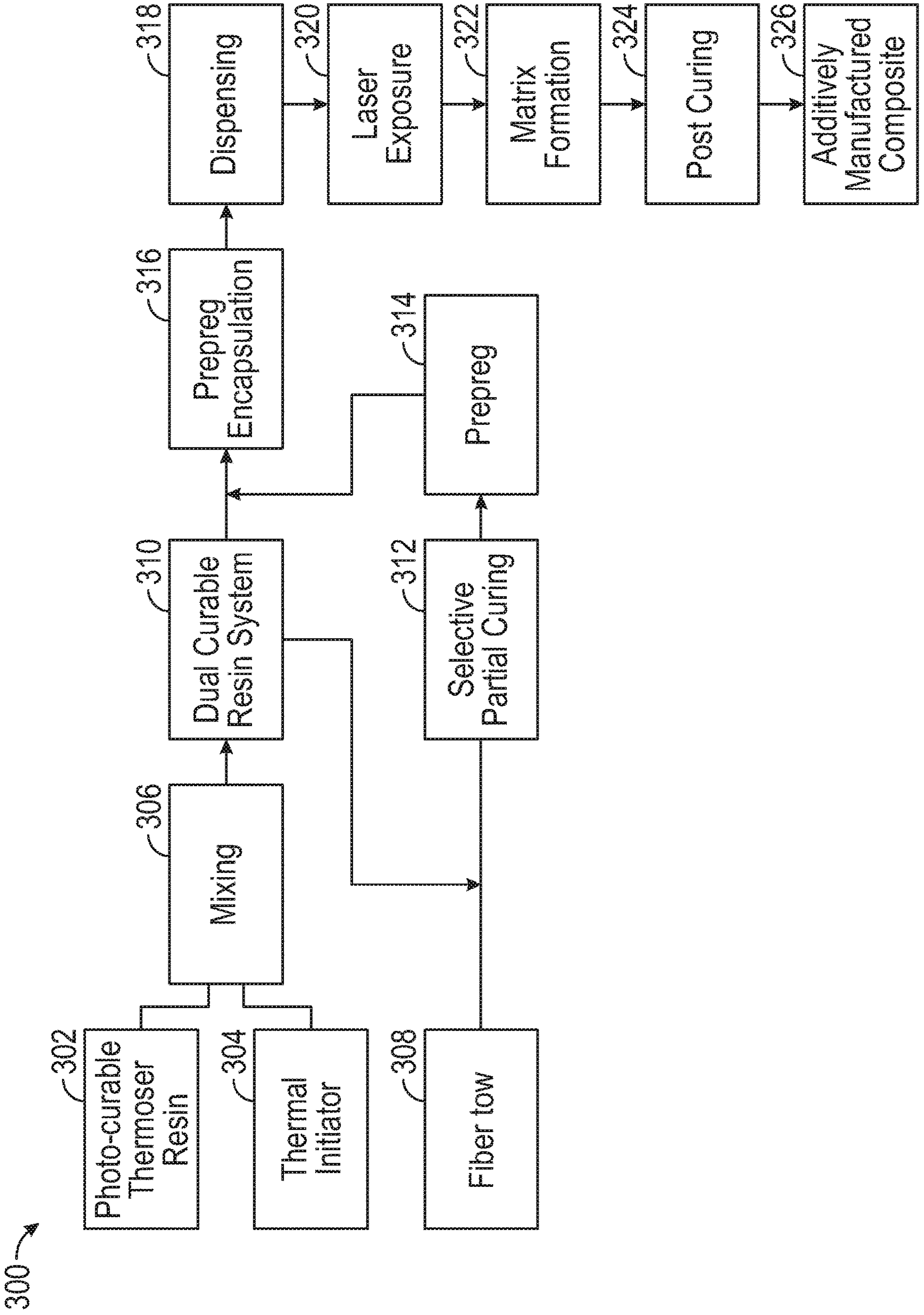
FIG. 14 shows a flow chart of material flow.

Referring now to FIG. 14, the material flow steps are generally indicated by the numeral 300. Flowcharts steps are indicated by numeral <nnn>. Photocurable liquid thermoset resin <302> and a thermal initiator <304> are mixed <306> to make the resin photo and thermally curable, providing this dual curable resin system <310>. A fiber tow <308> receives some of the resin <310>, and then the fiber tow undergoes selective partial curing <312> to form a prepreg <314>. This same resin from step <310> is also used in the printhead for impregnation and encapsulation of the prepreg <316>. The resin encapsulated prepreg <316> is then dispensed <318> through the printing nozzle onto a build plate and cured with laser exposure <320> to form a 3D printed composite through matrix formation <322>. The composite is then post-cured <324> at elevated temperature in an oven to form the additively manufactured composite.

In summary, the additively manufactured continuous fiber-reinforced composite objects are composed of fiber and thermoset matrix. The thermoset matrix is capable of being dual-cured by light exposure and heat. The thermoset matrix material is initially in a liquid state and can be solidified by crosslinking with light exposure initiation. But reinforcement can be opaque, so after the initial manufacturing, uncured liquid resin is left within the matrix at the shaded regions. The manufactured object is then post-cured at an elevated temperature in an oven. Thermal distortions in the oven can be minimized by placing the additive manufacturing equipment in a temperature-controlled, closed environment. Before the continuous fiber tow enters the printing nozzle, it passes through a preprocessing/prepreg forming unit. In prepreg production, the fiber passes through a liquid resin bath. Here the fiber is impregnated with liquid resin. This liquid resin could be the same as the one used for printing or a different one, depending on the print requirement. The fiber tow then exits through a narrow nozzle to limit the amount of resin carried by the fiber tow. Then the fiber runs through a series of flexible scrappers and air blowers. Careful adjustment of scraper pressure, geometry, and air flow rate can break up the droplets and irregularity of liquid resin around the fiber tow. After this, the fiber runs through a curing chamber. The curing chamber is a combination of Light Emitting Diode (L.E.D.) and a laser beam. The cylindrical curing chamber is coaxial with the fiber tow's flow direction. The pre-impregnated fiber tow partially cured with light exposure in the curing chamber. The light used to cure the resin in fiber tow has a wavelength that matches the resin curing wavelength requirement. The location and degree of cure of the liquid resin can be controlled by controlling the exposure. With controlled locally variable degree of cure at the prepreg can allow manipulation of the prepreg layup track direction at the printed object.

Figure 15:
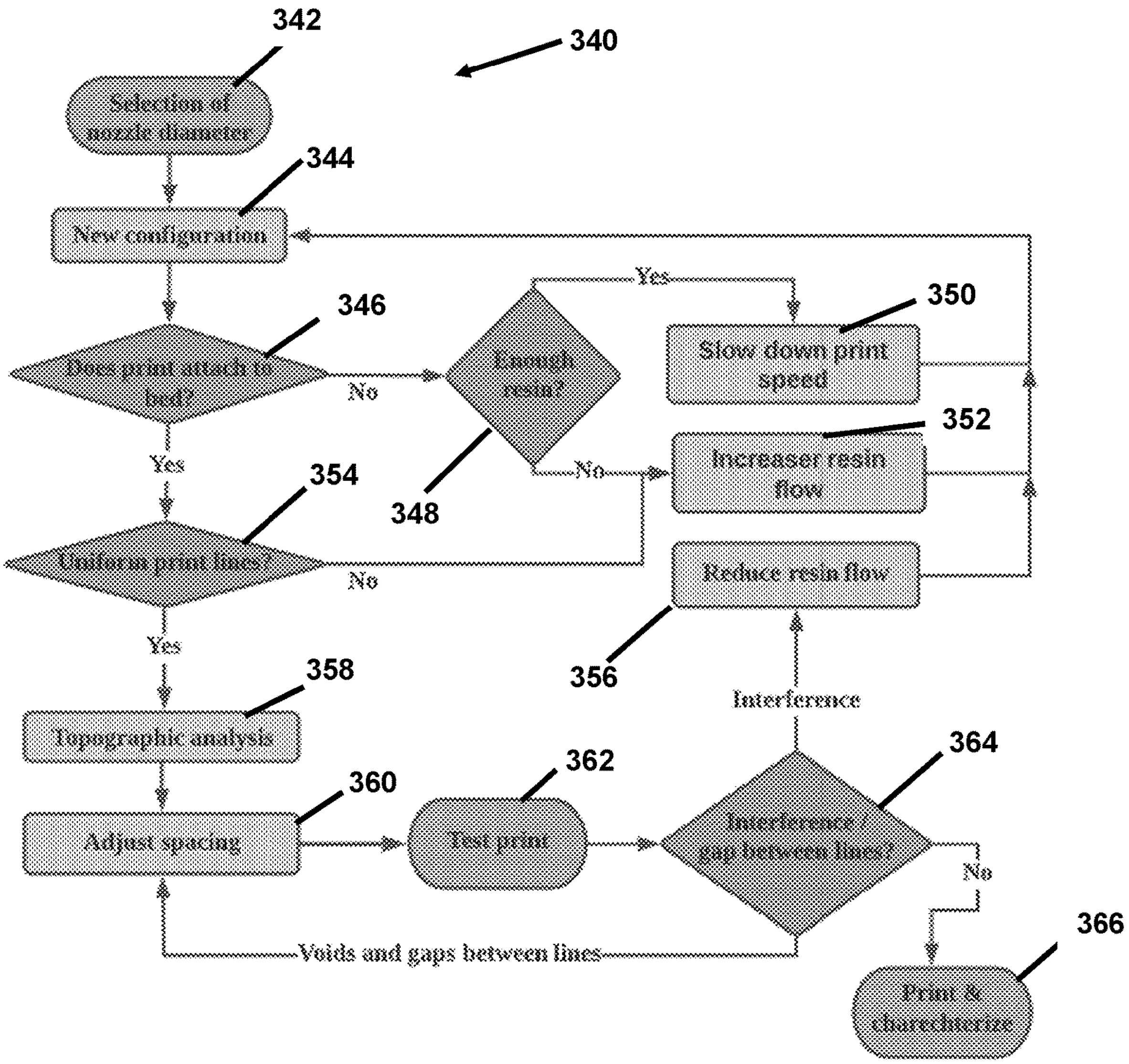
FIG. 15 shows a parameter adjustment flow chart.

Referring now to FIG. 15, the process steps in a dynamic adjustment of print parameters are generally indicated by the numeral 340. By starting with a suitable set of print parameters, the parameters can then be dynamically adjusted with feedback from topographic analysis of the printed surfaces. For example, the first step can be to select the nozzle diameter <342>, followed by determining a new configuration <344>. A determination is made of whether the print attaches to the bed. <346>. If the determination is negative, then the question is whether there is enough resin <348>. If there is enough resin, then the print speed is slowed down <350>, and this new print speed is used to create the update the configuration <344>. If there is insufficient resin, then the resin flow is increased <352>, and this new resin flow is used to create the update the configuration <344>.

If the print attaches to the print bed in step <346>, then a determination is made whether there are uniform print lines <354>. If the print lines are not uniform, then the resin flow is increased <352>, and this new resin flow is used to create the update the configuration <344>. If there are uniform print lines, then topographic analysis is carried out by a series of machine learning-derived subroutines with the input of surface images taken with a camera <358>. This is followed by adjusting the spacing of the lines <360> and then a test print <362>. This is followed by determining if there are interference/gaps between the lines <364>. If there are voids and gaps between the lines, then the process returns to adjusting the spacing <360>. If there is interference, then the process goes to step <356> to reduce resin flow and update the configuration <344>. If there is no interference, then the process goes to the final step <366> involving the step of printing and characterizing.

Figure 16:
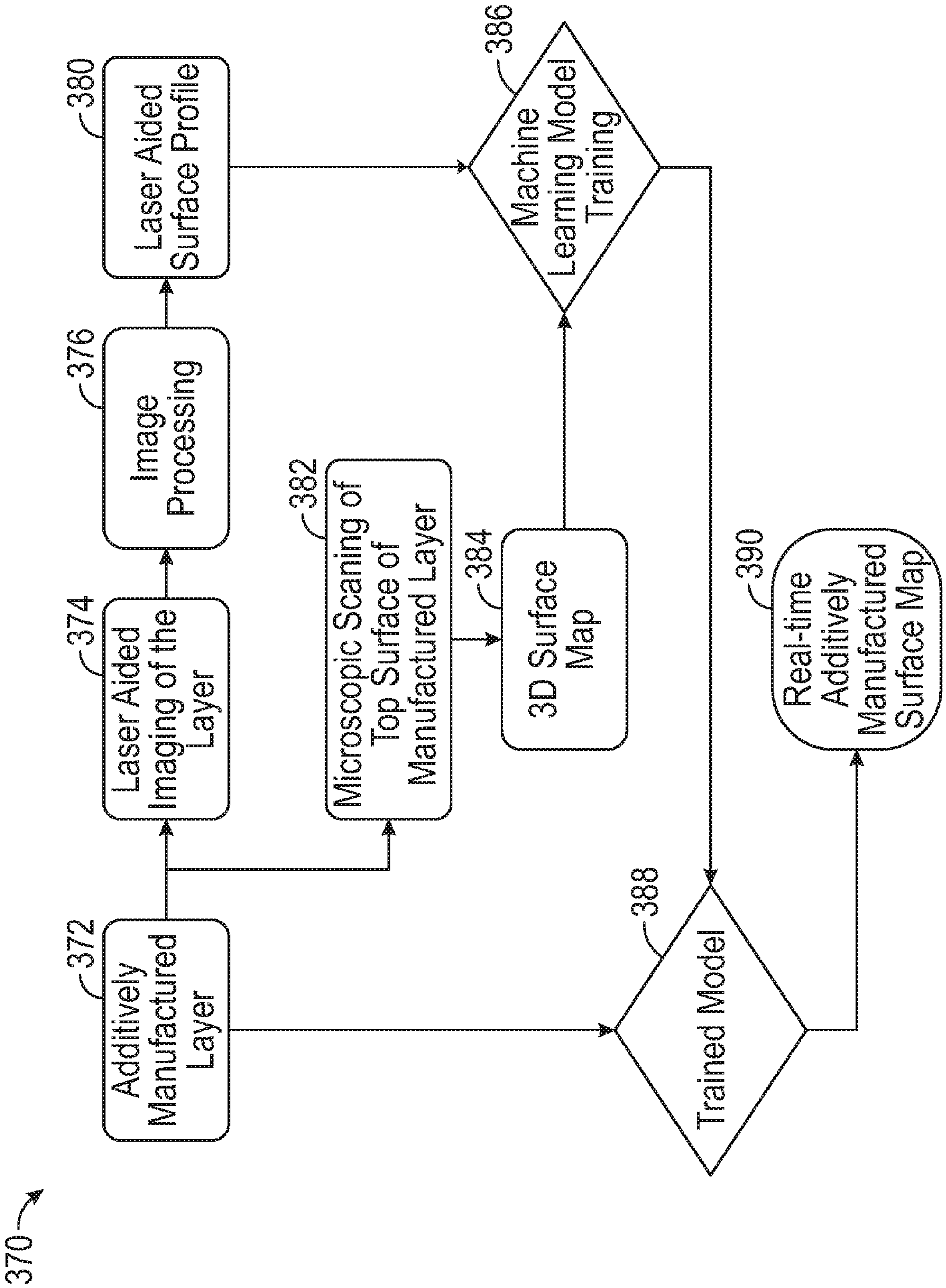
FIG. 16 shows a flow chart of a machine-learning model that provides a train-up for surface feature extraction.

Referring now to FIG. 16, which shows the outline of the training of a machine learning (ML) model, and its utilization for surface feature extraction purposes is generally indicated by the numeral 370. During the 3D or additive printing process, a printed additive layer <372> is imaged by a series of images of laser lines <374> with the exposed surface first taken by utilizing a digital camera. These images are then processed <376> to create a laser-aided surface profile <380>. A top surface of the printed additive layer <372> is also microscopically scanned <382> to create a 3D surface map <384>. The 3D map contains the surface profile and other attributes of the printed surface as numeric values. The combination of the laser-aided surface profile <380> and the 3D surface map <384> will then be used to train the ML model for surface feature mapping <386>. Once trained <388>, The ML model can then be used in real-time with the ongoing printing process. A fully trained ML model will generate 3D surface maps <390> without the further necessity of microscopic scanning.

Figure 17:
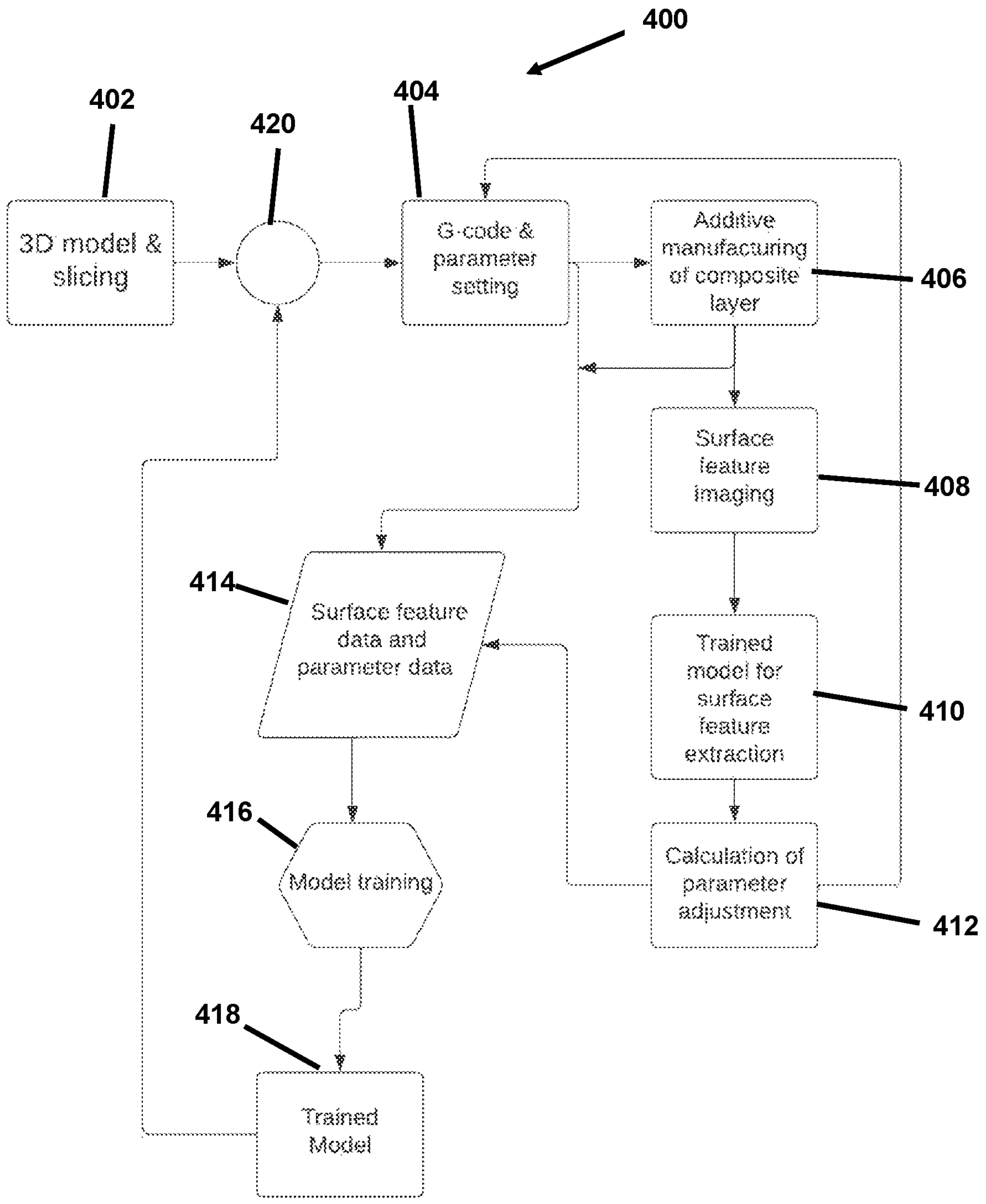
FIG. 17 shows A.I. model training for process optimization.

Referring now to FIG. 17, which shows the significant steps in artificial intelligence (A.I.) model training and utilization for dynamic printing parameter adjustments, generally indicated by the numeral 400. The 3D model and slicing are indicated by the numeral <402> that receives input from connection <420>. The first step is to train the A.I. model by first dynamically adjusting the print parameters with a static instruction set for different surface features. The resulting surface features of the progressively printed layers will be recorded as well (G-code and parameter setting) <404> The additive manufacturing of composite layer <406> can be provided as part of the surface feature and parameter data <414> or combined with surface feature imaging <408>, a trained model for surface feature extraction <410> and calculations of parameter adjustment <412> prior to input into the surface feature and parameter data <414>. This is then fed into the A.I. model to train it for parameter optimization <416>. Once trained, this model <418> can dynamically adjust print parameters depending on the surface features of the printed layers. In summary, experiments have shown that voids and irregularities in the fiber/matrix produce objects with inferior properties. Detection and mitigation of flaws during the process are important to produce objects with minimum flaws. Most of the voids and irregularities are generated from surface flaws such as gaps, ravines, and misalignments. The surface flaws can be measured by microscopic scanning, and corrective dynamic parameter adjustment has been proven successful. To detect the surface irregularities of cured layers, a camera is installed to monitor the surface profile. With the help of laser illumination, used for curing, the surface profile can be recorded using the camera. This approach can record a real-time 3D profile during the process. Using this 3D surface map, corrective parameter adjustments can be set to reduce the flaws and voids. Though the camera does not have microscopic accuracy, by using a machine learning algorithm trained with real-time data and microscope-obtained data, an accurate surface map can be generated as soon as a section is cured. An A.I. program will keep track of the corrective parameter adjustments and the resulting features. This A.I. program will be used to optimize the most effective parameter adjustments for an additively manufactured composite object.

Embodiments of the present disclosure are further defined in the following nonlimiting examples. It should be understood that these examples, while indicating specific embodiments of the disclosure, are given by way of illustration only. From the above discussion and these examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

At least some of these examples attempt to find the optimized settings for the print parameters for prepreg 1K carbon fiber. The selected parameters in this work are nozzle size, nozzle tip shape, resin flow rate, raster spacing, and print speed. Idealistically, increased fiber volume fraction can improve the mechanical properties of the print. But the prepreg tow needs the least amount of resin for a successful and reliable printing process. So, the examples aim to find the least amount of resin needed for stable printing and the maximum mechanical property offered by that recipe. The amount of resin is dictated by several factors, e.g., the filament count and diameter of the prepreg tow, spacing between the print lines, speed of the printing, the diameter of the printing nozzle, shape of the tip of the nozzle, viscosity of the resin. In these examples, 1K carbon fiber tow can be used for prepreg and printing. A test matrix was created and presented in Table 2 to study the effect of these printing parameters. The partially cured pre-impregnated tow is then fed through the printing nozzle. The prepreg is encapsulated with liquid resin and dispensed on the print bed. The dispensing nozzle has two separate entries for the prepreg tow, the liquid resin, and a common outlet for the resin fiber composite. An auxiliary resin channel independent of the main composite channel adds further versatility and control to the composite composition. The dispensing nozzle is set at a slanted angle to facilitate reduced drag on the fiber tow movement. The resin-encapsulated prepreg is laid with the help of a semi-transparent applicator. The bottom surface of the applicator possesses hydrophobic characteristics so that the cured matrix does not stick to it. A laser beam passes the semi-transparent applicator onto the liquid resin matrix to solidify it. The laser beam is guided with a set of mirrors controlled by drives. The laser beam directions can be adjusted and moved in a scanning pattern in a short local range.

TABLE 2

Test matrix for the processing parameters.

| | 1.2 mm | 1.0 mm | 0.8 mm |
|---|---|---|---|
| Max spacing | Spacing = 1.2 mm<br>Layer thickness = 0.4 mm<br>Resin flow = 4.81 cc/hr | Spacing = 1.0 mm<br>Layer thickness = 0.4 mm<br>Resin flow = 3.95 cc/hr | Spacing = 0.8 mm<br>Layer thickness = 0.4 mm<br>Resin flow = 3.37 cc/hr |
| Intermediate spacing | Spacing = 1.1 mm<br>Layer thickness = 0.4 mm<br>Resin flow = 4.5 cc/hr | Spacing = 0.92 mm<br>Layer thickness = 0.4 mm<br>Resin flow = 3.62 cc/hr | X |
| Minimum spacing | Spacing = 1.0 mm<br>Layer thickness = 0.4 mm<br>Resin flow = 4.29 cc/hr | Spacing = 0.85 mm<br>Layer thickness = 0.4 mm<br>Resin flow = 3.62 cc/hr | Spacing = 0.75 mm<br>Layer thickness = 0.4 mm<br>Resin flow = 3.37 cc/hr |

The diameter of the nozzle is extremely important for the printing process. The diameter of the nozzle dictates how much resin needs to be pumped around the fiber tow. A larger nozzle diameter can require more resin as the tow count is kept constant. Nozzle size also dictates the raster spacing of the print. Intuitively, the print line should be spaced at a distance equal to the nozzle diameter. But, as the resin is dispensed as a liquid around the prepreg, after dispensing, the resin's top surface can produce an arched surface. This produces a waviness at the top surface of the printed layer. This waviness compounds with each layer and creates void zones in the print. So, printing can be attempted with print lines placed as close as possible. The resin flow rate can be balanced depending on the raster spacing. Different nozzle diameters are used for the printing, and other printing parameters can be worked around the nozzle diameter.

The shape of the nozzle tip is also very important in this printing process; for good resolution printing with 1 k carbon fiber tow was chosen for the printing of the composite. But experimental runs of the printer show that the 1K tow is prone to fraying and snapping at the tip of the nozzle. This happens due to the sharp 90° turn of the tow at the tip of the nozzle. Due to increased drag, fraying and tearing of the tow are increased as the nozzle diameter is set to smaller diameters. For this, the nozzle tip is given a fillet at the exit. But this fillet introduces inaccuracy of the position of laying the fiber tow. So, the nozzle can be given fillets only in the X-axis direction. This direction has the most extended travel length while building the rectangular print body with a back-and-forth motion.

Experiments with the 3-axis control and vertical orientation of the dispensing nozzle have shown that the fiber reinforcement experiences a much higher amount of drag force compared to the 4-axis controlled slanted nozzle orientation. Furthermore, in the 3-axis controlled system, the shape changes during the curing, and the upward bending of the prepreg at sharp turns at fiber laying tracks causes interference of cured layer with the dispensing nozzle. These interferences commonly deteriorate the manufactured object quality and occasionally snaps the continuity of the prepreg reinforcement. Thus, adopting a 4-axis controlled slanted dispensing nozzle orientation and curing with radiation through a semi-transparent applicator helps mitigate the local overbuilding of layers. Ultrasonic vibration prepreg and layup stage further facilitate the impregnation of the reins. The manufactured object's quality, features, and properties depend on several process parameters, such as print speed, laser power, laser dot size and shape, fiber-to-resin ratio, layer thickness, line spacing, and many more.

Moreover, a successful additively manufactured object requires local and dynamic adjustment of the parameters. For example, the amount of resin and degree of cure determines the flexibility of the prepreg. A rigid prepreg is ideal for laying straight paths and pushing the prepreg through the dispensing nozzle after an event of discontinuity at the layup path. But a rigid prepreg section is not ideal, laying it according to a curved path or through a sharp turn at the layup path. Thus, a less cured and flexible section of prepreg is desired for the curved section of the manufactured object. So, the prepreg forming curing chamber will dynamically adjust the exposure to control the local degree of cure. The air blower at the prepreg forming setup will also be dynamically adjusted to control the amount of liquid resin flow with the prepreg.

The line spacing and the resin flow rate is also locally and dynamically adjusted according to the local requirements of the manufactured object. One major factor that dictates the mechanical properties of the printed composite bar is the fiber volume fraction. The printed parts should have a high fiber volume fraction for the composites to have fiber-dominated mechanical properties. Process parameters can be altered targeting to drive up the fiber volume fraction in the continuous fiber-reinforced printed parts. This can be achieved by bringing the printed lines closer to each other. To pack the tows in close space, the amount of matrix material in between them should be precisely calculated. The amount of resin that comes out with the fiber depends on the pumping rate, print speed, and nozzle diameter. The nozzle diameter and print speed affect the amount of resin output because of the orifice of the fiber entry port. Excess resin pumping results in the backflow of resin through the fiber entry orifice. Due to the viscosity of the resin used in the printing, the speed of fiber tow movement alters the amount of resin it carries with it in the print. So, in the experiment, selected nozzle diameter, resin pump rate, and line spacing are selected as the control variables for optimization. A tighter line spacing and less resin are desired for straight heavy load-bearing sections, whereas a wider spacing, slower speed, and higher resin flow rate are desired at the curved sections.

The rate of pumping resin through the nozzle is a dependent, yet important process parameter. The resin rate required depends on the layer thickness, raster spacing, and printing speed. In the developed 3D printing setup, it is desired that the resin only exits through the outlet tip. But resin can also cause backflow through the fiber entry opening. This backflow can disturb the desired mass flow ratio into the print and induce increased drag to the fiber. For these reasons, the system must properly balance the resin flow rate. The amount of resin delivered into the print depends on the print speed because the resin is carried by the tow to the print by viscous adhesion. The mass flow equilibrium with no backflow is calculated as follows:

$$\dot{V} = \frac{\pi}{4}\left(d_1^2 - d_2^2\right)v \qquad \text{Equation 1}$$

Here $\dot{V}$ is resin flow rate, d_1 & d_2 are nozzle and tow diameters, respectively, and v is printing speed. Now considering the area under the cross-sectional profile curve as A, as shown in the graph 122 of FIG. 10, can be formulated as follows:

$$A = \frac{\dot{V}}{v} + \frac{\pi d_1^2}{4} \qquad \text{Equation 2}$$

A relates the printing parameters with the topographic data. $\dot{V}$ and A are formulated based on the assumption of no void in the print body.

Figure 10:
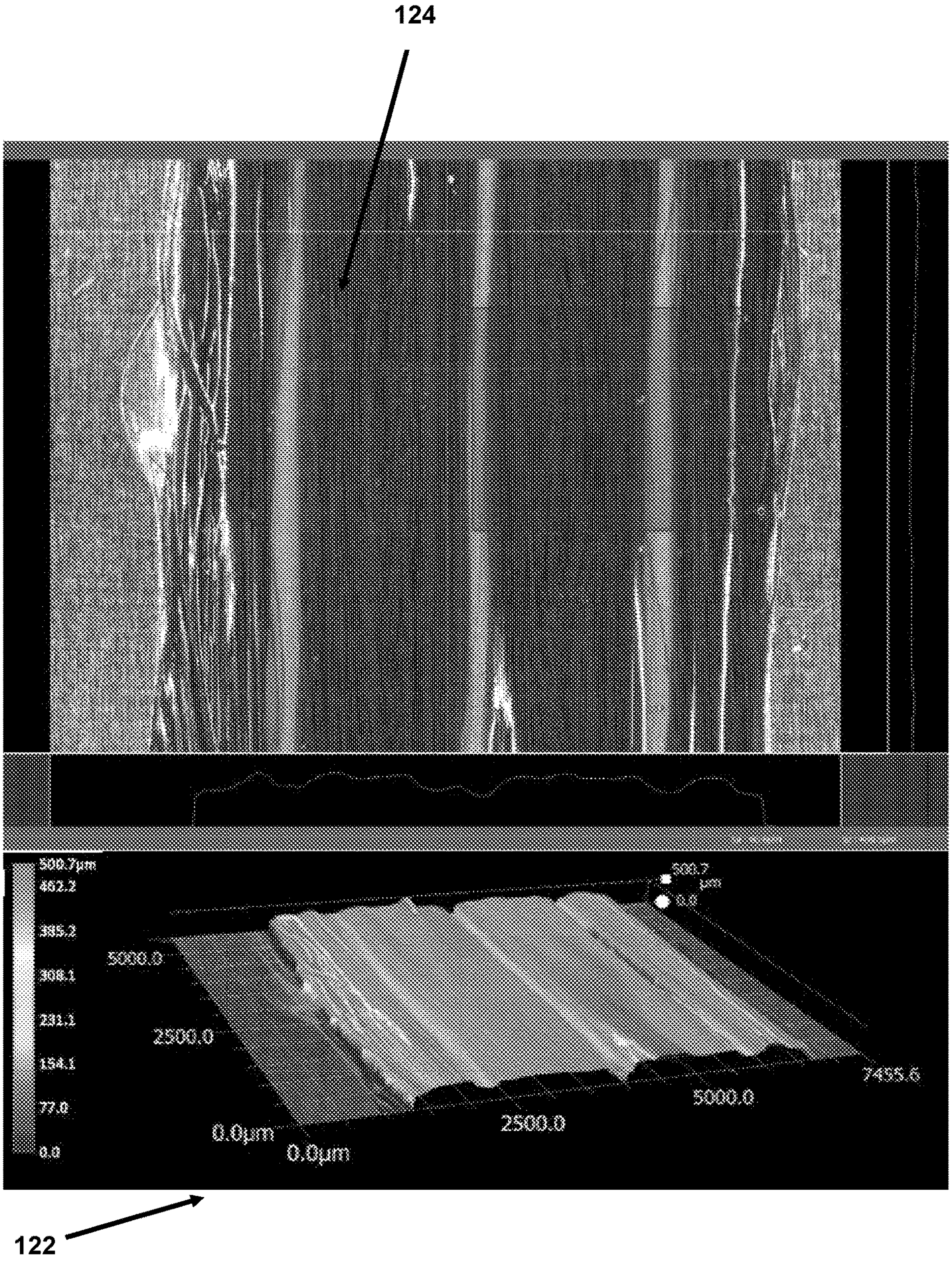
FIG. 10 shows microscopic 3D scanning of a composite layer.
Figure 11A:
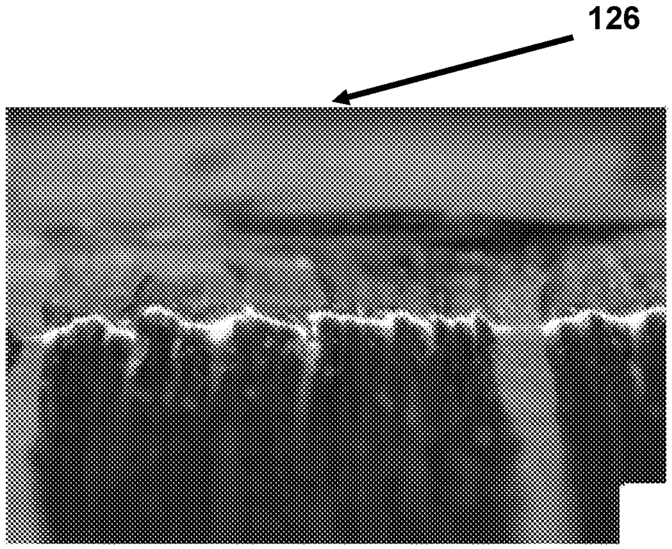
FIGS. 11*a*, 11*b*, 11*c*, and 11*d* show laser scanning of composite layers under different optic settings.
Figure 11B:
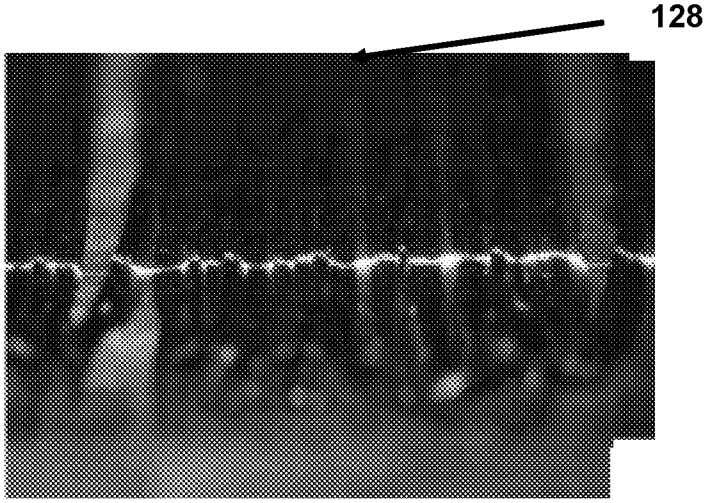
Figure 11C:
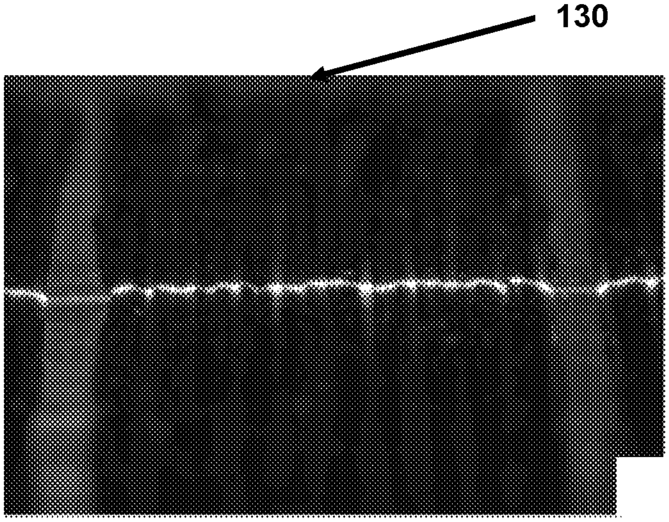
Figure 11D:
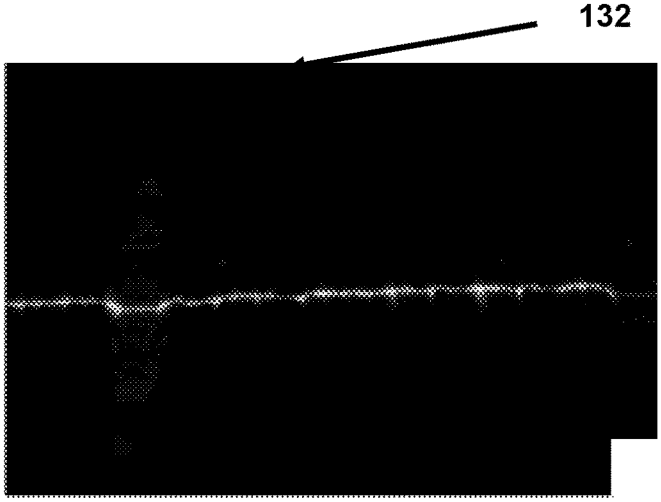

The effect of varying the print spacing, nozzle size, and resin flow rate can be optimized. For better packing of the fiber tow in the composite, it is important to note the printed lines' topography. For example, this can be done using a KEYENCE® VHX digital microscope. FIG. 10 shows the microscope-generated topographic profile of one printed line 124. The topographic profile of each printed line with different print settings can be studied under the microscope, and the spacing and resin flow can be optimized from these microscopic images.

Depending on the experimental prints, three nozzle diameters (1.6, 1, 0.8 mm) have been selected for optimization. These three nozzle diameters were tested for the minimum and maximum spacings. The max and minimum spacing can be dependent on the nozzle size. After setting up the spacing boundaries, an intermittent spacing configuration can be tested for print performance.

The resin flow rate, nozzle size, line spacing, and print speed are interconnected and dependent on each other. Multiple combinations of the parameter changes can achieve the desired change in print performance. To streamline the study, adjustments to print parameters can be made according to the system diagram shown in FIG. 15.

Tensile properties of the 3D printed composites were tested by INSTRON® load frame (e.g., Model 5567, Norwood, MA, U.S.A.). INSTRON® is a federally registered trademark of Illinois Tool Works, Inc., having a place of business at 155 Harlem Avenue Glenview Illinois 60025. The tensile load was measured using a 30 kN load cell, and strains were measured using a 25.4 mm extensometer. All tensile tests were conducted using the ASTM D3039 standard. The specimens were printed as rectangular bars of gauge length of 250 mm. The specimens' width and thickness can be around 15 mm and 3.5 mm, respectively. The crosshead displacement rate can be 1 mm/min rate. For gripping the tensile specimens, they can be tabbed on both sides with glass fiber epoxy composite. Tabs can be attached to the printed composite using two-part epoxy glue. The load-displacement data from the tensile test can be plotted, and tensile elastic modulus can be calculated using the following equation:

$$E = \frac{\sigma_T}{\varepsilon_T}. \quad \text{Equation 3}$$

Printed composites' flexural properties can be tested with a 3-point bending test. A flexural test can be conducted to failure according to ASTM D7264 standard. The span-to-thickness ratio of the samples is 32:1. Flexural tests can be performed using an Instron load frame (Instron, Series: 5567, Norwood, MA, U.S.A.) with a 30 kN load cell. According to the standard, the crosshead movement can be set to 1 millimeter/minute. Flexural stress is calculated from the equation:

$$\sigma_f = \frac{3PL}{2bd^2} \quad \text{Equation 4}$$

$\sigma_f$ stress in the outer fibers at the midpoint, P is the load given at a point on the load-deflection curve, L is the support span, b is the width of the beam, and d is the depth of the beam.

The following equation is used for calculating flexural strain $\varepsilon_f$ at the outer surface of the sample:

$$\varepsilon_f = \frac{6Dd}{L^2} \quad \text{Equation 5}$$

Here D is the max deflection at the center of the beam, and d is the depth of the beam. With the flexural stress and strain, flexural chord modulus $E_f$ can be calculated using the equation:

$$R_f = \frac{\sigma_{f1} - \sigma_{f2}}{\varepsilon_{f1} - \varepsilon_{f2}} \quad \text{Equation 6}$$

In this equation $\sigma_{f1}$ and $\sigma_{f2}$ are flexural stresses measured at predefined points on the load-deflection curve, and $\varepsilon_{f1}$ and $\varepsilon_{f2}$ are flexural strains measured at predefined points on the load-deflection curve.

Thermogravimetric Analysis (TGA) can test the printed composites' thermal stability. Thermal degradation temperature can be calculated from the TGA analysis. Knowing the thermal degradation temperature is important before Dynamic Mechanical analysis (D.M.A.) because the D.M.A. equipment can be damaged if the specimen thermally degrades in it. The TGA test can be done according to ASTM E1131 standard using TGA Q500 (e.g., T.A. Instruments, Series Q500, Eden Prairie, MA, U.S.A.).

Dynamic Mechanical Analysis was performed to characterize printed composites' viscoelastic properties. D.M.A. of a dual cantilever composite beam was carried out using a Discovery DMA 850 (e.g., T.A. Instruments, Eden Prairie, MA, U.S.A.) equipment. The tests were done according to ASTM D7028 standard. The glass transition temperature, storage modulus, and loss modulus were obtained from the D.M.A. analysis. The result was compared with neat, cured resin to study the effect of introducing thermal initiator and reinforcement materials.

Dynamic Mechanical Analysis was performed to characterize printed composites' viscoelastic properties. D.M.A. of a dual cantilever composite beam was carried out using a Discovery DMA 850 (T.A. Instruments, Eden Prairie, MA, U.S.A.) equipment. The tests were done according to ASTM D7028 standard. The glass transition temperature, storage modulus, and loss modulus were obtained from the D.M.A. analysis. The result was compared with neat, cured resin to study the effect of introducing thermal initiator and reinforcement materials.

Burnoff tests were conducted to determine the fiber volume fraction of the printed composites. Small sections of the printed composites were cut out and placed in a Lucifer™ Furnace to burnoff the matrix materials. The burnoff tests were conducted in reference to the ASTM D3171 standard. The composite was heated at 565° C. for 6 hours in a nitrogen environment. The fiber volume fraction data were used to model the mechanical properties of the composite.

The printed samples were tested in the Micro CT. The Micro CT tomographic images were analyzed for the fiber filament distribution in the matrix. The tomographic analysis was used to quantify the distribution and size of voids in the composite parts. The Micro CT was done using a GE® Micro CT Scanning System (Model: Phoenix v|tome|x S™, Fairfield, CT, U.S.A.) at the NDSU electron microscopy center. GE® is a federally registered trademark of General Electric Company, having a place of business at 901 Main Avenue, Norwalk, Connecticut 06851.

The following additional materials can be used throughout the application and are particularly utilized in the following two examples:

Liqcreate Strong-X resin—contains a mixture of dicyclopentadiene di methanol diacrylate, ethoxylated bisphenol-a diacrylate, pentaerythritol tetra acrylate, and a premixed photoinitiator obtained from Liqcreate (Liqcreate, Utrecht, The Netherlands);

Luperox P—tert-butyl peroxybenzoate 98% utilized as a thermal initiator from Sigma Aldrich (St. Louis, MO, USA);

Fulament stainless steel flexible plate (Fulament, NY, USA); and

Canon Model 90D DSLR Camera (Canon, Tokyo, Japan);

Example 2

Printed fiber-reinforced composite materials were prepared according to the methods disclosed herein. The resultant composite was tested to assess the material properties, including tensile and flexural properties.

As previously discussed above, a 3D printer with a nozzle that incorporated in-nozzle resin impregnation into the fiber tow was used. During the printing process, the fiber tower was pulled through the nozzle by the tension from the printed layers, resulting in the fiber tow being impregnated and encapsulated within the liquid resin in the impregnation zone. The deposited liquid was cured with violet lasers projected from each side perpendicular to the direction of the nozzle movement. These lasers followed the nozzle tip by an offset distance of five mm in order to prevent liquid resin from curing at the tip of the nozzle, consequently obstructing material flow. Composite rectangular bars, consisting of six layers of composite laminates reinforced with longitudinally unidirectional CF, were printed for mechanical property characterization. Mechanical properties provided by the providers and print parameters utilized in this study are displayed in Table 3 and Table 4, respectively.

TABLE 3 displays the mechanical properties of composite components.

| Properties | Peopoly Nylon-Like Tough | Peopoly Deft | Liqcreate Strong-X | Tenax |
|---|---|---|---|---|
| Tensile strength (MPa) | 62 | 35 | 60-84 | 4100 |
| Tensile modulus (GPa) | 2.05 | 0.75 | 3.1-3.4 | 240 |
| Elongation (%) | 44 | 6 | 3-6 | 1.7 |
| Density (gm/cm$^3$) | 1.12 | 1.12 | 1.12 | 1.77 |
| Viscosity (cps at 25° C.) | 780 | 105 | 550 | — |
| Linear shrinkage after curing (%) $s_l$ | 6.5 | 6.5 | 1.5 | — |

TABLE 4 displays the print parameters for each resin sample group.

| | |
|---|---|
| Layer Thickness | 0.45 ± 0.03 mm |
| Line Spacing | 1.0 mm |
| Nozzle Diameter | 1.0 mm |
| Post-cure (130° C.) | 3 h |
| Print Speed, $S_p$ (mm/min) | Peopoly Deft: 550 |
| | Peopoly Nylon-Like: 270 |
| | Liqcreate Strong-X: 310 |
| Resin Pumping Rate, $\dot{V}_r$ (cc/hr) | Peopoly Deft: 9.5 |
| | Peopoly Nylon-Like: 5.2 |
| | Liqcreate Strong-X: 6.9 |

After completion of the printing process, the bars were post-cured thermally in an oven at 130° C. for 3 hours.

Figure 19:
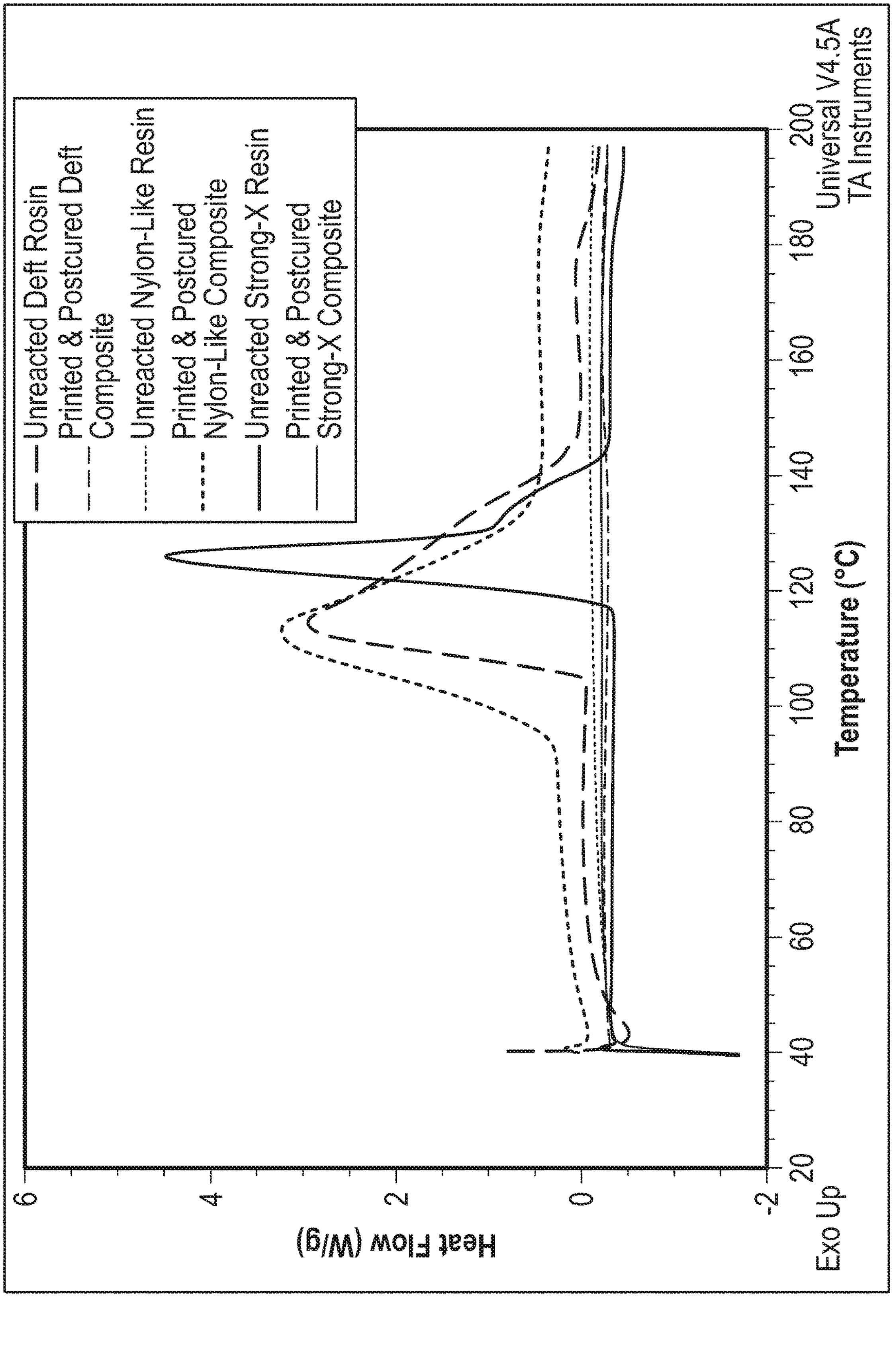
FIG. 19 displays the heat flow curves of unreacted resins and post-cured composites during DSC tests.

Differential Scanning Calorimetry (DSC) tests were conducted with 3D-printed composites and unreacted resin systems to ensure sufficient curing of the specimens after the post-curing stage. The amount of cure at the final product was investigated by comparing the heat flow curves of uncured and cured samples using a TA-modulated differential scanning calorimeter. The temperature range for the DSC test was 40° C. to 200° C. Heat flow was measured at a temperature ramp set at 10° C./min. Standard aluminum pans were used to test the printed specimens, and hermetic aluminum pans were used to test the unreacted resin mixtures. FIG. 19 shows the plot of the exothermic heat flow of the resins and printed and post-cured composites. Peak heat flows were observed below 130° C. Despite the residual heat of cure at ~175° C. for the DSC-cured samples, the post-cured 3D-printed composite specimens did not show any exothermic heat flow; thus, the post-cured specimens were considered sufficiently cured.

The densities of the composites ($\rho_c$) were measured according to ASTM D792. Then, 20 (±0.05) mm×18.5 (±0.3) mm×2.8 (±0.2) mm coupons were weighed in air and immersed in distilled water using a precision digital scale. The composite's density was measured from the difference in these weights. Notably, the estimation of volumetric shrinkage of the resins from the manufacturers was insufficient due to the dual-cured nature of the resin and the line-wise printing process; therefore, resin shrinkage factors were calculated and defined by $$k_d = 1 - \left(\frac{s_l}{100}\right)^3 \quad \text{Equation 7}$$

calculates the volumetric shrinkage factor ($k_d$) calculated from linear dimensional resin shrinkage percentage, $s_l$.

$$k_e = \frac{\rho_m}{\rho_r} \quad \text{Equation 8}$$

calculates the volumetric shrinkage factor from experimental densities ($k_e$).

The average composite densities were measured at 1.25, 1.17, and 1.14 gm/cm$^3$ for the specimens with Deft, Nylon-Like, and Liqcreate resins, respectively, with a p-value for the composite density results at $7.92\times10^{-8}$. Average matrix densities produced by Deft, Nylon-Like, and Liqcreate resins were calculated utilizing Equation 9, reporting 1.28, 1.27, and 1.25 gm/cm$^3$, respectively. The difference in average matrix density was statistically significant, with a p-value of $1.03\times10^{-14}$.

$$\rho_m = \frac{m_m}{\frac{1 - 2V_{v\,(int)}}{\rho_c\,(1 - V_{v\,(int)})} - \frac{m_f}{\rho_f}} \quad \text{Equation 9}$$

calculates matrix density. Here, $\rho_c$ is the composite's density derived from the immersion tests. Further, $m_m$ and $m_f$ are the mass fractions derived from the burn-off test.

Figure 20:
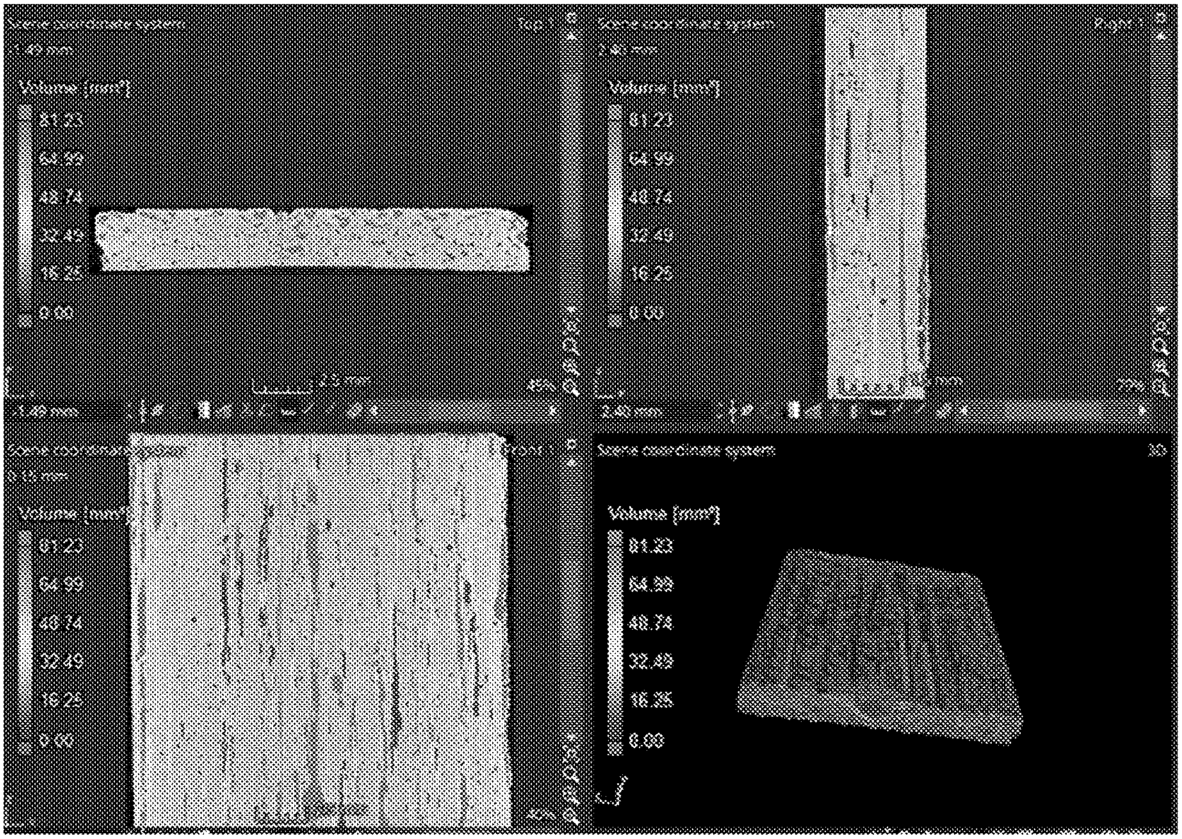
FIG. 20 displays Micro CT imaging of composites.
Figure 21:
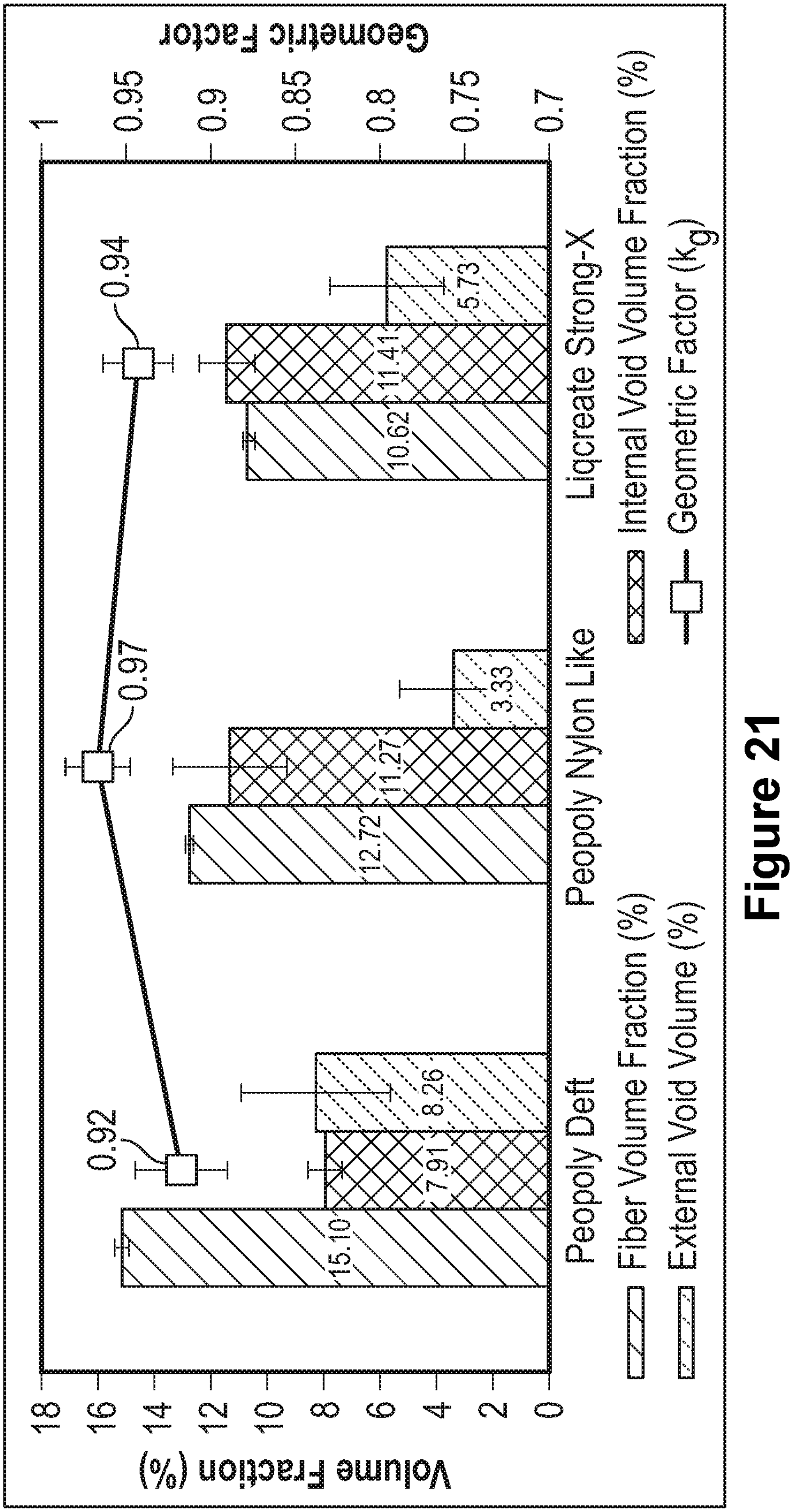
FIG. 21 displays the composition of 3D-printed composite bars. Further, FIG. 5 visualizes the average void percentages of the composites.

To measure the void content inside the composites, 20 (±0.05) mm×18.5 (±0.3) mm×2.8 (±0.2) mm coupons were CT-scanned. The largest voids were aligned longitudinally in between the print lines. A sample void distribution from the result Micro CT imaging can be seen in FIG. 20, and average void percentages are visualized in FIG. 21. Investigation of the void distribution showed the voids were more prevalent in the regions between adjacent print lines. No significant voids were observed to build up at the fiber-matrix interface. The significant difference between the densities of liquid resins and the densities of cured matrix indicated that shrinkage of the resins upon curing was a significant factor behind void formation in the composites. With the simplifying assumption that voids are the volume loss due to resin shrinkage, the printed composites' constituent percentages were predicted from print parameters using the following:

$$V_f = \frac{\frac{w'_f S_p}{1000\,\rho_f}}{\frac{w'_{cf} S_p}{1000\,\rho_f} + \frac{\dot{V}_r}{60}} \quad \text{Equation 10}$$

provides a prediction for fiber volume fraction under the simplifying assumption that voids are the volume loss due to resin shrinkage. The actual composition of the composite was calculated from the micro-CT, burn-off, and density test results using EQUATIONS 9 and 11.

$$V_f = \frac{\frac{w_f}{\rho_f}}{\frac{w_f}{\rho_f} + \frac{w_m}{(\rho_m)} + V_{v\,(int)}} \quad \text{Equation 11}$$

used to calculate fiber volume fraction. Here, $w_f$ and $w_m$ are the weight of fiber and matrix in the composite, respectively. $\rho_f$ and $\rho_m$ are the density of the fiber and the matrix, respectively. Utilization of the resin density ($\rho_r$) would have been misleading, as the resin volume shrank during the curing steps.

$$V_m = \frac{\frac{\dot{V}_r}{60} k}{\frac{w'_f S_p}{1000\,\rho_f} + \frac{\dot{V}_r}{60}} \quad \text{Equation 12}$$

provides a prediction for matrix volume faction under the simplifying assumption that voids are the volume loss due to resin shrinkage. The actual composition of the composite was calculated from the micro-CT, burn-off, and density test results using Equations 9 and 11.

$$V_{v\,(int)} = \frac{(1-k)\frac{\dot{V}_r}{60}}{\frac{w'_f S_p}{1000\,\rho_f} + \frac{\dot{V}_r}{60}} \quad \text{Equation 13}$$

provides a prediction for void fraction inside the composites under the simplifying assumption that voids are the volume loss due to resin shrinkage. The actual composition of the composite was calculated from the micro-CT, burn-off, and density test results using EQUATIONS 9 and 11.

Differing shrinking factors, k, are shown in Table 5.

TABLE 5 compares the predicted composite compositions vs. the actual compositions. The actual composition of the composite was calculated from the micro-CT, burn-off, and density test results using EQUATIONS 9 and 11.

| Matrix | Void Source | $V_f$ (%) | $V_m$ (%) | $V_{v(int)}$ (%) |
|---|---|---|---|---|
| Peopoly Deft | k = 1 (no shrinkage) | 13.02 | 86.98 | 0 |
| | k = $k_d$, void = shrunk volume | 13.02 | 71.10 | 15.88 |
| | k = $k_l$, void = shrunk volume | 13.02 | 75.86 | 11.12 |
| | Actual composition * | 15.10 | 76.99 | 7.91 |
| Peopoly Nylon-Like | k = 1 (no shrinkage) | 11.52 | 88.47 | 0 |
| | k = $k_d$, void = shrunk volume | 11.52 | 72.32 | 16.16 |
| | k = $k_l$, void = shrunk volume | 11.52 | 78.11 | 10.37 |
| | Actual composition * | 12.72 | 76.00 | 11.27 |
| Liqcreate Strong-X | k = 1 (no shrinkage) | 10.13 | 89 87 | 0 |
| | k = $k_d$, void = shrunk volume | 10.13 | 85.88 | 3.99 |
| | k = $k_l$, void = shrunk volume | 10.13 | 80.65 | 9.22 |
| | Actual composition * | 10.62 | 77.97 | 11.41 |

Furthermore, due to the non-smooth surface finish of the specimens, external void content was filtered out by way of Equation 14.

$$k_g = \frac{V_2}{V_1} \quad \text{Equation 14}$$

introduces a geometric factor ($k_g$) to filter out missing external volumes from material characterization. Specimens of length l=10±0.05 mm were cut with precisely measured length. Volume $V_1$ was calculated from calipers measured widths and thicknesses. Another measurement of volume $V_2$ was performed for the same specimen. The difference between these two volumes provided the measure of external void content present in the general measurements. The expression for $k_g$ provides the cross-sectional area ratio, thus providing the factor for cross-sectional area correction.

Burn-off tests were conducted to determine the $V_f$ of the printed composites. Small sections of the printed composites were cut out and placed in the Lucifer Furnace to burn off the matrix materials. The burn-off tests were carried out in reference to ASTM D3171 standards. The composite was heated at 565° C. for 6 hours in a nitrogen environment. Burn-off results were used to predict and normalize the mechanical properties of the printed specimens. Utilization of the mass difference before and after burning off the matrix materials allowed for the calculation of volume fraction per Equation 11. From burn-off tests, average fiber mass fractions for Deft, Nylon-Like, and Liqcreate Resin composites were found to be 21.28%, 18.96%, and 16.21%, respectively. A p-value of $2.92\times10^{-12}$ signified the statistical significance of the results. Mass fraction predictions from Equation 15 were 19.13%, 17.07%, and 15.11%, respectively, for Deft, Nylon-Like, and Liqcreate resin composites. The close results of the mass fraction calculations from the burn-off test and predictive mass fractions obtained from machine parameters validated the burn-off results.

$$m_f = \frac{\frac{w'_{cf} S_p}{1000}}{\frac{\dot{V}_r \rho_r}{60} + \frac{w'_{cf} S_p}{1000}} \quad \text{Equation 15}$$

calculates the fiber mass fractions of the composites. Here, $w'_f$=0.074 gm/m is the weight of CF per unit length.

An INSTRON® load frame tested the tensile properties of the 3D-printed composites. Tensile test specimens were 150 mm long and had a cross-sectional area of 18.5±0.3 mm wide and 2.8±0.2 mm thick. The gauge length used was 100 mm. Tensile loads were measured using a 30 kN load cell, and strains were measured using a 25.4 mm extensometer. Tabs were attached to the printed composite using two-part epoxy. All tensile tests were conducted using ASTM D3039 standards. The stress-strain data from the tensile test were plotted, and the tensile elastic modulus, E, was calculated.

Figure 22:
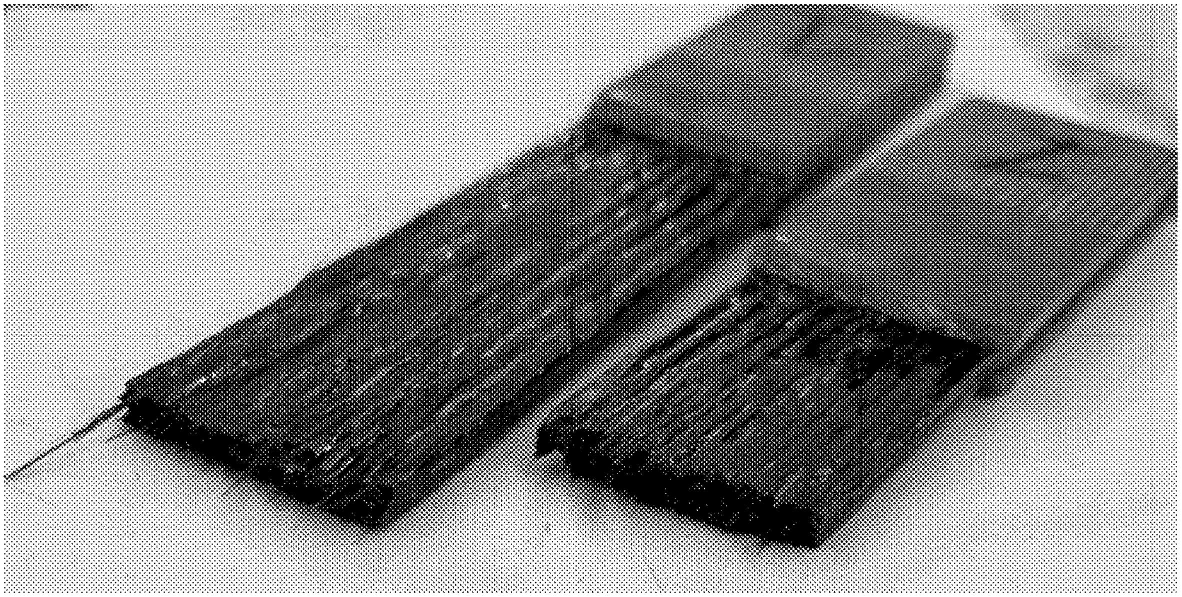
FIG. 22 displays a tensile specimen failure section.
Figure 23:
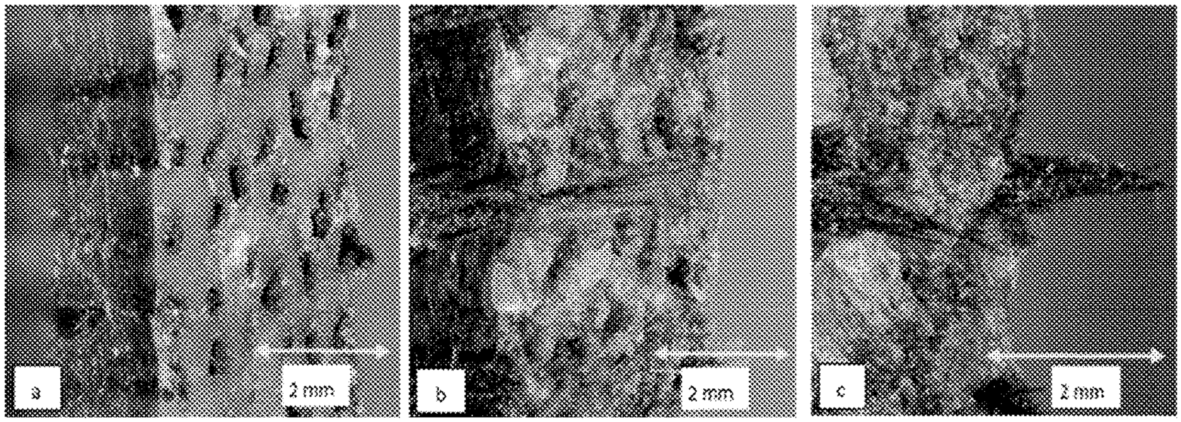
FIG. 23 displays the microscopic image of a tensile fracture surface for (a) Liqcreate Strong-X Composite, (b) Peopoly Nylon-Like Composite, and (c) Peopoly Deft Composite.

FIG. 22 illustrates the typical failures with all the specimens in this example and exhibits the quality of the external surface of the printed specimen. Tensile fracture surfaces of the composites of each resin type were investigated with microscopic imaging using a KEYENCE® VHX microscope. The fracture surfaces of the tensile specimens are shown in FIG. 7. Though all three composites exhibited some degree of fiber pullout, the composite with Liqcreate-X showed maximum fiber pullout tendency. Moreover, the Liqcreate-X composite matrix failed perpendicular to the loading direction with an almost flat fracture surface (indicating brittle matrix failure); on the other hand, the two composites with Peopoly resin showed rough failure surfaces in the matrix (indicating some ductility in the matrix). The Peopoly Nylon-Like and the Peopoly Deft composites also exhibited higher fiber adhesion and better fiber impregnation compared to the Liqcreate composites. Tensile results can be seen in FIG. 23. It was observed that tensile strength of 232.9 MPa was displayed by the composites printed with Peopoly Nylon-Like resin. Though the tensile strength and strain were slightly different for the three resins, the tensile modulus was similar, around 21 GPa for all three resin systems. The ultimate tensile strain of composites printed with the Peopoly Deft resin system was lower compared to the other resin systems, as shown in FIG. 36. However, the wide error bars for this resin system indicated the possibility of statistical deviation. Single-factor ANOVA tests among the resin groups revealed p-values of 0.11, 0.31, and 0.004 for tensile strength, modulus, and strain values, respectively. This indicated that the slight difference in mean values of tensile strength and modulus was not statistically significant. Tensile strength and modulus values were normalized against $V_f$ and $V_v$ values to investigate further the difference in the tensile performance of the specimens printed with different resins. Using the $V_f$ values from FIG. 21, theoretical tensile strength and modulus were modeled by the rule of mixture (ROM) with slight modification. The cross-sectional area corrected ROM model is expressed in Equations 16 and 17.

$$\sigma_{cu} = k_g(\sigma_{fu} V_f + \sigma_{mu} V_m) \quad \text{Equation 16}$$

calculates the tensile strength of the composite. Here, $\sigma_{cu}$, $\sigma_{fu}$, and $\sigma_{mu}$ are the tensile strengths of the composite, fiber, and matrix, respectively.

$$E_c = k_g(E_f V_f + E_m V_m) \quad \text{Equation 17}$$

calculates the tensile moduli of the composite. Here, $E_c$, $E_f$, and $E_m$ are the tensile moduli of the composite, fiber, and matrix, respectively.

Figure 24:
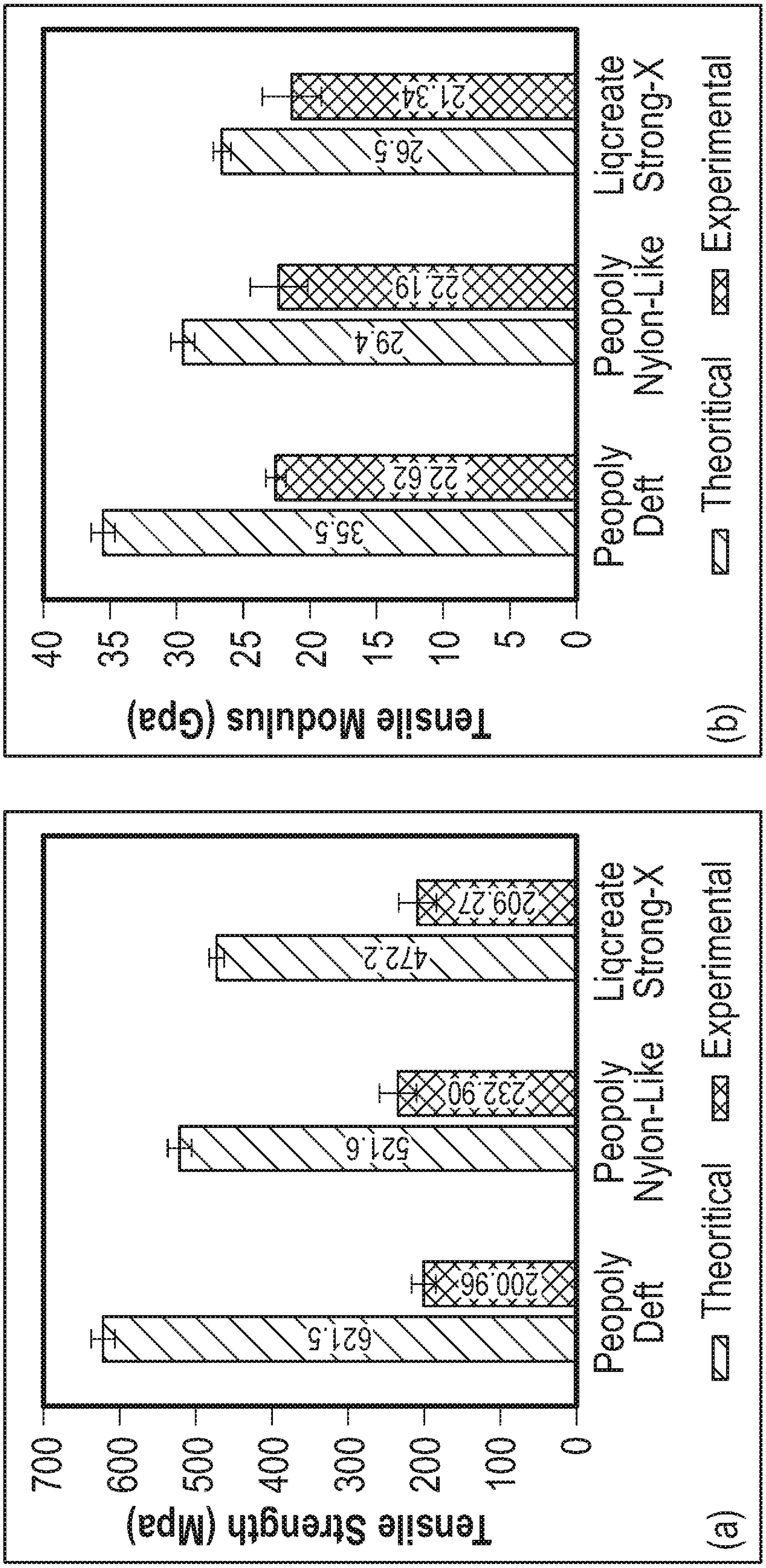
FIG. 24 displays the theoretical vs. experimental values for (a) tensile strength and (b) tensile modulus.

FIG. 24 shows a comparison of experimental vs. theoretically predicted tensile properties, showing that through the ROM predicted different tensile moduli for different material combinations, the experimental tensile moduli were almost similar. Ratios of experimental to theoretical tensile moduli of Deft, Nylon-Like, and Strong-X composites are 0.64, 0.74, and 0.80, respectively. The ratios of experimental to theoretical tensile strengths are 0.32, 0.45, and 0.44 for the composites with Deft, Nylon-Like, and Strong-X resins, respectively. Resin matrix performance was even further analyzed through a simplified normalized tensile property parameter respective to $V_f$ and $V_v$. These normalized tensile strengths and modulus ($N_{St}$ and $N_{Et}$) are described by Equations 18 and 19.

$$N_{St} = \frac{\sigma_{cu}}{V_f(1 - V_v)} \quad \text{Equation 18}$$

calculates the normalized tensile strength. Here, $\sigma_{cu}$ is the experimental tensile strength of the composites.

$$N_{Et} = \frac{E_c}{V_f(1 - V_v)} \quad \text{Equation 19}$$

calculates the normalized tensile modulus. Here, $E_c$ is the experimental tensile modulus of the composites.

Figure 25:
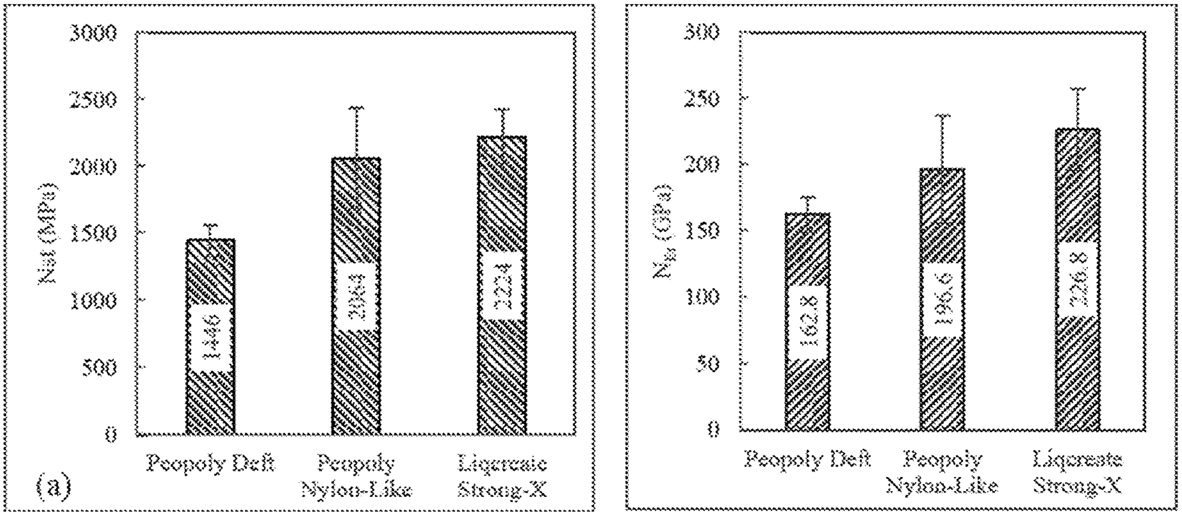
FIG. 25 displays the normalized (a) tensile strength and (b) tensile modulus of the Deft, Nylon-Like, and Strong-X-based resin systems.

Such normalized properties can capture the performance of the matrix for a fixed fiber in the composite. FIG. 25 displays the $N_{St}$ for the Deft, Nylon-Like, and Strong-X-based resin systems. From this representation, the composites with the Liqcreate Strong-X resin system would show the greatest tensile properties. The results do not scale inversely with viscosity, indicating that void concentration and defects are not the reason for this effect; on the other hand, the results do scale with the strength and modulus of the neat resin, indicating that there is a coupling inefficiency between compliant resins and rigid fibers relative to rigid resins and rigid fibers.

The printed composites' flexural properties were tested with a 3-point bending test using an Instron load frame. Flexural tests were conducted to failure according to ATSM D7264 standards. Flexural specimens had a cross-sectional area of 18.5±0.3 mm wide and 2.8±0.2 mm thick. The specimens were 100 mm in length. Flexural tests were performed using an Instron load frame with a 30 kN load cell. According to the standard, the span-to-thickness ratio of the specimen under the flexural load was set at 32:1. The flexural specimens tested in this study using the 32:1 span-to-thickness ratio failed nearly identically. The failure mode was a bottom-face tensile failure with no signs of crushing the top face.

Figure 26:
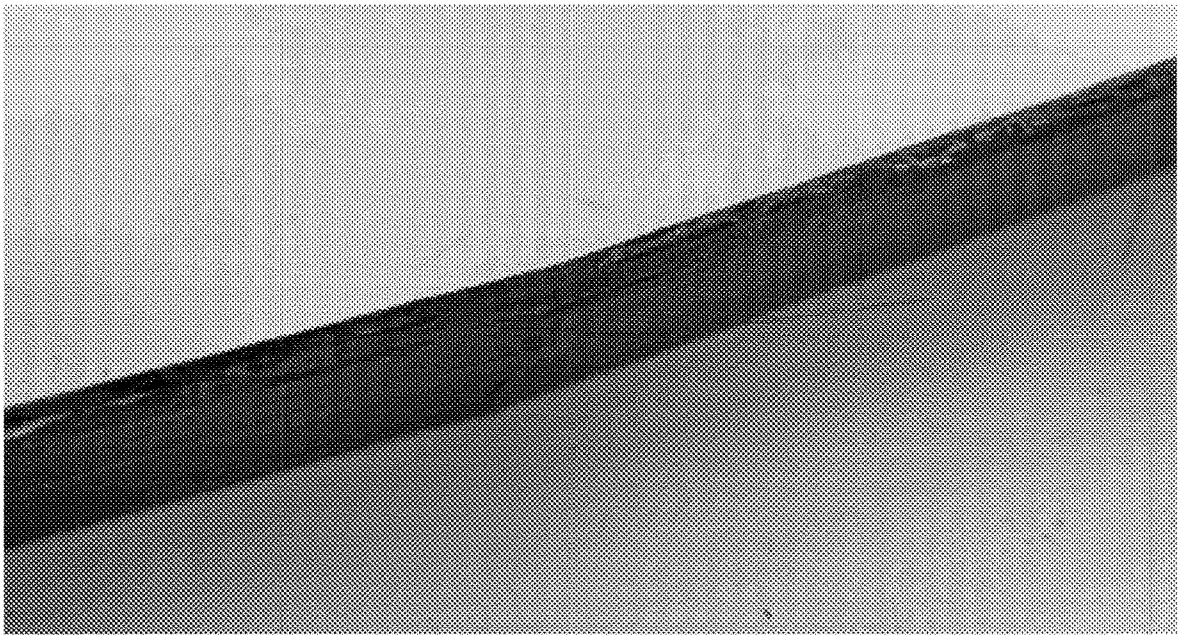
FIG. 26 displays an example of a typical failed flexural specimen.
Figure 27:
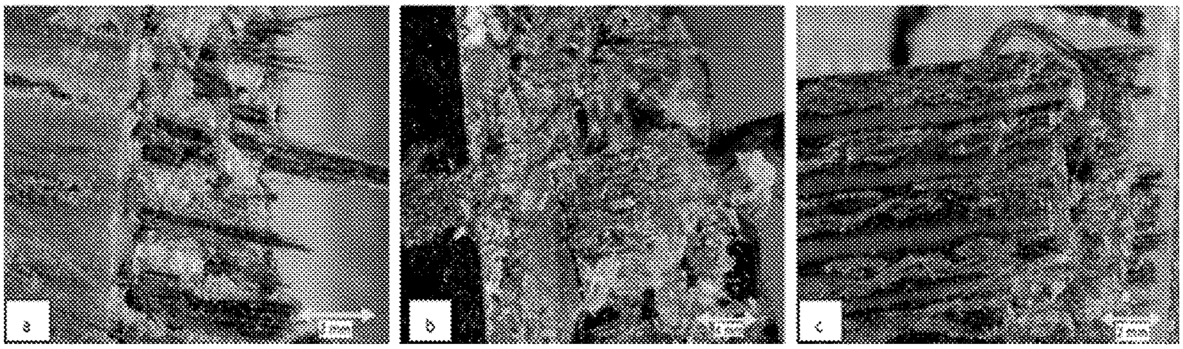
FIG. 27 displays the bottom tensile fracture surface of flexural test specimens (a) Liqcreate Strong-X Composite, (b) Peopoly Nylon-Like Composite, and (c) Peopoly Deft Composite.

A typical failed specimen can be seen in FIG. 26. Flexural stress was calculated from Equation 20.

$$\sigma_{fl}=\frac{3PL}{2bd^2} \quad \text{Equation 20}$$

calculates flexural stress. In this equation, $\sigma_{fl}$ is stress in the outer fibers at the midpoint, P is the load given at a point on the load-deflection curve, L is the supported span, b is the width of the beam, and d is the depth of the beam.

Figure 28:
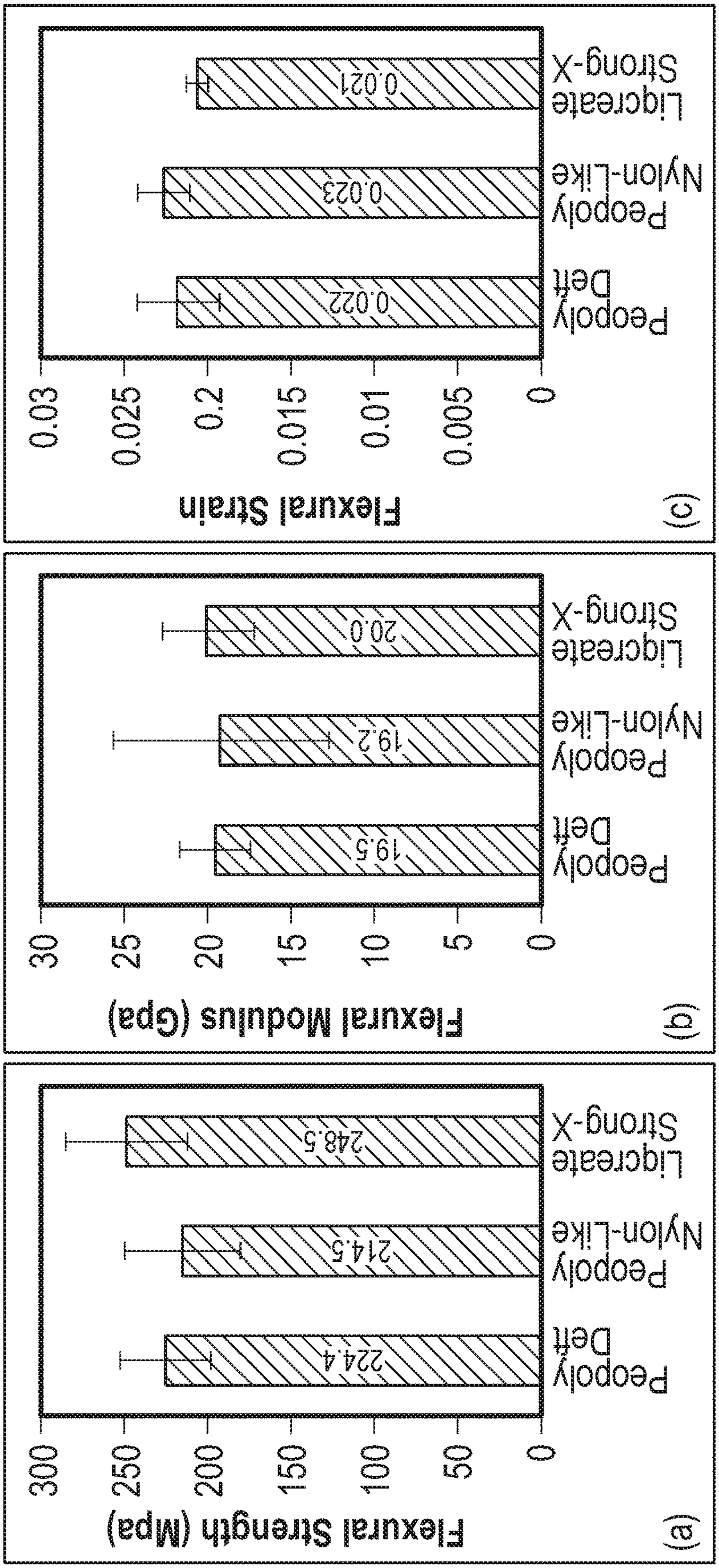

Microscopic investigation of the tensile region of the flexural specimens revealed different amounts of fiber pull-out among the composites. The flexural failure surfaces are presented in FIG. 28. It can be observed that the Liqcreate composite exhibited the highest amount of fiber pullout, and further observed that the length of pulled-out fiber was also the longest for this composite. Equation 21

$$\varepsilon_{fl}=\frac{6Dd}{L^2} \quad \text{Equation 21}$$

calculates flexural strain at the outer surface of the sample. Here, D is the max deflection at the center of the beam, and d is the depth of the beam.

Equation 21 was used for calculating flexural strain at the outer surface of the sample. Along with flexural stress and strain, flexural chord modulus was calculated using Equation 22.

$$E_{fl}=\frac{\sigma_{fl1}-\sigma_{fl2}}{\varepsilon_{fl1}-\varepsilon_{fl2}} \quad \text{Equation 22}$$

calculates flexural chord modulus. In this equation, $\sigma_{fl1}$ and $\sigma_{fl2}$ are flexural stresses measured at predefined points on the load-deflection curve, and $\varepsilon_{fl1}$ and $\varepsilon_{fl2}$ are flexural strains measured at predefined points on the load-deflection curve.

Figure 29:
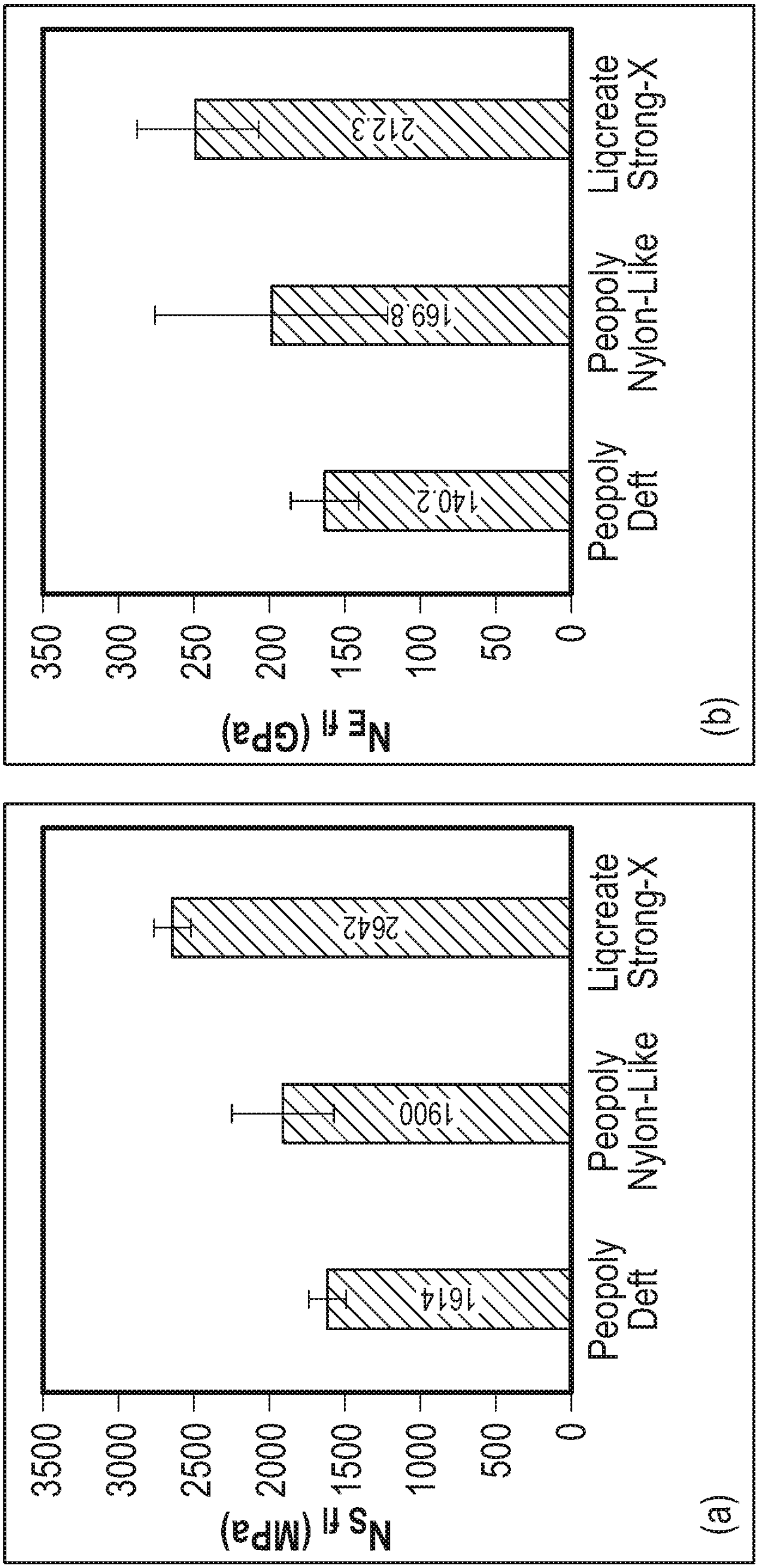
FIG. 29 displays normalized flexural strength, and FIG. 14(*b*) displays normalized flexural modulus.

Flexural results can be seen in FIG. 29. It was observed that composites with three different matrices show very similar flexural properties. Single-factor ANOVA p-values among the different composites were 0.28 and 0.95 for flexural strength and flexural modulus, respectively. As the p-values were greater than 0.05, the variation of mean flexural properties among different resin composites was not statistically significant. The Strong-X-based matrix composites showed the highest average flexural strength of 249 MPa, though this composite had the lowest average $V_f$ and highest $V_v$ among the composites. Flexural strength and modulus were normalized with $V_f$ and $V_v$ through Equations 23 and 24.

$$N_{Sfl}=\frac{S_{fl}}{V_f(1-V_v)} \quad \text{Equation 23}$$

calculates flexural strength. Here, $S_{fl}$ is the experimental flexural strength of the composites.

$$N_{Efl}=\frac{E_{fl}}{V_f(1-V_v)} \quad \text{Equation 24}$$

calculates flexural modulus. Here, $E_{fl}$ is the experimental flexural modulus of the composites.

Figure 30:
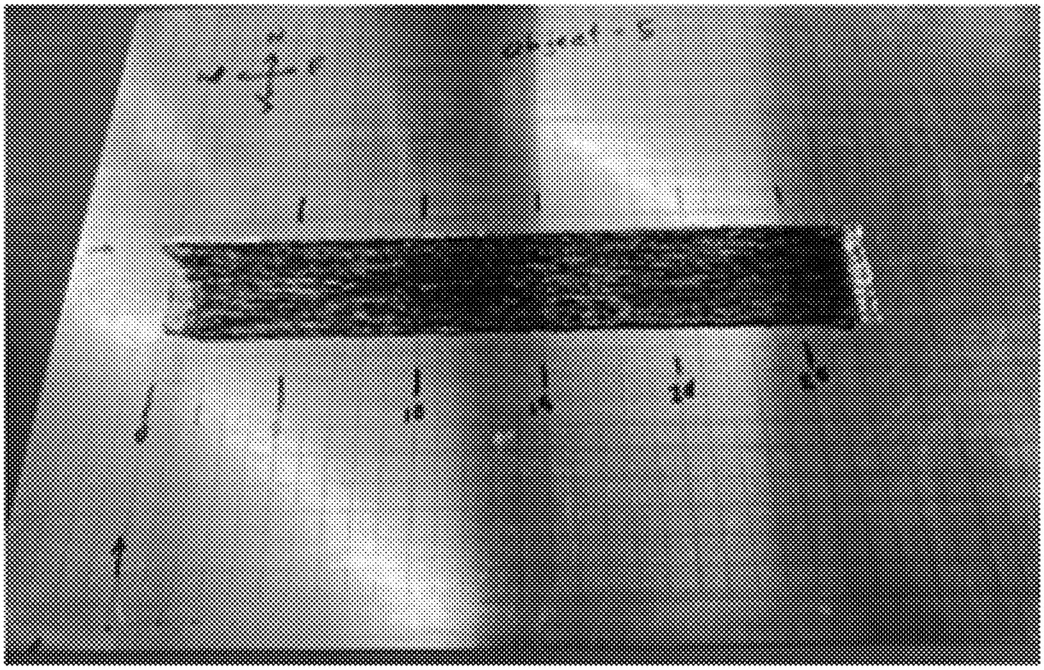
FIG. 30 displays the 3D-printed composite on a grid-marked build plate.

The normalized flexural properties are visualized in FIG. 30, showing that flexural strength and modulus were the highest for the Strong-X-based resin system with the same fiber volume fraction. It is further observed that composites with the Nylon-Like resin system underperformed in the flexural test compared to the tensile tests, perhaps due to inefficient fiber matrix coupling.

Example 3

Printed fiber-reinforced composites were evaluated for their ability to be laser cut in the manufacturing process in order to assess their suitability for a combined printing and laser-cutting process.

A liquid deposition modeling (LDM) system was constructed for the purposes of this study. This system included a 3D printer constructed with a movable X-Y-Z gantry with a print head controlled by an ARDUINO® Mega 2560 stepper motor. The print bed was constructed by clamping a fixed aluminum plate in the gantry system, and the print nozzle was designed and manufactured to feed continuous carbon fiber through the nozzle as the resin was flowing from a resin pump. This resulted in the fiber being soaked and impregnated by resin as they flowed through the nozzle together. Two alternatively powered 405 nm and 105 mW violet light dot lasers, situated on either side of the print head, were focused on the back side of the nozzle travel to cure the wetout fiber.

Figure 31:
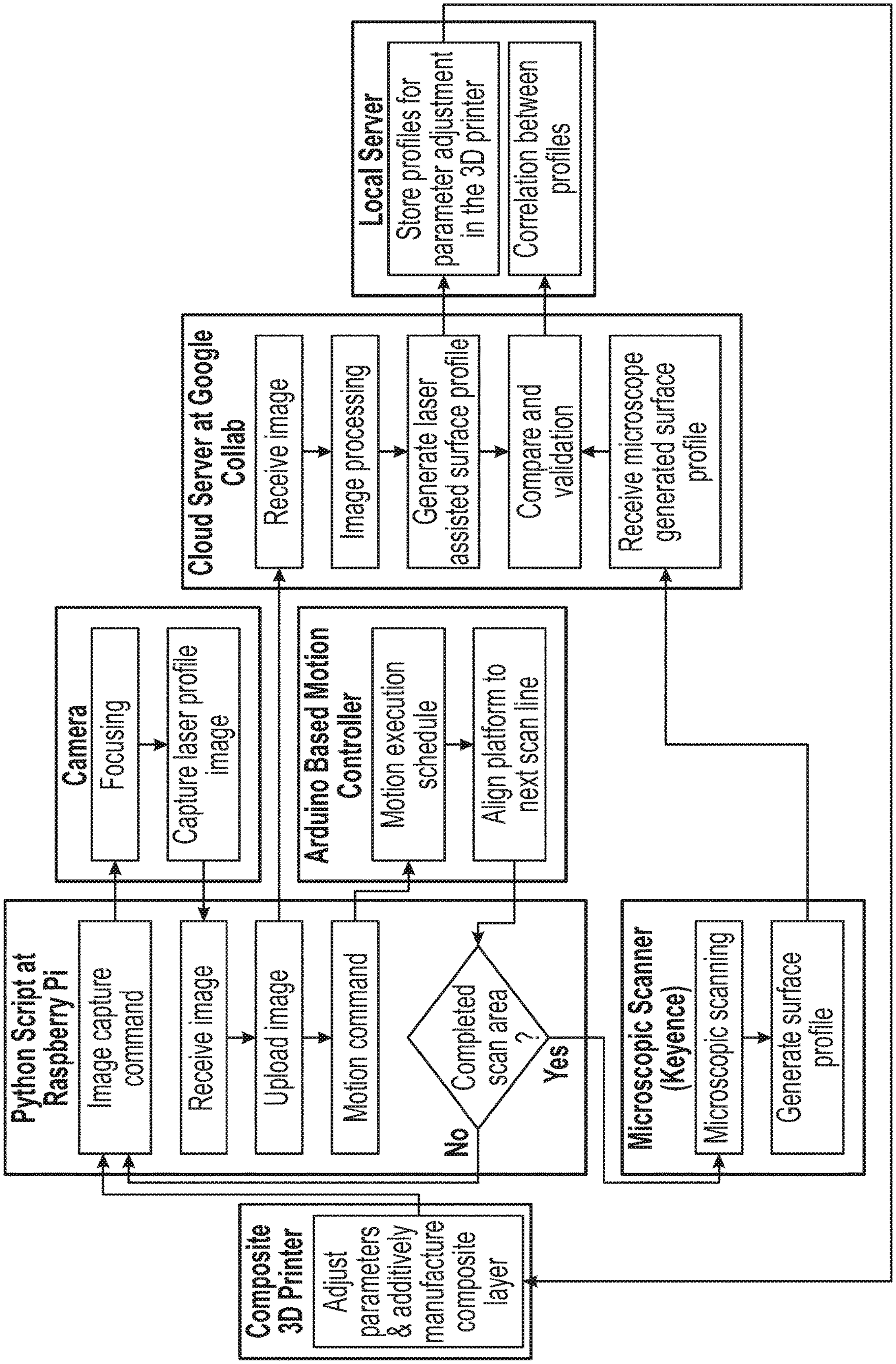
FIG. 31 displays the workflow for surface profile analysis.

125 mm×22 mm specimens were printed for this study. The initial gap between the nozzle tip and the build plate was set to 0.45 mm. With each layer, the gap increased by 0.45 mm. The spacing between adjacent print lines was set at 1 mm. The build plate was placed between positioning jigs on the print bed and secured with magnets (embedded in the platform) to ensure flatness and consistent placement after surface measurements. The build plate was marked with laser-engraved gridlines to track the measurement locations of the print for surface analysis. A printed composite on the build plate can be seen in FIG. 31, the 3D printed composite on the grid marked build plate.

Figure 32:
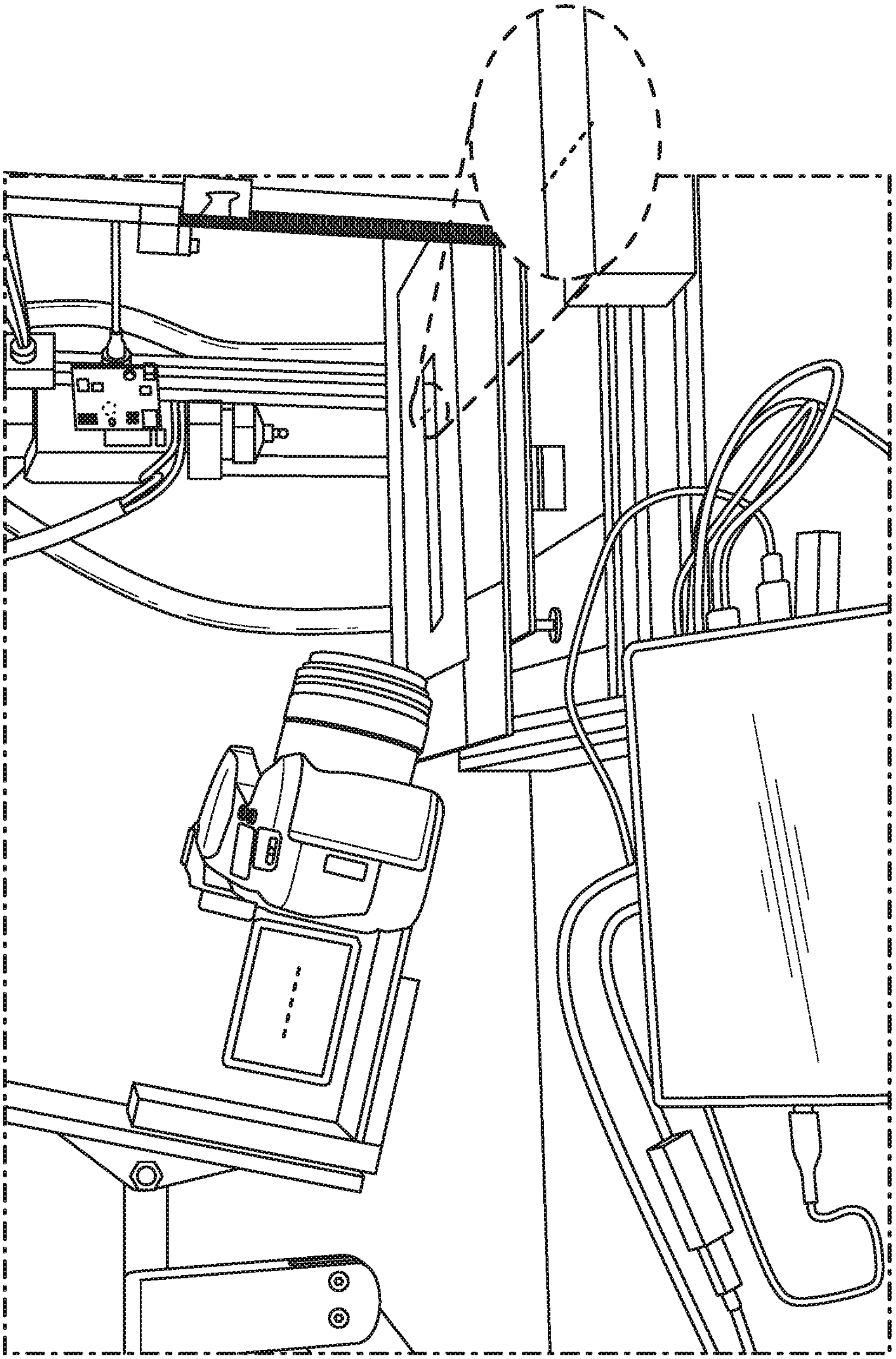
FIG. 32 displays the surface profile measuring setup.
Figure 33:
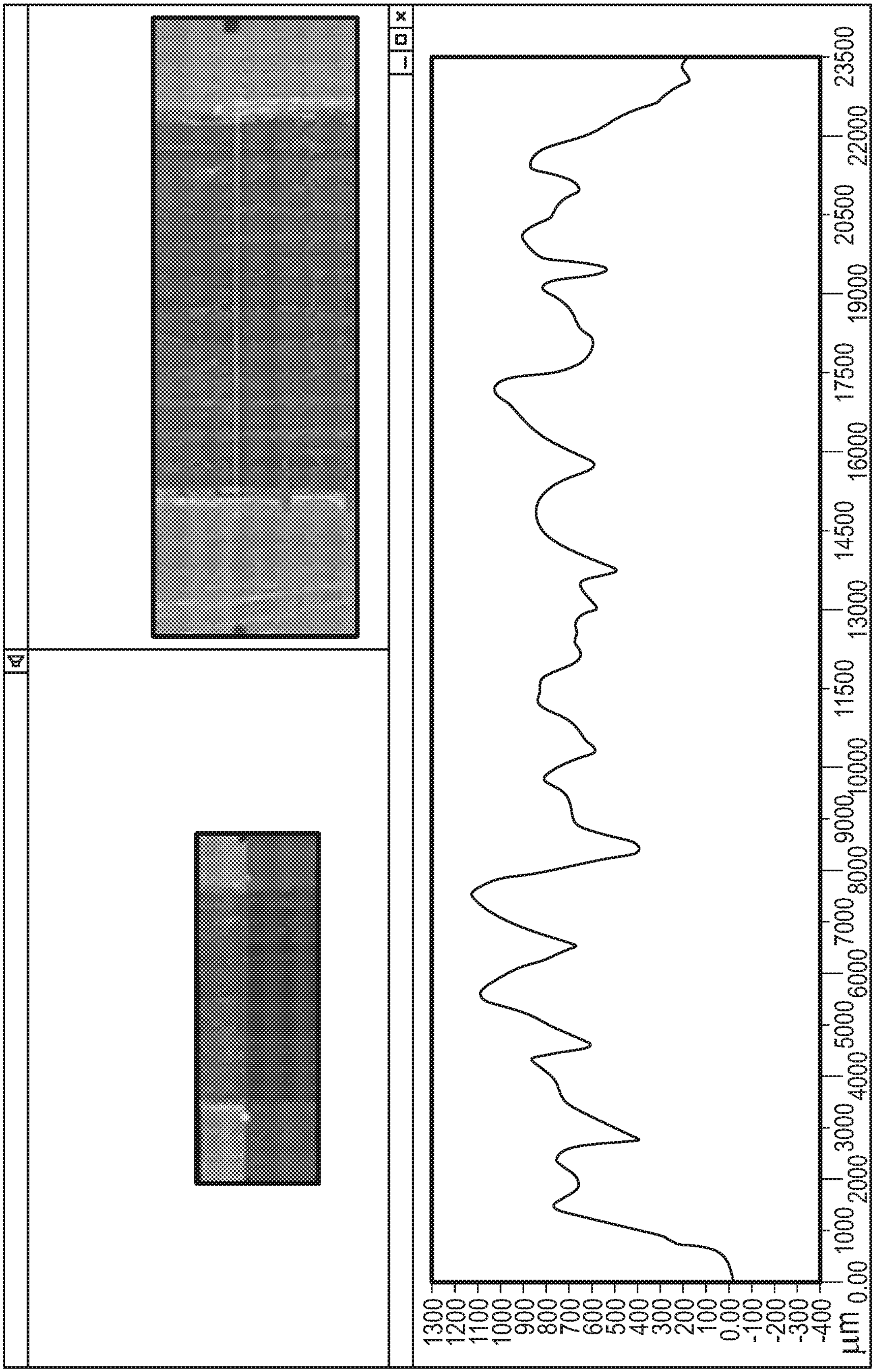
FIG. 33 displays the microscopic scan of the 3D-printed layer.

A laser-aided surface profile scanner was constructed using an X-Y-Z gantry system, a DSLR camera, a macro lens, and a 150 mW 405 nm wavelength laser. Movement of the platform was controlled using an ARDUINO® Nano controller and was run as a slave of the master Python program located in a RASPBERRY PI®. The workflow of the scanning schedule is presented in FIG. 32, and a physical setup of the surface profile scanner is displayed in FIG. 33. After printing a layer on the printer's build plate, the build plate, along with the printed composite, was transferred to the laser scanning platform. Then, the laser line was aligned with the indexed gridlines of the build plate. The Python script at RASPBERRY PI® controlled the camera and the motion of the X-Y-Z platform to take images of laser lines at predetermined locations. This Python script uploaded the image to the GOOGLE® cloud server, where the images were processed using another Python script and the GOOGLE® Collab platform. GOOGLE® is a federally registered trademark of Google LLC, having a place of business at 1600 Amphitheatre Parkway, Mountain View, California 94043. The image processing generated the surface profiles of the 3D-printed sample's layers. The profiles were sent back to the local server with their associated 3D coordinates. These constructed the layer-wise 3D map of the 3D printed composites. Optimization of the surface profile capture was conducted by altering ISO, exposure, and shutter speeds. This figured corroborates that settings A, B, and C contained noise in the data for surface profile measurement. A much darker optical setting D (ISO 12800, aperture f/6.3, and shutter speed 1/1250) was utilized for surface profile measurement. These dark images produced consistent results and less data loss when passed through the set Hue-Saturation-Value (HSV) filter.

Images were captured under consistent room lighting and condition. The camera captured images at ISO 12800, an aperture of f/6.3, and a shutter speed of 1/1250. After capturing each image, it was copied from the camera and uploaded to GOOGLE®'s server via the RASPBERRY PI®. As the scanning process continued, the surface profiles were simultaneously generated at the cloud server using a custom Python script. This image processing program first passed the image pixels through an HSV filter of 80-110, 100-255, and 100-255, respectively. This yielded a binary map of the laser-illuminated composite surface. The bottom boundary of this map represented a 2D profile of the composite layer at that specific slice of laser line illumination. By utilizing a custom search algorithm, this boundary was extracted as a pixel map of the 2D profile. Curves were smoothened through the Savitzky-Golay algorithm with a window size set to 50 for the second-order polynomial function. The pixel was then converted to the physical 2D profile of the composite top surface along the laser-illuminated line through tilt correction and scaling functions. The pixel map of the laser profile was further smoothed and scaled with factors 6.27 and 6.72 for the X and Y axes, respectively.

Figure 34:
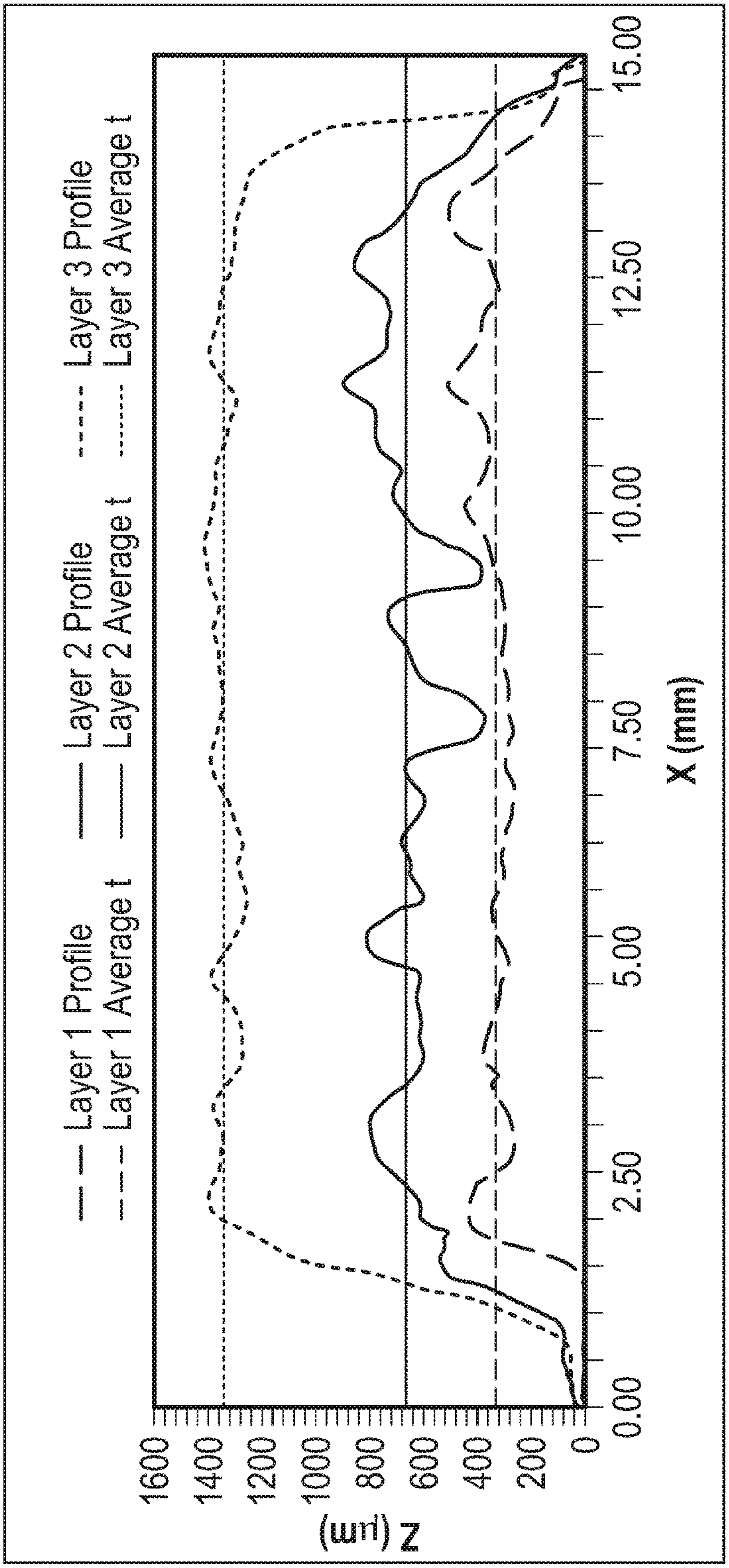
FIG. 34 displays surface roughness progression from the results of a previous study, *3D printed continuous CF/PA6 composites: effect of microscopic voids on mechanical performance*, Q. He et al.

The scans of each layer were compared to measurements taken from a KEYENCE® VHX optical microscope using 20× magnification and its ring lighting mode. A series of images from different focal planes were utilized for verification. Due to the transparency of the resin, a light coating of opaque black marker ink was applied to each printed layer. An example image produced by the microscope can be observed in FIG. 34. Comparison of the scaled data to the microscopic profile displayed a lack of alignment; this was corrected by utilizing an algorithm that detected the edges and calculated the angle of misalignment.

Further validity testing of the laser-generated profiles was tested by calculating the relative absolute error (RAE) of the laser-generated profiles with respect to the microscopically generated profiles. From a sample size of 20 randomly selected profiles, the average RAE was calculated to be 0.13 with a standard deviation of 0.04. This small standard deviation supports the accuracy of the RAE, further evidencing consistent micrometer precision of the laser-generated profiles.

Figure 35:
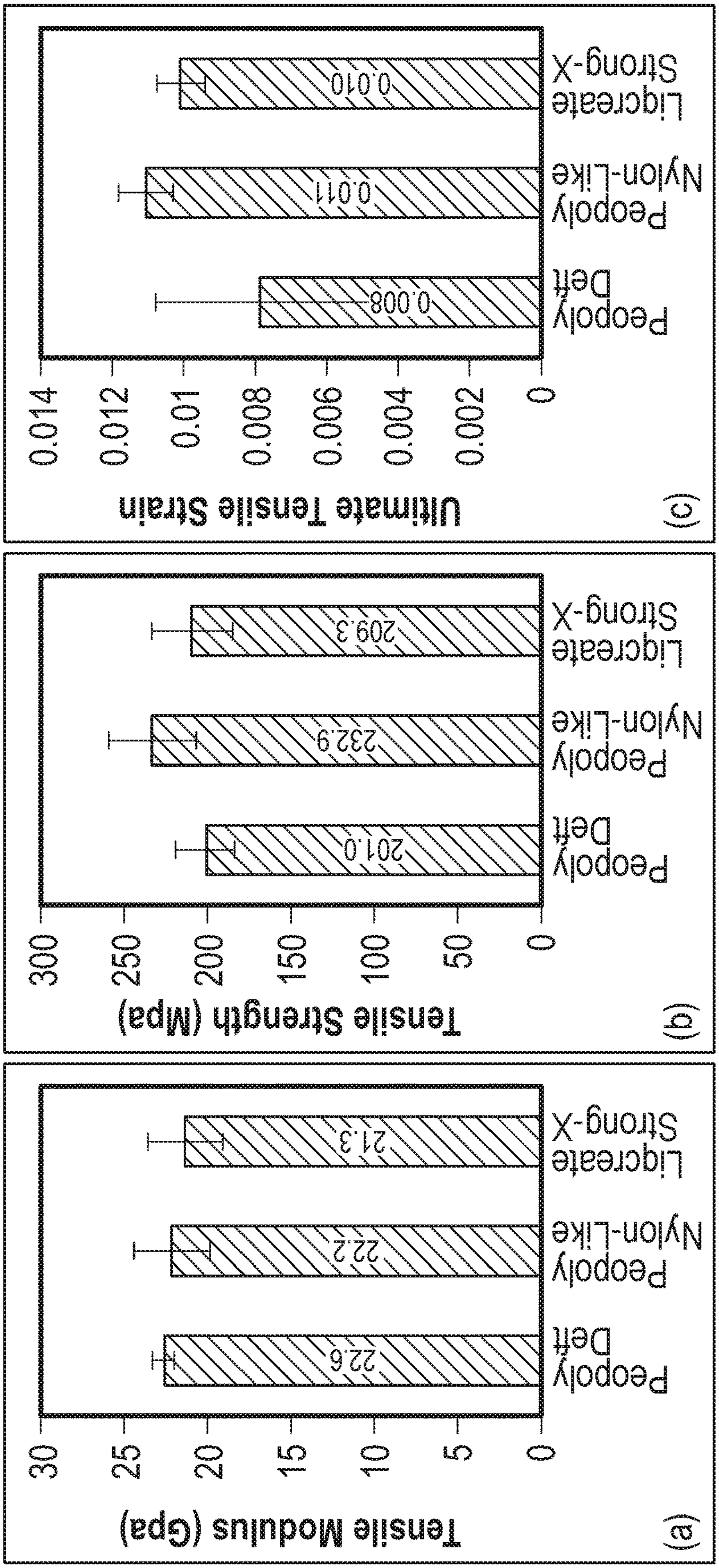
FIG. 35 displays the (a) tensile modulus, (b) tensile strength, and (c) ultimate tensile strain for the composites.

A comparison of these results to previous studies found that the results of image analysis could guide the settings for the next layer. FIG. 35 shows that in experimentation with flow rates, analysis of each layer and optimization of flow rates resulted in improved surface layer finish; such a result could, in turn, directly reduce void concentrations and improve mechanical performance. The aforementioned study measured surface roughness by utilization of microscopic optical 3D scanning of each layer after printing. The surface roughness values were then taken to calculate the updated resin flow in the next layer. This process relied on microscopic scanning, requiring the specimen to be moved under a microscope after each printed layer.

Further, this process utilized the average surface roughness of a complete layer. These factors, alongside local variation in layer surfaces, could lead to over-correction of resin flow, consequently resulting in inferior mechanical properties of the printed composites. Alternatively, a real-time local surface profile analysis could dynamically adjust the resin flow rate in the consecutive layer and adjacent lines in the same layer.

From the foregoing, it can be seen that this technology accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 3

| List of Reference Characters | |
|---|---|
| 2 | Continuous fiber-reinforced composite 3D printer. |
| 4 | Base |
| 6 | Z-platform |
| 8 | Rotary platform |
| 10 | X-Y build platform |
| 12 | Build plate |
| 14 | Manufactured composite |
| 16 | Laser |
| 18 | Print head |
| 20 | Resin Drive |
| 21 | Printer nozzle |
| 22 | Prepreg |
| 24 | Prepreg forming equipment |
| 26 | Camera |
| 30 | Fiber tow |
| 32 | Resin bath |
| 34 | Limiting nozzle |
| 36 | Excess scrapper |
| 38 | Air blower |
| 40 | Curing chamber |
| 42 | U.V. light emitting diodes (L.E.D.s) |
| 50 | Applicator |
| 52 | Prepreg entry |
| 54 | Resin entry |
| 56 | Movable mirrors |
| 58 | Galvano drive |
| 60 | Three-axis controlled composite additive manufacturing equipment with X-Y-Z gantry. |
| 62 | Prototype additive manufacturing equipment |
| 100 | Laser system |
| 102 | Light-emitting laser beams |
| 104 | Print head |
| 106 | Multiple lasers, e.g., four |
| 108 | Resin |
| 110 | Print bed |
| 120 | Composite rectangular bars |
| 122 | Graphical representation of area under the cross-sectional profile curve |
| 124 | Microscope generated topographic profile of one printed line. |
| 126 | ISO 12800, aperture f6.3, shutter speed 1/80 |
| 128 | ISO 12800, aperture f11, shutter speed 1/100 |
| 130 | ISO 12800, aperture f10, shutter speed 1/100 |
| 132 | ISO 12800, aperture f/6.3, and shutter speed 1/1250 |
| 134 | Raw surface profile |
| 136 | Composite top surface along the laser-illuminated line |
| 138 | Laser generated profile |
| 140 | Microscopic scan profile |
| 142 | Graphical representation of laser-generated profile versus microscopic scan profile |
| 300 | Material flow process steps |
| <302> | Photocurable liquid thermoset resin |
| <304> | Thermal initiator |
| <306> | Mixing of Photocurable liquid thermoset resin and thermal initiator |
| <308> | Fiber tow |
| <310> | Dual curable resin system |
| <312> | Partial curing |

TABLE 3-continued

| List of Reference Characters | |
|---|---|
| <314> | Prepreg formation |
| <316> | Impregnation and encapsulation of a prepreg |
| <318> | Dispensing of prepreg |
| <320> | Cured prepreg with laser |
| <322> | Matrix formation |
| <324> | Composite post cured |
| 340 | Dynamic adjustment of print parameters |
| <342> | Select the nozzle diameter |
| <344> | Update the configuration |
| <346> | See if the print does attach to the print bed |
| <348> | Is there enough resin? |
| <350> | Slow down the print speed |
| <352> | If not enough resin increase resin flow |
| <354> | Are there uniform print lines |
| <356> | Reduce resin flow if interference |
| <358> | Topographical analysis with ML-derived subroutines with camera surface images |
| <360> | Adjust spacing of the lines |
| <362> | Test print |
| <364> | Determine if there are interference gaps between lines |
| <366> | Printing and characterizing |
| 370 | Machine learning (ML) model and utilization of it for surface feature extraction |
| <372> | Imaging a printed additive layer |
| <374> | Series of images of laser lines |
| <376> | Process images |
| <380> | Create laser aided surface profile |
| <382> | Microscopically scanned |
| <384> | 3D surface map |
| <386> | Machine learning model training |
| <388> | Trained model |
| <390> | 3D surface maps |
| 400 | Major steps in artificial intelligence (A.I.) model training and utilizationfor dynamic printing parameters adjustments |
| <402> | 3D model and slicing |
| <404> | Record surface features of the progressively printed layers |
| <406> | Additive manufacturing of composite layer |
| <408> | Surface feature imaging |
| <410> | Trained model for surface feature extraction |
| <412> | Calculations of parameter adjustment |
| <414> | Surface feature and parameter data |
| <416> | A.I. model trained for parameter optimization |
| <418> | Trained A.I. model |
| <420> | Connection |
| 430 | Process of laser cutting layers of carbon fiber reinforced thermoset composite |
| <432> | Create a layer of continuous carbon fiber-reinforced thermose tcomposites |
| <434> | Apply a cutting torch to the layer of continuous carbon fiber-reinforced thermoset composite to produce a complex feature without curved lines. |
| <436> | Are all desired layers in the continuous carbon fiber-reinforced thermoset composite created? |
| <438> | Continuous carbon fiber-reinforced thermoset composite product is complete. |

Glossary

Unless defined otherwise, all technical and scientific terms used above have the same meaning as commonly understood by one of ordinary skill in the art to which embodiments of this technology pertain.

The terms "a," "an," and "the" include both singular and plural referents.

The term "or" is synonymous with "and/or" and means any one member or combination of members of a particular list.

The term "invention" is not intended to refer to any single embodiment of the particular invention but encompass all possible embodiments as described in the specification and the claims.

As used herein, the term "exemplary" refers to an example, an instance, or an illustration, and does not indicate a most preferred embodiment unless otherwise stated.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

"Stereolithography" (S.L.A.), as used herein, is a form of 3D printing technology used for creating models, prototypes, patterns, and production parts in a layer-by-layer fashion using photochemical processes by which light causes chemical monomers and oligomers to crosslink together to form polymers. S.L.A. can be, but is not limited to being, an optical fabrication, photo-solidification, or a resin printing.

The "scope" of this technology is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A method of 3D printing comprising:

generating a variable prepreg by partially curing pre-impregnated fiber tow via a curing chamber comprising a plurality of U.V. light sources;

using a transparent applicator and the variable prepreg such that U.V. light further cures the prepreg to form a 3D printed composite; and mechanically or ultrasonically inducing vibration(s) while generating the variable prepreg and/or forming the 3D printed composite to create a surface layer finish varied in texture and/or quality for different parts of the 3D printed composite.

2. The method of 3D printing of claim 1, comprising varying a fiber volume fraction to alter the surface layer finish of the 3D printed composite.

3. The method of 3D printing of claim 1, further comprising varying an amount of curing on the prepreg to alter the surface layer finish of the 3D printed composite.

4. The method of 3D printing of claim 1, further comprising varying a U.V. intensity while printing to alter the surface layer finish of the 3D printed composite.

5. The method of 3D printing of claim 1, further comprising generating a printing path using a machine learning artificial intelligence (A.I.) program.

6. The method of 3D printing of claim 1, wherein the generating of the prepreg occurs after the 3D printed composite is designed and print paths have been determined.

7. The method of 3D printing of claim 6, further comprising feeding data related to the surface layer finish and interlaminar adhesion to the A.I. program.

8. The method of 3D printing of claim 7, wherein an active camera looks at a printing point and feeds the data to the A.I. program.

9. The method of 3D printing of claim 8, wherein the A.I. program uses image processing to actively detect an imperfection selected from the group consisting of: voids, print failure, and uneven surfaces.

10. The method of 3D printing of claim 9, further comprising heuristically improving print parameters and a print line for the different parts of the 3D printed composite by continually running the A.I. program during 3D printing.

11. The method of 3D printing of claim 10, further comprising using the data to repair the imperfection during the next layer by varying said print parameters.

12. The method of 3D printing of claim 6, further comprising enabling the printer to print with neat resin on an outer surface of the 3D printed composite and to print composite in the core of the 3D printed composite.

13. The method of 3D printing of claim 1, further comprising utilizing a laser cutting torch to cut the 3D printed composite on a layer-by-layer basis.

* * * * *